(12) United States Patent
Simmons

(10) Patent No.: US 11,681,159 B2
(45) Date of Patent: Jun. 20, 2023

(54) LIGHT MANAGEMENT FOR IMAGE AND DATA CONTROL

(71) Applicant: John Castle Simmons, Germantown, TN (US)

(72) Inventor: John Castle Simmons, Germantown, TN (US)

( * ) Notice: Subject to any disclaimer, the term of this patent is extended or adjusted under 35 U.S.C. 154(b) by 0 days.

(21) Appl. No.: 18/064,805

(22) Filed: Dec. 12, 2022

(65) Prior Publication Data

US 2023/0152602 A1 May 18, 2023

Related U.S. Application Data

(60) Continuation of application No. 17/555,507, filed on Dec. 20, 2021, now Pat. No. 11,567,342, which is a
(Continued)

(51) Int. Cl.
*G02B 30/33* (2020.01)
*H04N 1/00* (2006.01)
(Continued)

(52) U.S. Cl.
CPC ......... *G02B 30/33* (2020.01); *G02B 26/0808* (2013.01); *G02B 26/0816* (2013.01); *G02B 27/0093* (2013.01); *G02B 27/0172* (2013.01); *G02B 27/0179* (2013.01); *G02B 30/26* (2020.01); *G02B 30/36* (2020.01); *G06F 3/013* (2013.01); *G09G 5/02* (2013.01);
(Continued)

(58) Field of Classification Search
CPC ................ G02B 30/33; G02B 26/0808; G02B 26/0816; G02B 27/0093; G02B 27/0172; G02B 27/0179; G02B 30/26; G02B 30/36; G02B 2027/0112; G02B 2027/0118; G02B 2027/0127; G02B 2027/0138; G02B 2027/014; G02B 2027/0174; G02B 2027/0178; G02B 2027/0187; G06F 3/013; G09G 5/02; G09G 5/10; G09G 2320/0626; G09G 2320/0666; G09G 2320/0686; G09G 2354/00; H04N 1/00129; H04N 13/324; H04N 13/339; H04N 13/344; H04N 13/383; H04N 13/398; H04N 5/7755; H04N 2201/0013; H04N 2201/0084; H04N 2201/0089
See application file for complete search history.

(56) References Cited

U.S. PATENT DOCUMENTS 3,211,047 A * 10/1965 Heimberger ......... G02B 27/281
359/488.01
4,689,481 A * 8/1987 Ono ..................... G11B 7/0908
250/237 G
(Continued)

*Primary Examiner* — Dmitriy Bolotin

(57) ABSTRACT

Optical devices and cognitive prosthetics based on novel components for enhanced human vision, selective video/television display, digital processing and/or unique image analysis to modify the image that a user sees and significantly improve the perception of that user are disclosed. What the user sees is responsive to specific perceptual and informational needs of the user in real time. Devices from the parent patents are herein made both more useful in practical day-to-day use and are more widely applicable to improving the ability of a user to perceive visual stimuli.

21 Claims, 13 Drawing Sheets

Related U.S. Application Data continuation-in-part of application No. 16/896,987, filed on Jun. 9, 2020, now Pat. No. 11,204,641, which is a division of application No. 16/438,132, filed on Jun. 11, 2019, now Pat. No. 10,684,684, which is a continuation of application No. 15/784,225, filed on Oct. 16, 2017, now Pat. No. 10,331,207, which is a continuation-in-part of application No. 15/400,040, filed on Jan. 6, 2017, now Pat. No. 9,791,926, which is a continuation of application No. 15/201,584, filed on Jul. 4, 2016, now Pat. No. 9,576,556, which is a continuation of application No. 14/215,199, filed on Mar. 17, 2014, now Pat. No. 9,392,129.

(60) Provisional application No. 61/801,708, filed on Mar. 15, 2013.

(51) Int. Cl.

| | | |
|---|---|---|
| *G06F 3/01* | (2006.01) | |
| *G02B 27/01* | (2006.01) | |
| *G09G 5/02* | (2006.01) | |
| *G02B 27/00* | (2006.01) | |
| *G09G 5/10* | (2006.01) | |
| *G02B 26/08* | (2006.01) | |
| *H04N 13/324* | (2018.01) | |
| *H04N 13/339* | (2018.01) | |
| *H04N 13/344* | (2018.01) | |
| *H04N 13/383* | (2018.01) | |
| *H04N 13/398* | (2018.01) | |
| *G02B 30/36* | (2020.01) | |
| *G02B 30/26* | (2020.01) | |
| *H04N 5/775* | (2006.01) | |

(52) U.S. Cl.
CPC ........... *G09G 5/10* (2013.01); *H04N 1/00129* (2013.01); *H04N 13/324* (2018.05); *H04N 13/339* (2018.05); *H04N 13/344* (2018.05); *H04N 13/383* (2018.05); *H04N 13/398* (2018.05); *G02B 2027/014* (2013.01); *G02B 2027/0112* (2013.01); *G02B 2027/0118* (2013.01); *G02B 2027/0127* (2013.01); *G02B 2027/0138* (2013.01); *G02B 2027/0174* (2013.01); *G02B 2027/0178* (2013.01); *G02B 2027/0187* (2013.01); *G09G 2320/0626* (2013.01); *G09G 2320/0666* (2013.01); *G09G 2320/0686* (2013.01); *G09G 2354/00* (2013.01); *H04N 5/7755* (2013.01); *H04N 2201/0013* (2013.01); *H04N 2201/0084* (2013.01); *H04N 2201/0089* (2013.01)

(56) References Cited

U.S. PATENT DOCUMENTS

| | | | | |
|---|---|---|---|---|
| 5,552,841 | A * | 9/1996 | Gallorini | G02C 7/101 351/44 |
| 5,801,808 | A * | 9/1998 | Abraham | A61B 3/12 351/221 |
| 6,140,980 | A * | 10/2000 | Spitzer | H01L 29/78648 257/E29.295 |
| 6,250,759 | B1 * | 6/2001 | Kerns, Jr. | G02C 7/12 351/44 |
| 8,956,396 | B1 * | 2/2015 | Friend | A61N 5/0622 607/88 |
| 9,392,129 | B2 * | 7/2016 | Simmons | H04N 13/383 |
| 9,530,382 | B2 * | 12/2016 | Simmons | G02B 27/0179 |
| 9,576,556 | B2 * | 2/2017 | Simmons | G02B 30/33 |
| 9,791,926 | B2 * | 10/2017 | Simmons | H04N 13/398 |
| 10,009,605 | B1 * | 6/2018 | Yin | H01L 27/14621 |
| 10,073,266 | B2 * | 9/2018 | Osterhout | G02B 27/0176 |
| 10,275,024 | B1 * | 4/2019 | Simmons | G06F 3/013 |
| 10,331,207 | B1 * | 6/2019 | Simmons | H04N 13/344 |
| 2004/0027536 | A1 * | 2/2004 | Blum | G02C 7/08 351/159.03 |
| 2005/0024729 | A1 * | 2/2005 | Ockerse | G01J 1/42 359/603 |
| 2005/0280769 | A1 * | 12/2005 | Cano | B29D 11/00826 351/41 |
| 2010/0039352 | A1 * | 2/2010 | Lippey | H04N 13/334 348/42 |
| 2010/0103371 | A1 * | 4/2010 | Sarver | G02B 5/223 351/159.01 |
| 2011/0255051 | A1 * | 10/2011 | McCabe | G02C 7/12 351/159.63 |
| 2012/0013981 | A1 * | 1/2012 | Matera | G02B 5/3058 359/485.05 |
| 2013/0033485 | A1 * | 2/2013 | Kollin | G06F 3/0484 345/660 |
| 2013/0141693 | A1 * | 6/2013 | McCabe | B29D 11/00865 351/159.56 |
| 2016/0033771 | A1 * | 2/2016 | Tremblay | G02B 26/10 359/851 |
| 2016/0062121 | A1 * | 3/2016 | Border | G02B 27/0176 359/630 |
| 2016/0109709 | A1 * | 4/2016 | Osterhout | G02B 27/0172 359/614 |
| 2016/0116745 | A1 * | 4/2016 | Osterhout | G06F 3/017 359/614 |
| 2016/0116979 | A1 * | 4/2016 | Border | G06F 3/013 345/156 |
| 2016/0131912 | A1 * | 5/2016 | Border | G02B 27/0075 345/8 |
| 2016/0212404 | A1 * | 7/2016 | Maiello | H04N 13/128 |
| 2017/0075143 | A1 * | 3/2017 | Saylor | G02C 7/101 |
| 2017/0176774 | A1 * | 6/2017 | Linhardt | G02C 7/04 |
| 2017/0285349 | A1 * | 10/2017 | Ayres | H04N 1/58 |
| 2017/0371179 | A1 * | 12/2017 | Scherlen | G02C 7/10 |
| 2018/0035101 | A1 * | 2/2018 | Osterhout | G02B 27/0172 |
| 2018/0218656 | A1 * | 8/2018 | Richards | G06T 5/10 |
| 2021/0080456 | A1 * | 3/2021 | Swager | C01B 33/145 |
| 2022/0146854 | A1 * | 5/2022 | Simmons | H04N 13/383 |

* cited by examiner

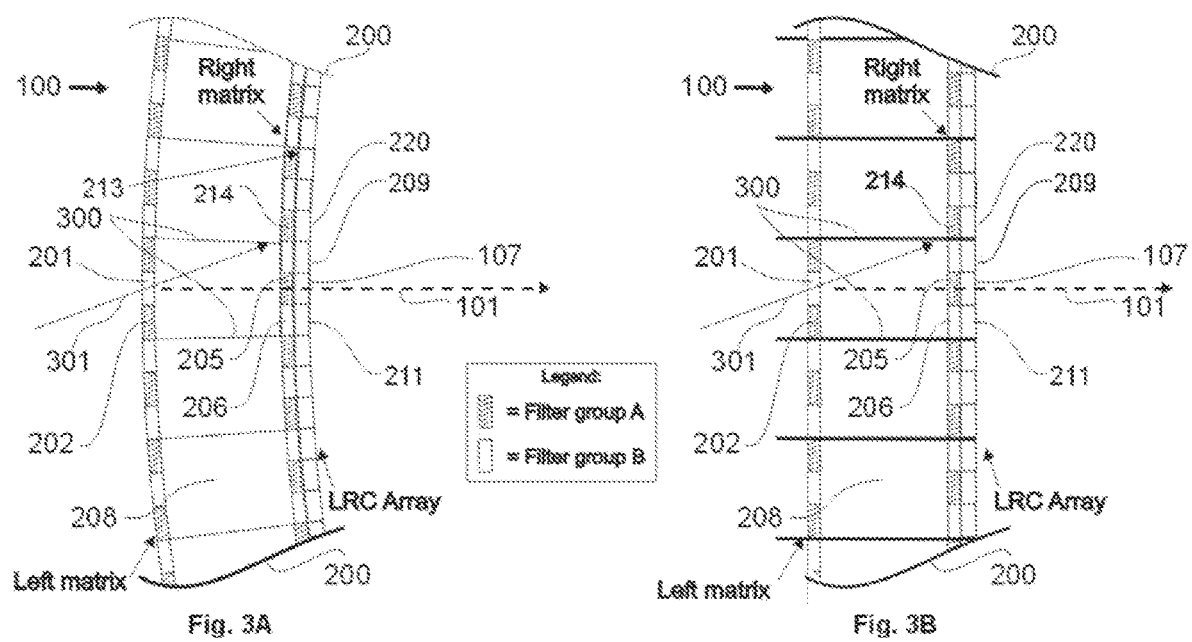

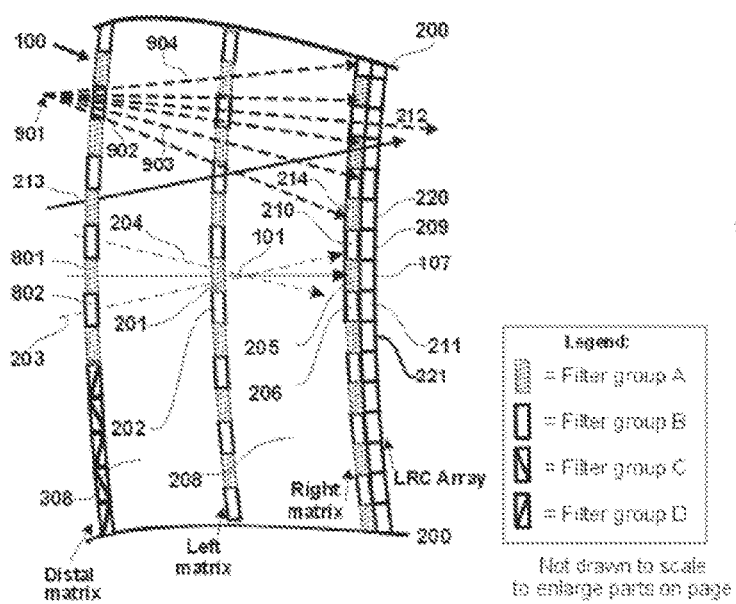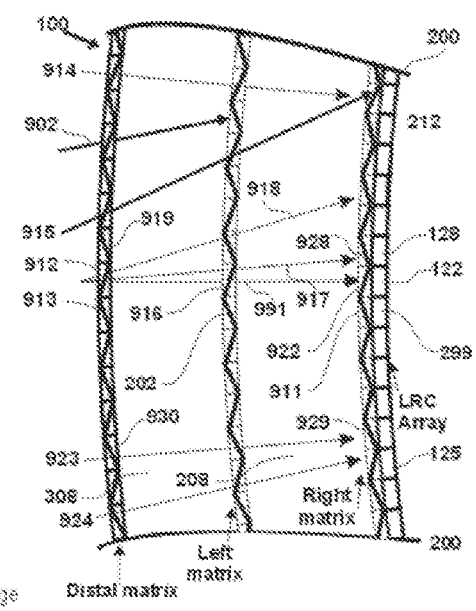
Fig. 9A
Fig. 9B

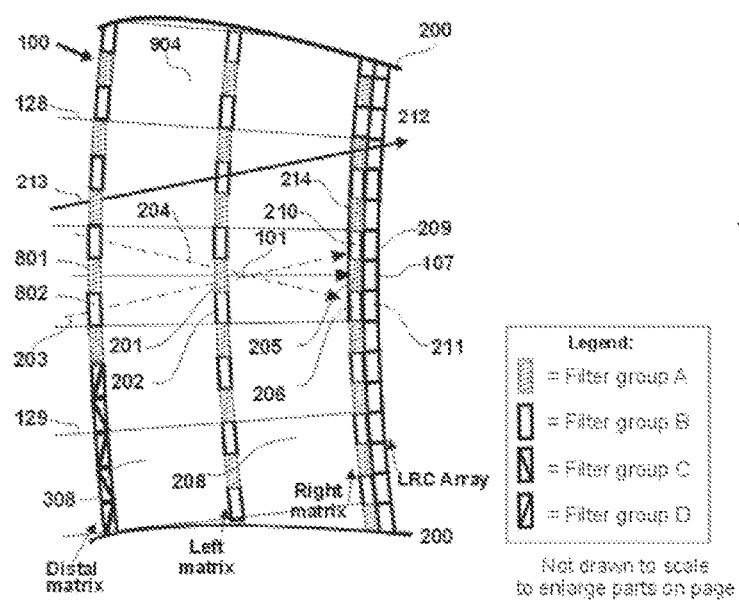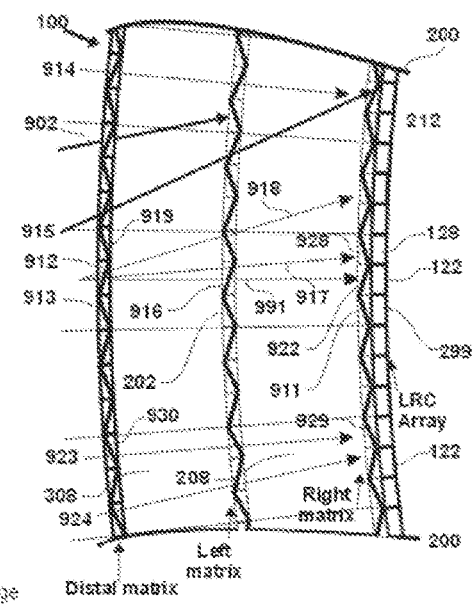
Fig. 12A
Fig. 12B

LIGHT MANAGEMENT FOR IMAGE AND DATA CONTROL

CROSS REFERENCE TO RELATED APPLICATIONS

This application is a Continuation of and claims full benefit of and priority to U.S. patent application Ser. No. 17/555,507 which is a continuation in part of and claims full benefit of and priority to U.S. patent application Ser. No. 16/896,987 filed Jun. 9, 2020 which is a division of U.S. patent application Ser. No. 16/438,132 filed Jun. 11, 2019 which is a continuation of and claims full benefit of and priority to U.S. patent application Ser. No. 15/784,225 filed Oct. 16, 2017 which is a continuation-in-part of and claims full benefit of and priority to U.S. patent application Ser. No. 15/400,040 filed Jan. 6, 2017 which is a continuation of U.S. patent application Ser. No. 15/201,584 filed on Jul. 4, 2016 which itself claims full benefit of U.S. patent application Ser. No. 14/215,199 filed Mar. 17, 2014 which itself claims full benefit of provisional application 61/801,708 filed Mar. 15, 2013.

All of these applications are entitled "Light Management for Image and Data Control" and all contents of all of these are referred to and incorporated herein by reference in their entirety.

BACKGROUND

A number of optical devices, e.g., television, video displays and digital processors have been developed that are capable of high-speed adjustment, high resolution and rapid image processing. Many are based on liquid crystal display technologies but numerous alternative and additive image-control technologies are now readily available. Some of these alternative and additive image-control technologies include quantum dot display technology, advanced light filters, transparent displays and, of course, LED (light-emitting diode), OLED (organic light-emitting diode) and TOLED (transparent organic light-emitting diodes). Other display devices are based on electronically stimulated material darkening. For example, Portman in U.S. Pat. No. 4,412,215 used electronically induced shifting of how much light can pass through an electrochromic film for displaying time on watches. Tabata et al in U.S. Pat. No. 4,401,984 improved these devices by reducing deterioration of the coloration of the colored display elements by applying a constant voltage between the first display element and the counter electrode while managing the value of the voltage with respect to charge transfer voltages, etc. Later, Defendini et al in U.S. Pat. No. 5,231,531 managed applied voltages to improve the basic electrochromic display device by using applied charges to counter/control effects of changes of temperature, accelerate the decoloration process and reduce degradation of the glazing system (by keeping variables in safe ranges).

Also recently, light management as a medical tool has, as a result of improvements in these and other technologies, progressed in recent years as extensively detailed in the parent patents to this one. However, a plurality of co-pathological conditions that together make undistorted, clear and bright vision challenging have typically been dealt with in a manner that is not conducive to perceptual fusion of complex visual fields. Although both fixed and worn display devices are being improved at a staggering pace and means of measuring eye-movement are also becoming more precise, for people suffering from a number of conditions relatable to the eye and/or eye movement, not much has changed since the background was written for the above listed previous applications. Thus, these unmet needs are dealt with herein by managing one or more of the nature, wavelengths, intensities, directions, locations and patterns of light provided to the eye in concert with a number of sensory elements and display embodiments.

Further, new advances in contact lenses and contact lens manufacturing also facilitate implementation of concepts and technologies described in patent applications that are parents to this one. Thise include using contact lenses in place of, or in some cases in combination with, worn glasses, worn displays, worn filters and/or similar components that are not worn. Recent advances that enable the highly customized 3-D printing of contact lenses (including the pulsed laser curing process used at The University of Arizona described in their Case ID: UA18-092 found at https://arizona.technologypublisher.com/tech/3D_Printing_Contact_Lens) make even highly complex and user-specific lenses both possible and ultimately cost effective.

Also, recent advances in smart contact lenses have made possible concepts that were previously confined to science fiction. These, like ordinary contact lenses, are worn on the cornea but have additional abilities. They may be based on conventional contact lenses or scleral contact lenses or somewhere in between. Scleral contact lenses are bigger than ordinary contact lenses. These larger lenses sit on the sclera and create a tear-filled area outside the cornea. The larger footprint makes these more positionally stable than the smaller contact lenses. Implanted (in or on the eye) components can perform similar or identical forms and are included in the embodiments of the current invention. However, whenever practical the less invasive forms are preferable.

Barr et al in U.S. patent application Ser. No. 15/867,394 introduce photovoltaic (PV) layers in windows that, unlike typical solar cells, absorb and convert to energy only ultraviolet (UV) and infrared (IR) wavelengths. Thus, since they allow the full visual spectrum to pass through the medium it allows the collection of solar energy without significantly obscuring the view therethrough. In their U.S. Pat. No. 10,403,774 they explain what is in concept surprisingly simple (and brilliant). The technology for removing selective wavelengths and converting those selected wavelengths to energy was prior art. However, they cleverly selected only wavelengths that we wouldn't miss like IR and UV using state of the art processes.

BRIEF SUMMARY OF THE INVENTION

Parent patents to the current invention invented means to protect and improve human vision by managing the light that entered the eyes. In terms of form factor, adjusting these concepts to more challenging applications required new concepts added to the old.

There are many complex devices involving cameras and computers to, for example, darken areas of spectacles to block headlights. However, particularly for contact-lens type applications, the required processors, on board power, camera, etc. are both problematic and inadequate. It is an object of the current invention to provide at minimum a surface imminently amenable to miniaturization that is capable of, even without a processor or power supply, improving vision in these and multiple other ways.

It is an object of the current invention to provide light management to the eyes in applications where the current invention is in a tiny contact lens with no processors needed all the way up to a highly processor-driven window or billboard.

E.g., one sub-object of the current invention is a contact lens that requires no power or processing yet protects and enables visual perception selectively and in real time in a media with no moving parts.

It is also an object of the current invention to integrate with additional processing and power means to provide extended functionality.

BRIEF DESCRIPTION OF THE DRAWINGS

FIG. 3A describes an embodiment with another form of angle of incidence limiting components. that can favor, for example the passage of non-normal light.

FIG. 3B Illustrates both a non-curved 100 and blinders like the two indicated by 300. Thus, this figure, like, for example FIG. 8B and FIG. 12, includes two forms of angle of incidence-limiting components operating additively and simultaneously in the same assembly.

FIG. 7 is adjusted to take into account the absorption of certain wavelengths of light by the cornea, lens, etc. before the light ever reaches the retinal chromophores.

FIG. 9A adds, to the previous illustrations an additional layer identified as the distal matrix which provides additional power and precision in its function as an angle of incidence limiting component. It is also representative of the many additional layers that may be added.

FIG. 9B is a image of the next layer of 100 that is located behind the layer of 100 that is illustrated in FIG. 9A.

FIG. 12A is, like FIG. 9 adds (compared to FIG. 2) an additional layer identified as the distal matrix. It also includes blinders like 128 and 129. Thus, this illustration also includes multiple forms of angle of incidence limiting components.

FIG. 12B illustrates the slice of 100 and that is located behind the slice illustrated in FIG. 12A.

DETAILED DESCRIPTION OF THE INVENTION

Figure 1A:
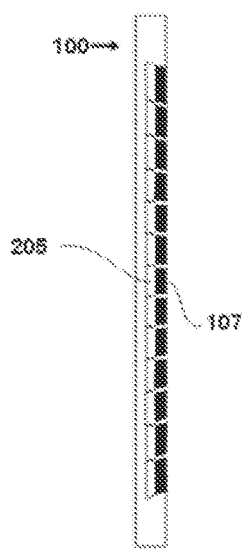
FIG. 1A is a cross-sectional drawing of a device, 100, having light controlling elements like 107 that manage what light is admitted to the eye in a manner approximately responsive to the magnitude of the light striking a sensor like 205.

In the specifications for applications that are parents of this one which are incorporated herein by reference, much has been said regarding light controlling elements such as Light-Directing Elements (LDEs). Some LDEs have included electro-optic light-guiding elements, beam splitters, gate arrays (including but not limited to the very common liquid crystal elements, shutter glasses, applications thereof, mechanically gated gate arrays, micromirror arrays and any component for adjusting the transit of light to the eye.). Many of these same technologies, in see-through light controlling element embodiments, can be used as light restricting components (LRCs) to limit passage of heat and/or light (e.g., by temporal or partial blocking or redirection of at least part of the light) having certain (often undesirable) path vectors, certain intensities (particularly with respect to instant and/or locational intensity need of the user), certain polarizations and certain wavelengths. Other LRC light controlling elements applicable to the current invention include filters or other elements for restricting portions of light to include selected categories of light e.g., sensitivity maxima wavelengths (SMWs, wavelengths that the eye will be particularly sensitive to), certain magnitudes of intensity (optionally responsive to the condition of the user who will receive the light), wavelengths of light that are essentially invisible to the human eye and light that has certain polarizations. Other LRC technologies applicable to the current invention include photochromic, electrochromic, thermochromic, micro-blind and other suspended-particle devices as well as any components that adjust the passage of light through or reflected by them responsive to the nature of that light (e.g., its intensity, wavelength, heat component, angle of incidence, etc.). In the assembly of FIG. 1A we see arrays of sensors like 205 and LRCs like 107 so that light passing through 205 and then 107 can generate a charge from 205 to the LRC 107 causing the LRC to darken (or lighten as an option as will be seen later herein) and allow less light through. In some embodiments, and a photochromic element serving the functions of both 205 and 107 is such an example, the function of the sensor and the LRC can be a singular element and this is a consideration for many embodiments.

Also, another type of light gate may be effected wherein a portion of the user's field of view (FOV) may be selectively dimmed (or, by variance of charge applied, optionally brightened) by electrochromic (and any other of the forms of LRCs) to manage light access to the eye and, in some cases, to capture operating energy for the device and/or image information of the user's FOV. Also, SMWs, in an embodiment that draws its power and/or direction from spatially specific intensities or wavelengths, define narrow bandwidths that, if unimpeded, allow good vision therethrough even if they convert many visible wavelengths into energy. This enables broad expansion and efficiency improvements to Barr et al.

Light controlling elements like LRCs can use materials for managing the transit and/or paths of light (e.g., photochromic, electrochromic, thermochromic, micro-blinds, liquid crystal arrays, micromirror arrays, filters and any suspended-particle devices applicable to such light control) can be used in assemblies applicable to the current invention for a number of perception-enhancing and cognitive prosthetic applications. For liquid crystal elements, conductive polarizers are preferred to simplify discrete passing of sensor charge to them and circuit completion.

Some of these light controlling elements (e.g., photochromic and thermochromic require no separate sensor element (and no required external power) to make the passage of light through the LRC to the eye responsive to brightness.

Many light controlling elements used as LRCs (e.g., adjustably transmissive elements like electrochromic components (also called switchable material components), micro-blinds, micromirror arrays and liquid crystal arrays) are usefully responsive to the application of electric charges to a) control how much light is absorbed or reflected at certain locations, b) to speed up transitions and c) to keep the LRC elements within their safety ranges (e.g., applying a control current for stabilizing). All of these adjustably transmissive elements have now (particularly since the important work of Defendini et al mentioned above particularly in regard to electrochromic components) become well-known practice. The polarization-based control (responsive to the application of an electric charge) of the transit of light through liquid crystal arrays is also well understood and is the widely used basis for Liquid Crystal Displays (LCDs). Micromirror arrays are electronically controlled to determine how much light reaches a destination based at least partially on which portions of that light are diverted away from the destination and for how long.

Many electrochromic assemblies utilize solid-state polymers intercalated with mobile ions, such as ethylene oxide, saturated with lithium chlorate as the electrolytic layer. These commonly include thin transparent electrode layers encapsulating the redox-active material, electrolyte and electrochromic material. These can range from approximately transparent to highly darkened. In embodiments where electrochromic layers have a total thickness of about $\frac{1}{50}^{th}$ of a human hair or less, applied charges magnitudes (either positive or negative) of about 2 to 5 volts are typically more than adequate. Of course, along with other LRC types, any electrically controllable light controlling element is applicable to the current invention. For example, electrochromic LRCs in any form (including but certainly not limited to laminated and "solid" forms like electric charge-adjusted metal oxides e.g., tungsten oxide, $WO_3$ and organic electrochromic materials e.g., viologens) can be used to selectively reduce transmission (or, for example in the case of reflective hydrides, increase reflection away from the eye) of heat and/or light through certain locations in an assembly.

Whether LRC light controlling elements are reflective (removing light by reflecting at least some of it away), absorptive (generally or frequency-specific) or otherwise occlusive, they will, when less light from them will now reach the eye, often be referred to as "darkened" or made "darker" herein even though the color of the LRC may be unchanged. It is a common terminology and should be understood to mean that less light is reaching the eye that is looking at that LRC. Similarly, when more light is allowed to pass from an LRC to an eye, we often speak of that LRC being "lightened" or "lighter". The meaning will be understood by all skilled in the art and tolerance with such useful and efficient phraseology is gratefully appreciated.

Figure 1B:
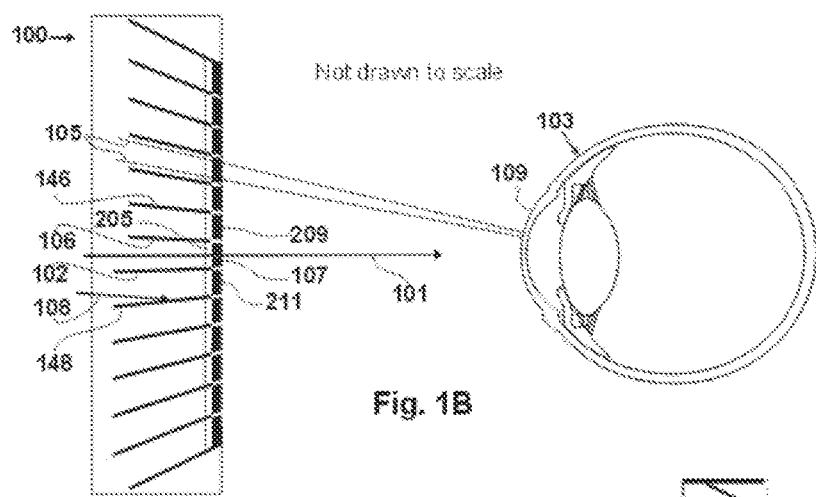
FIG. 1B is a cross-sectional drawing of a device, 100, having one form of angle of incidence limiting components (that may appear to look like blinders), like the one bounded by 102 and 106 (since this is a cross-sectional view) that manage what light is admitted to the eye, 103, in a manner approximately responsive to the origin of the light.

Typical sensors and applicable energy-harvesting elements (e.g., photovoltaic or PV elements):

Barr Et al in U.S. Pat. No. 10,403,774 discloses use of a photovoltaic assembly to, like most PV cells, absorb light and convert it to usable electricity. However, they absorb selected wavelengths that, for a given application, are least likely (or not likely at all) to be missed by humans. Thus, with visible wavelengths passing through unaffected, these PVs appear transparent to the eye. For example, if you place this PV cell between a light-emitting display and a viewer, the PV cell can be configured to absorb ultraviolet light and/or infrared light neither of which is likely to be missed by the viewer of the display. In fact, by largely removing only these possibly retina damaging wavelengths while allowing wavelengths in the human visual range (which is approximately 380-740 nm; plus or minus 20-90 nanometers depending on, or so it seems, who you ask and the instant phase of the moon), the eye is protected. Thus, "desired wavelengths" transit the PV cell normally allowing good vision and some of the PVs charge is used as a signal to an LRC to manage how much of that transiting light makes it all the way to the eye. Also, some of that PVs charge can be used to power other components where practical. Further selectivity of wavelengths that are going to 205 in FIG. 1B is representative of any kind of light sensor. In the preferred embodiment 205 is effectively transparent and is a selective wavelength PV. If 205 is a type of sensor that is capable of multiple modes (e.g., color and/or degrees of transmissiveness), then in at least one mode it should be highly transmissive and allow clear vision through it. In many but not necessarily all embodiments 205 is effectively some kind of a photovoltaic cell (PV cell) or any device that converts some of the light it encounters into electricity. Typical solar light-to-energy elements are often silicon that is doped with elements to modify the behavior of electrons or holes. CdTe (cadmium telluride), CIS (copper indium diselenide and gallium arsenide (GaAs) are also often used in PV cells. There is also a growing body of materials that allow a great deal of product selectivity in the process of sensing light/ heat and converting it to some form of energy.

One embodiment of the current invention is a transparent light-sensitive section; and a light controlling section; wherein at least some portions of said transparent light-sensitive section are operably connected to at least some portions of said light controlling section; and wherein said transparent light-sensitive section is configured, when light passes through a portion of said transparent light-sensitive section on a way to the eye, to stimulate a portion of said light controlling section to adjust passage of light through a nearby portion of said light controlling section.

All of these light controlling elements are applicable to the current invention in a number of ways.

Figure 4A:
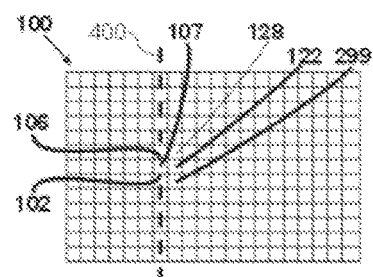
FIG. 4A describes an optional appearance of 100 from the perspective of the eye, 103.

For example, and FIG. 1A is a cross-sectional view of the assembly 100. 100 has a transparent light-sensitive section on the left and a light controlling section on the right side of FIG. 1A. LRC 107 (which can be electrochromic, liquid crystal or any other form of light controlling element) can be seen as an element of the light controlling section and 205 is a see-through sensor located at, near or against the LRC 107. In the most typical and preferred embodiments the activation level of LRC 107 is determined by the magnitude of the output of the sensor 205. FIG. 1A provides a cross-sectional view of the assembly 100 and thus, for different embodiments, these may, from the perspective of the eye 103 (whose relative position may be seen in the slightly different embodiment illustrated in FIG. 1B), look like FIG. 4A (or FIG. 4B, FIG. 4C, FIG. 4D or any other array of shapes). To help with orientation, the vertical dotted line, 400 in FIG. 4A, is illustrative of a plane (that is approximately parallel to the ocular sagittal plane) of cross section used in the cross-sectional view we see in FIGS. 1A and B as well as FIG. 2 and other figures as well. FIG. 4A, from the perspective of the eye 103, illustrates the shape of at least some of the components of FIG. 1A as an array of rectangular areas. In embodiments where 107-like LRCs are significantly more proximal to the eye than other LRC components (like 205; a gap may exist between 205 and 107 like 208 in FIG. 2A) in 100 (as it is drawn in FIG. 1), the rectangles of FIG. 4A can appear to be, from the perspective of the eye, an array of potentially see-through rectangular 107 LRCs while other components like 205 (at least as drawn in this example illustration) are more distal to the eye (and, thus, behind 107 so not shown in FIGS. 4A, B and C).

Figure 4B:
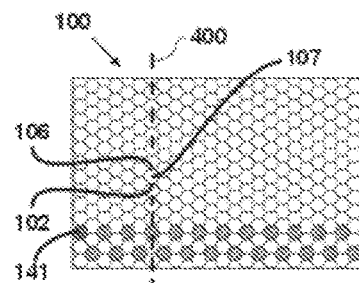
FIG. 4B describes another optional appearance of 100 from the perspective of the eye, 103.

Drawing note: Some embodiments like FIG. 2A, FIG. 3A, FIG. 8A, FIG. 8B, FIG. 9A, FIG. 9B and FIG. 12A and FIG. 12B are drawn as cross sections of curved embodiments. Flat versions, of course, are also applicable embodiments. Similarly, embodiments like FIG. 1 or FIG. 3B are drawn as flat and, of course, curved embodiments are also applicable embodiments of the current invention. Sagittal slices of curved embodiments like FIG. 2A, FIG. 3A, FIG. 8A, FIG. 8B, FIG. 9A, FIG. 9B, FIG. 12A and FIG. 12B are simple to present due to symmetry. A 90-degree rotated version of those cross-sectional views can be more challenging to communicate for curved embodiments. However, just as the earth is not flat but seems adequately so when considering a small area, drawings like all of the figures in FIG. 4 and FIG. 10 are more than adequate for explaining the concepts thus discussed since we typically tend to consider a relatively small area around the optical axis. However, when we zoom back to see the full three-dimensional view of the full assembly in perspective, just remember that it can, when considered in full scale, appear more like FIG. 4E (however, the difference between FIG. 4A and FIG. 4E is exaggerated to make a visually obvious point). When cartographers attempt to provide a flat paper map of even one hemisphere of the earth, they have to go through rather drastic warping and off-scale machinations particularly towards the periphery. So, herein, in these drawings we default to flat drawings with the understanding that those skilled in the art understand the dimensionality.

Although the plate 100 in FIG. 1A can be curved (like the plate in FIGS. 2A and 2B), it can also be flat and very thin as it is illustrated in FIG. 1A. In this alternative planar and form it will typically contain a planar array of sensors with each such sensor matched to an LRC in the similarly planar array of LRCs shown in the illustration of FIG. 1A. While these are shown like simply matched pairs with an LRC activation (reduction in light passed) responsive to the output of its matched sensor, it will also be common for other embodiments for these LRCs to (in addition to being responsive to their closest matched sensor) also be responsive to the output of nearby sensors (like 205 and close to it). This can be effected either by a processor control which is appropriate in some embodiments and/or by transparent conductive (e.g., ITO) additional interconnections between an LRC and nearby sensors. Such "hard-wired" logical connections (which require no necessary processor control) between such nodes either direct or via electronic components like resistors, capacitors, etc. as discussed herein use well known node networking processes (including simple and, for at least one embodiment, multi-level biomimetic neural networking). In one such embodiment with rectangular LRCs (as seen in FIG. 4A) each LRC is electronically connected to its matched sensor (like 107 to 205 in FIG. 1A) as well as, via transparent conductors (which may additionally function as or contain resistors), the sensor above, below, to the left and to the right of it. As is common in such cluster approaches, the cluster connections to sensors associated with the other LRCs around 107 will normally overlap. Resistance in connections is typically used to make an LRC more responsive to the closest sensor than to one more distal to it. One intentional consequence of this connectivity of a sensor with not only its most proximal matched LRC but selected nearby LRCs as well (typically adjusted by electronics and/or processors as discussed) is a "feathering" of light reduction around the immediate area of the sensor (in addition to just at the location of that sensor). Thus, a bright spot in the field of view (FOV) of the eye whose light excites one sensor, like 205, more than others will result in not only darkening of an LRC associated directly with that "most excited" sensor but will also result in a typically reduced magnitude of darkening around that point (sometimes referred to as feathering around a point) consistent with common practices in optically managing glare.

Such "feathering" of node connecting is, of course, also applicable in the reverse. E.g., one sensor, like 205, may be connected directly (and normally with low or no avoidable resistance in the connection) to its nearest LRC, 107, as well as to some of 107's near neighboring LRCs.

It should be noted regarding FIG. 1A that the apparent separations and presumed divisions between sensors like 205 and other sensors above and below 205 (we can't see, in this cross-sectional view, the ones to the left and right of 205) do not necessarily require that the sensors be spatially or electronically separate elements. While that is a very real embodiment, in some embodiments the first array of sensors (seen as the left side of FIG. 1A looking like a vertical array of slightly vertically separated quadrilaterals) will, in fact, be a continuous medium. Consider, for example, the "feathering" example in the previous paragraph where one sensor, 205, is connected to an LRC, 107, as well as several neighboring LRCs. Let's use the hexagons inside the perimeter 401 in FIG. 4C to describe both some connections and why separations between many components aren't required. First, in an embodiment where the components are separated (as in the previous paragraph), sensor 205 (behind 107 in FIG. 4C) is connected to LRC 107 (located on our viewing side of the central hexagon, 107) either directly or by transparent traces (e.g., indium tin oxide or ITO, a transparent conductor). In one embodiment that same sensor, 205, is also connected to the other LRCs seen as the 6 hexagons surrounding 107 and within the perimeter 401. Typically, in a no-processor embodiment, the connections between the sensor, 205, and the closest LRC, 107, and the central LRC, will have less resistance than the connections between that sensor 205 and the 6 LRCs surrounding 107 (within the perimeter 401). This is so that the LRC most affected will be the the one nearest (and often touching) the sensor 205. The surrounding LRCs, either by thinner ITO traces or embedded resistors (or, in processor-included embodiments, by processor-driven regulation) will typically get less signal (less charge from the photon-activated sensor). Of course, more extensive feathering can exceed this simple example.

Now, let's talk about those separations between components. Leave all the ITO connections (and, where applicable, resistors or other current or voltage controlling elements) just where they are in the above example but remove the separations between the sensors that are seen in FIG. 1A (they are now a continuous surface or batches of components arranged into what can be addressed as a continuous surface). Consider, for this embodiment example, the sensors now to be an unbroken surface layer (the left side of 100 in FIG. 1A). One example surface layer component is a wavelength-selective photovoltaic layer (PV) as proven, publicized and eminently popularized by Barr et al. The resistances involved are, of course, determined by both the resistance of the sensor materiel and the thickness of that surface layer as well as the paths of connections between "components". Sheet resistance can, of course, also be adjusted by modifying the resistance of that surface layer (e.g., by thickness adjustment and/or and/or layer addition or switching of a resistive layer's material to one with a different resistance).

A preferred non-processor selecting means for which "operably connected" LRC will "get the message" is the electrical path of least electrical resistance. That will often be the shortest physical path between photon contact at the spatial locations of what we've called, just for example, 205. This connection may be via transparent trace or direct layer contact (in some embodiments there will be significant distance between 205 and 107 but for this example let's consider the proximal case i.e. direct contact of in-contact layers). Let's call the resistance of that shortest path (and the path of least resistance) R1.

Figure 4C:
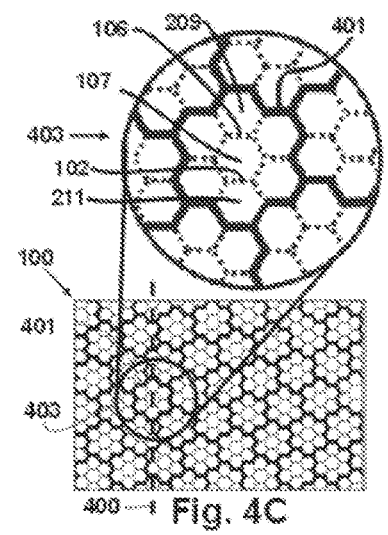
FIG. 4C describes another optional appearance of 100 from the perspective of the eye, 103.

The next shortest paths would be the approximately equal distances between that same point of photon contact (at the center of the distal surface of spatial location we've been associating with 205) and the spatial locations we've been describing as the 6 hexagons surrounding the central hexagon within the perimeter, 401, in FIG. 4C. Since this is a longer path, its resistance, R2, will normally (unless resistance of connections between components or other measures are put in place to change this) be greater than R1 and the LRC area associated with 107 would receive, in the normal case of a plurality of photon contacts, a stronger electrical signal than its nearby LRC areas. It is true, of course, that the charge could also follow the surface path of the sheet resistance of the outer (distal to the eye) surface and then take an eyeward path towards the electrical reception/attraction of a more distant LRC. However, unless the distal surface conductive thickness is very large inducive of a low sheet resistance (not normative for thin sheet coatings) this is not the case (and if some variant embodiment does have such an issue it should, unless it has its own purpose, be corrected as can easily be done by anyone skilled in the art e.g., by adjusting resistances.). Thus, it is not a requirement that the sensor components be arrays. They can be continuous surfaces or at least unbroken contact areas. And thus, in claims, the term "array of light sensitive elements" should be interpreted to include areas that, due to the nature of electronic resistance-based path selection, behave as arrays of effective light sensitive elements (and vice versa).

As is the case for sensor arrays/areas, it is also not a necessity that the "array" of LRCs be separated (and for the same basic reasons). Here, as in the above example, it is the path length and the resistance along that path that determines which portion of the LRC array/area (the right side of FIG. 1A) gets the most signal or charge. Though some embodiments (e.g., liquid crystal LRC arrays) are confined by design to physically separated arrays, others, like for example sheets of electrochomic materials, are not required to be cut into tiny pieces and individually addressed as array locations. Also, even liquid crystal arrays can be connected to other components by conductive layers that also follow the well-known rules of resistance-based path selection thus allowing even these to be treated as smooth surface components. This can be a decided advantage in both reduction of trace overhead (and connection failure issues) and elimination of diffraction and loss issues that come with very small individual apertures associated with excessive trace density.

R can, of course, if it is ever needed, also be increased by an additional conductive but resistive layer as part of that same sensor surface layer or proximal to it (either on the side of it that is more proximal to the eye or on the side or it that is more distal to the eye).

Interestingly, a charge can be applied to all or portions of the LRC side (e.g., an electrochromic area) to make it more transmissive. In some embodiments this will be used to provide (temporally or permanently) maximum brightness either at certain points in the field of view or globally. In embodiments using processors, certain points can be maximized for transmissiveness by processor. In non-processor environments this is managed by the resistance of wired components. This also provides a means for, for example, the user/wearer of glasses having, for example, an ITO layer to adjust the brightness of his field of view, by user adjustment of the general power applied to the electrochromic area.

Also, the resistance of the preferably transparent resistors and characteristics of any transparent capacitors involved are used (as they are an ordinary electronics) to establish a threshold (or "floor") of signal from the sensors below which the LRC will not activated and/or a ceiling sensor magnitude above which the LRC will not respond. This is further developed herein but will already be understood by those skilled in the art.

Thus, although additional embodiments described below add efficiency, this embodiment reduces extremes of brightness to the eyes from bright portions of the FOV even in harsh and drastically as well as rapidly changing visual environments. It is also, even in embodiments requiring no external or battery power, designed to effectively establish for the eyes of the wearer a desired level of dark adaptation (the benefits, light levels, eye-sensitivity and operational logic of which are described at length in the preceding patent applications for which this is a continuation). It does this by at least regionally reducing light to the eyes from the FOV when in bright light (responsive to high signal magnitude from photovoltaic sensors which, along ordinary transparent conductive traces and/or optionally controlled by on-board and/or remote processing, provides power to the LRCs which reduces light to the eye proportionately to that power). The aforementioned "floors" and "ceilings" effected by parts that require no processor are sufficient for the task. However, in other embodiments using processors, processor timing is preferably used to manage light to the eyes to achieve more complete (and even fully complete) dark adaptation over time and preferably within limits as explained in the parent patents to this one. And, when the wearer is suddenly in darker environs, it rapidly increases (responsive to the reduced sensor output) the light allowed to reach the now-accommodated eye (by reducing LRC reduction). Since LRC activation is responsive to the magnitude of the light striking the sensors, a rich gradient of adjustments between that ceiling and floor is also easily and naturally provided. With full dark adaptation the eye becomes 10,000 to 1,000,000 times more sensitive than at full daylight. Even when the adjustments on the assembly produces only moderate dark adaptation, the now dark-adjusted eye is many times more sensitive that an unaided eye that has been subject to varying and brighter lighting conditions. By establishing with these onboard components a ceiling (maximum LRC response to sensor output) and floor (the minimum sensor output threshold below which the LRC maximizes light throughput) either by processor control and/or simply by transparent electrical components between components or both, the chromophores of the retina are protected from oversaturation (i.e. insensitivity to light due to bright light) and a high percentage of photon-ready chromophores are prepared to respond to provide good vision even in sudden low-light conditions. The eye is quite capable of doing this all by itself except that the dark adaptation process takes 20 to 45 minutes which doesn't help much when you suddenly drive into a tunnel or try to see right after blinding headlights.

FIG. 1B adds "blinders". These are one form of angle of incidence limiting components. Which are configured to favor passage of light with at least one preferred angle of incidence; Blinders in any of these embodiments can be in the form of opaque, translucent, smoky, photochromic, electrochromic, liquid crystal or any other form of LRC element including filters. Some of the filter-based blinders include neutral density filters and blinders that remove sensitivity minima wavelengths, IR, UV and/or other wavelengths removed to make a given sensor like 205 or sensor type more or less sensitive to light that has passed through or reflected off of it. One example of blinders is illustrated by 106 and 102 which can be seen (in this cross-sectional view) as the top and bottom, respectively, of light channels composed in many embodiments of an LRC material (which can also be electrochromic) as will be discussed. However, other embodiments will use other adjustable LRC materials and/or fixed LRC materials (some of the fixed LRC materials include neutral density filters, wavelength filters, darkened translucent materials, opaque elements, etc.). In the adjustable LRCs for 106 and 102, the reduction of light passing through the material of these (106 and 102) channel walls will be responsive to the intensity of light striking a light-sensitive cell-wall and/or the magnitude of charge from the sensor or sensors associated with it (e.g., that activation level of the channel seen in cross-sectional view as 102 and 106 will be responsive to the magnitude of the sensor 205). In some embodiments combinations of different kinds of active LRCs as well as passive LRCs will exist in the same assembly. As will be discussed herein, this is particularly useful in dealing with implementer preferences and portions of the assembly that service areas of different retinal sensitivities (e.g., foveal, macular and extended retinal areas).

For blinders that are in themselves responsive to light striking them (e.g., photochromic), the brighter the light, the more they control them. For blinders that are responsive to electric charge, the stronger the sensor charge from an associated sensor that is sent to the charge-sensitive LRC, the stronger the LRC light reduction in response to the brighter light striking the sensor. (The polarity of these reactions, of course, can be reversed so that increased intensity results in reduced darkening.) It will also be common for such channel walls to also be responsive to the output of nearby sensors close to 205. This can be effected either by a processor control which is appropriate in some embodiments or by electronic interconnections between nodes.

Each subunit made up of a channel, sensor and 107-like LRC can be thought of as a node of a matrix of these nodes. Such "hard-wired" logical connections between such nodes either direct or via electronic components like resistors, capacitors, etc. as discussed herein use well known node networking processes (including simple and, for at least one embodiment, multi-level biomimetic neural networking). This is further developed herein. Of course, in some embodiments both kinds of LRCs will be used in combination with each other.

For any of the many applicable LRC forms, they are, in the preferred embodiment, secured inside a transparent "plate" 100 (which may be plastic, glass or any essentially transparent material and which, as seen in 100 in FIG. 2, can also be curved; the spheres inclusive of such semi-spherical surfaces of 100 and the sphere inclusive of the semi-spherical surface of the cornea will often be essentially concentric).

For embodiments that do involve blinder LRC walls like 106 and 102 in FIG. 1B, these LRCs can have many applicable shapes. For example, a quadrilateral channel embodiment is described from the perspective of the eye in FIG. 4A. The ceiling 106 and the floor 102 of that channel are similarly labeled 106 and 102 in both figures.

These channels in FIG. 4 are all illustrated from the perspective of the eye and through which the eye looks. It should be noted that the walls of, for example, such a quadrilateral "channel" do not have to be fully populated or even contiguous (i.e. there could even be four planar segments at 90, 180 and 270 degree angles to 102 or they could be fewer of them with gaps between them rather than some or all of them intersecting). Thus, in an example embodiment using the quadrilateral assembly suggested in FIG. 4A, the LRC identified as 102 in both FIG. 1B and FIG. 4A is the "floor" of a quadrilateral channel. 106 is the "ceiling" of that channel. In some embodiments there will only be a ceiling to protect primarily from bright overhead light. The lateral (left or right) sides of the channels are not shown in FIG. 1B since the cross-sectional view of FIG. 1B is between the side walls (as is indicated by the dotted line 400 in FIGS. 4A, B, C and E.

In the preferred such embodiment of this illustration, the portion of each such quadrilateral channel that is most proximal to the eye is the rectangular smaller end of an expanding channel as can be seen the leftward divergence of the lines for 106 and 102 and their positions of placement in FIG. 1B. Thus, in that embodiment, the rectangular distal end of each channel is typically slightly larger than the rectangular opening at the proximal end.

FIG. 4 views from the proximal end; the end of the array/surface closest to the eye and thus we are normally looking, in FIG. 4, at the proximal side of an LRC array. The dimensions of the channel are managed, as will be understood by those skilled in the art, to minimize the eye seeing the surface of the inside of these channels (thus providing the radially viewing eye a largely unobstructed view of the FOV through these expanding rectangular channels). In the preferred such embodiment, all existing (again, not all four sides need to be present) sides of the rectangular channel are typically made of the same kind of LRC material as 102. However, for example, the "ceiling" or the "floor" of a channel (presuming the user is vertical) will, in some embodiments, be more responsive to the signal (or it may receive more of a charge from a processor or sensor via reduced path resistance) so that bright sunlight from above is more completely reduced. The "ceiling" may darken more than other sides to maximize visibility of darker things on the ground. Also, left and right sides of a channel (2 of each in hexagonal examples like FIG. 4C) may be less responsive than ceilings and/or floors. Again, these tweaks can all be done in assembly and/or by managing charge passing between sensor and LRC by static elements (like resistors) or intelligently by a processor.

Alternatively, in another embodiment, 106 and 102 in the cross-sectional view of in FIG. 1B may be seen as the ceiling and the floor, respectively, of a hexagonal channel (as seen in FIG. 4B) which, in the preferred embodiment, is similarly expanding as it becomes more distal to the eye (each such channel normally providing for the eye a fraction of a steradian of FOV).

The similarities between discussion of a hexagonal channel and a quadrilateral channel will be so obvious to those skilled in the field that they will not be tediously discussed here. Of course, any other LRC shapes for multi-sided channels and/or LRCs like 107 (including but not limited to rounded channels, channels with one or more sides that are missing or reduced and grouped configurations like FIG. 4C) are applicable to the current invention. Regardless of the apparent shape of components from the perspective of the eye, these LRC channels serve similar functions as described elsewhere herein.

FIG. 1B illustrates one of many such LRC-based angle of incidence limiting components having an array of LRC elements like 107 (which as seen in this cross-sectional illustration is one of 13 vertically arranged LRCs shown—FIG. 1B is not drawn to scale and the sizes and numbers of elements are simply for ease of illustration and discussion) positioned in front of an eye, 103, having a cornea, 109. These LRCs (like 107) can be used in one embodiment to, responsive to control by any kind of controller (e.g., an ordinary processor, a controller assembly, smart wiring as described below and/or an ASIC chip with some or all components being printed and/or transparent), selectively dim the appearance of an area of the field of view (FOV) of the eye, 103, and/or enhance the perceived brightness of selected portions of that FOV by controlling the passage of light through those selected portions.

In one embodiment the LRC 107 is electrochromic which defaults to transparent responses to a low or negligible charge application. In another embodiment the LRC 107 is a node in a liquid crystal array (13 of which are visible vertically arrayed in the cross-sectional illustration of FIG. 1). Here, the application of a charge across liquid crystal node 107 results in a change of polarity in the liquid crystal thus modifying the transit of light therethrough. In the preferred liquid crystal embodiment, there is little or no restriction of light through a liquid crystal element like 107 when a zero or negligible charge is applied to it and the application of a charge reduces passage of light therethrough. That is, of course, only 1 preferred arrangement and numerous "normally black" LRC embodiments will be discussed herein.

However, consider any single light gate (like the LRC labeled as 107 of FIG. 1) that we want to use to manage how much light coming from a point-source emitter somewhere in that FOV (perhaps that point source is too bright and it is desirable to reduce its intensity on the eye) makes it to the eye by managing how much light proceeds from that point source along the vector indicated by the arrow 101 in FIG. 1B. While FIG. 1B is not drawn to scale, it is used here to illustrate that even the complete closing of a single gate like 107 does not eliminate all other light from that same point source. For example, consider light proceeding along a slightly downward vector indicated by the arrow 108. Ignore for the moment its encounter with an LRC (that LRC looking like 102 and that is drawn just below 102) that would, if not ignored here, block light following the vector 108). This light along the path of 108 has the same origin in the FOV of the eye as light following the path 101 (e.g., originating from the leftward intersection of the divergent vectors indicated by 101 and 108). In a healthy, focused eye such light (e.g., along the vector 108) can focus light along 108 onto the same location on the retina as the light whose path follows 101. (Note: although the angles of arrows 101 and 108 may seem similar, the paths of light that they represent are not parallel since they come from the same point emitter in the FOV.) The light encountering 107 along the vector indicated by arrow 101 has (as approximately drawn) an approximately zero angle of incidence (AOI). Thus, in this two dimensional figure (obviously extendable to a 3-D interpretation), the light arrives approximately normal to the assembly 100 and also (at least in some embodiments) normal to the cornea 109 resulting in maximum transmission and minimum scattering/reflection loss).

LRC 107 may thus fill the space best positioned to reduce brightness from that point (i.e. the point of the origin of the arrow 100 indicative of a vector of light) in the FOV (which is easily accomplished by configuring the electrical charge from 205 to power, or direct the power through an optional processor, the adjoining LRC 107). However, other light from that same point source (for example, light proceeding along the vector indicated by arrow 108) would (in the absence of the AOI-managing element that 108, in fact, encounters in FIG. 1) continue on to the eye where it would be focused back to the same point on the retina as 101. As a result (with the exception of exceptionally tiny shafts of direct sunlight, laser light and other parallel light all of which are found mostly in laboratory conditions where people don't live), blocking light from any single point source can't be fully accomplished by any single gate whose area impacts only a tiny portion of the light isotropically emitting from a point in the FOV. Thus, in previous spike-attenuating gate array (SAGA) embodiments in previous patent applications that precede the current invention, other nearby gates surrounding a gate (i.e. a gate that is on a path to be blocked) were also directed to manage passage of light.

For the same reasons it is useful in many embodiments of the current invention to activate the normally transparent LRCs that are near to (or surround) a normally transparent LRC that is receiving, from its directly associated PV element, a charge magnitude (signal) suggestive of the need to become less transparent in order to attenuate light passing through it. This is, for example, useful in managing passage of more than just the central beam of an expanding pencil of too-bright light whose divergent beam also hits more peripheral locations of the cornea only to focus right back onto the retina at the very same point (at least within the circle of confusion) where we wish to reduce the intensity of light coming from the same place in the user's FOV.

In processor driven embodiments, this is easily accomplished by a processor (or, as described above, an array of processors associated with an array of nodes) via transparent circuitry. Peripheral LRCs (those surrounding an LRC that is being directly activated by its companion PV element), will typically be activated less than the central LRC (the one in the middle and/or the one with the highest activation magnitude responsive to the most light received). This is implementer optional and adjustable and is analogous to the graduating effect of a bright spot removal process wherein "darkening" corrections (LRC actions) that are more peripheral to the central bright spot are gradually less pronounced the farther you get from that central spot (which creates a gradient reduction in effect which, as is widely understood, also helps reduce artifacting).

Such operations are also easily (or additively) managed in a processor-containing embodiment where the processor determines how much each LRC should be activated based on the signal from sensor(s) in some embodiments using an optional auxiliary power source (a power source not dependent on the output of the sensors). Alternative power sources include any form of externally or internally acquired energy as well as on-board (e.g., internal) photovoltaic components.

However, in a non-processor embodiment, this can also and alternatively be accomplished with preferably transparent conductive traces between, for example, the sensor element (e.g., PV) and any implementer-chosen number of peripheral LRCs. To effect the above-described gradient and to mechanically identify the charge to be passed to these peripheral LRCs (which will typically be a lesser charge magnitude relative to the charge applied to the central LRC) small electrical components like capacitors, resistors, etc. are used in wiring configurations commonly understood to effect at least one of a) a lower threshold below which such peripheral activation does not occur, b) a magnitude range of applied charge for when such peripheral activation does occur and c) a maximum magnitude above which such peripheral activation does not occur. This can be embodied as, for example, direct contact or transparent conductor connections between a sensor and the closest LRC and sensor connections to some of the LRCs that surround that closest LRC.

Another embodiment that requires no processor is an LRC array whose LRCs are connected (e.g., "chained") to each other by connections with a chosen resistance. Thus, a single sensor signal to that sensor's nearest LRC will also result in, via those resistive connections between the LRCs, a charge delivered to the nearby LRCs around that central LRC. Typically, the lower the resistance of these interconnections, the wider the "feathering" will be (the more peripheral LRCs will be adequately enervated to respond). The higher the resistance of those connectors, the less feathering (the smaller the circle of influence on the surrounding LRCs). A resistance allowing no current (or, alternatively, a lack of any conductive connection) to nearby LRCs would be a feathering of 0 (i.e. an completely discrete activation where one sensor activates one LRC).

When the LRCs are not separated "chiclets" as drawn but, instead, are a continuous surface (or when they are connected by a continuous surface) with a chosen resistance, the resistance of the path between the central LRC and its nearby neighbors determines, similar to the above discussion, the discreteness vs. feathering attributes of the processor independent arrangement and/or of a processor plus resistor network embodiment.

Similarly, the sensor array (drawn as the array of white quadrilaterals just to the left of the LRCs, like 107, in FIG. 1B) can be a solid, even smooth, surface. Consider a single photon striking a single point on a smooth sensor surface (e.g., of a PV or a conductive layer associated with a PV). Then, (presuming, at least just for simplicity of example, that this one photon has a measurable effect on the PV) the resistance between that sensor (i.e. that point on the surface area associated with the sensor where the photon struck) and its nearest LRC area (or the area of a conductive surface associated with the LRCs) will be less than the resistance between that same sensor location and LRC areas distal to that "closest" LRC (the one closest to the activated sensor area). Thus, even though smooth surface embodiments don't have the easy "Chiclet" visible separations drawn in FIGS. 1 and 2 for sensors, LRCs or both, they can be managed by the same principles. Materials and sheet thicknesses and sheet irregularities can even be selected to make the LRC area most affected be an LRC area that is not physically the closest (i.e. if it is the lowest resistance path). Nonetheless, a preferred embodiment for smooth surface LRCs and/or sensors, if for no other reason than manufacturing simplicity and precision vapor deposition control, will effect the strongest LRC response to the LRC area that is, in fact, physically closest to the point of activity (where that photon hit) on a sensor surface.

Beyond the resistive characteristics of these surface materials (whose resistance determines how many neighboring LRCs are activated and how much), the thickness of these and other layers also provides implementers with an easily managed resistance (and thus feathering) control in the form of thickness (since the thickness drives the sheet resistance).

Preference for feathering: Thus, for a single too-bright point in the FOV we prefer the embodiment where a plurality of LRCs at least partially block light passing through them.

It could correctly be argued, of course, that some feathering effect will happen anyway. Even with a single very distant (e.g., small in FOV) oncoming motorcycle headlight in an otherwise black FOV, the semi-isotropic emission of the filament assures that, while a direct-to-the-viewer's-eye photon along 101 in FIG. 1B would be stopped in its tracks by 107 (presuming it had enough travel companions along the identical path to evoke a response), still other photons with a less normal AOI would strike the other sensors around 205. However, these, due to scattering, biased surface reflection due to higher AOI, etc. have a lesser effect on more distant sensor areas and they can't be as easily controlled. In practice you virtually always need a controllable additional control and these elements and others that will follow help enable that.

Ideally, the LRC closest to the sensor (or, on any occasions when there is a difference, the LRC intersecting the path of the light) that is receiving the brightest light (particularly when it is above a threshold) is the most activated while the farther an LRC is from that sensor (or, when there is a difference, the farther an LRC is from the path of the light itself), the less it needs to be activated. This creates a graduated "border" or "feathering" that minimizes artifacting and phantom shapes but minimizes halos.

When no processor(s) are involved, this is best effected by each sensor providing some contributory signal to surrounding LRCs thus contributing to the total activation of each of those LRCs but typically (e.g., w/resistors between the source sensor and each LRC not coincident with the location of the sensor) such LRCs receive less signal/charge from more distant sensors (or, when there is a difference, when such LRCs are farther from the path of that light).

One embodiment can be described thusly: a first array comprised of see-through light sensitive elements; a second array comprised of light controlling elements; wherein said see-through light sensitive elements are operably connected to at least one of said light controlling elements; wherein said first array and said second array are configured so that the light passing through at least one of said see-through light sensitive elements, as the light proceeds from said first array towards said second array, stimulates a signal to at least one of said light controlling elements; wherein, responsive to said signal, at least one of said light controlling elements is configured to control how much light is allowed to pass through said light controlling elements.

While this works well (a bit like blocking a tiny oncoming headlight with a large thumb rather something smaller like a pencil eraser which is closer to the size of the apparent size of the headlight to be blocked) and though it describes an effective embodiment of the current invention, it can, if overdone, also reduce the visibility of objects that are very near the bright objects being dimmed. An additional alternative embodiment is now discussed.

Figure 2A:
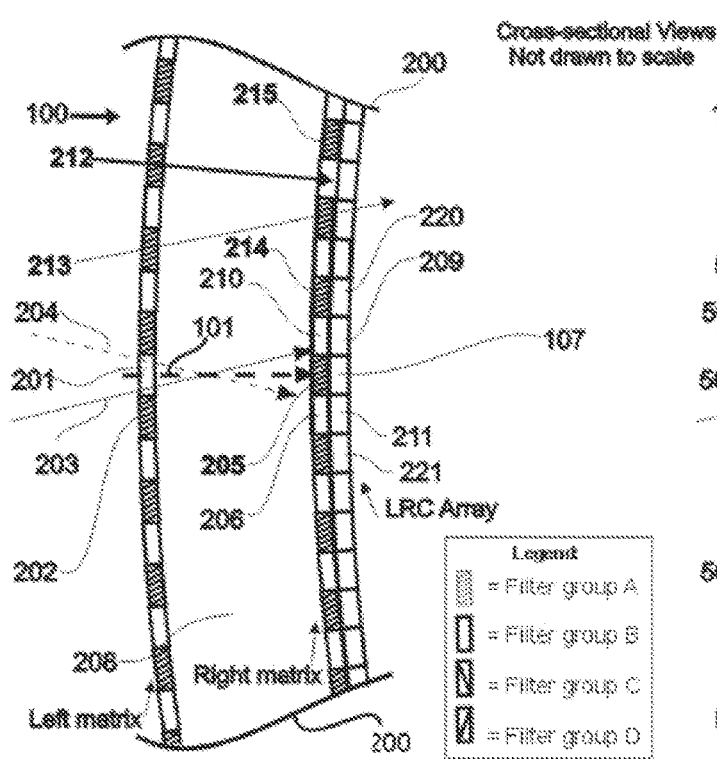
FIG. 2A illustrates another form of angle of incidence limiting components. By defining paths by the locations of different wavelength sensitivities in the left and right matrices, this figure illustrates a highly miniaturizable angle of incidence limiting component. This illustration also illustrates the use of alternating filter characteristics to selectively favor passage of light having an angle of incidence (AOI) that is advantageous.

Other embodiments replace or augment other forms of managed AOI and/or other light-characteristic selectivity with multi-filter AOI-selected components. Another form of angle of incidence limiting components are illustrated in FIG. 2A. For example, 201 is a filter and/or PV (i.e. a photovoltaic element; preferably one that takes and converts into electrical power only light from one or more selected bandwidths of wavelengths from light that enters a filter element like 201). PV power generation in elements of the "Left matrix" (as the layer most distal to the eye is identified in FIG. 2A) will be desired by some implementers. Others may depend on elements in the Right matrix (identified in FIG. 2A) (e.g., being PVs) to generate power. And this power is also a signal indicative of the nature, including origins, of light currently coming from the FOV. Some implementors may use a completely separate layer of PV(s) for power generation. Some will use both the left and right matrices and even a separate power generation PV layer (not shown) to gather power for the assembly (which includes optional processor(s)). There will also be many applications where an element of the right matrix will be made up not of just a PV but, instead, it will be a combination of a filter and a PV or other solar conversion to power device. For example, 205, would, in this undrawn embodiment, be the combination of a filter that removes some frequencies before the light reaches the sensor (to it's right in the orientation of FIG. 2A) which generates a charge/signal that then goes to at least one LRC and then on to the eye. This is especially helpful in balancing color perception of what passes through 100. As explained herein, certain PVs inject color which would otherwise bias the color perception (e.g., tungsten trioxide, WO3, would inject a bluish cast).

However, it's easier to explain one thing at a time so, looking at FIG. 2A for just one example embodiment let's think of power (and, not inconsequentially, signal) generation coming only from the light-sensitive (e.g., PV) elements on the right matrix (which is just to the left of the LRC array as both are labeled). This power (from a right matrix element like numbered examples 205, 206, 210 and 214) can, when desirable, serve (particularly in a non-processor-used-embodiment) as the sole signal to control how much light may pass through at least one operably connected LRC and continue on to the eye. Numbered examples shown include LRC 107 operably connected to sensor 205, LRC 209 operably connected to sensor 210 and LRC 211 operably connected to sensor 206). Thus, in this one simple exemplary embodiment, the left matrix is relegated to just a filter array and the sensors (e.g., PVs) in the right matrix receive light that passed through the left matrix, convert some of that light to an electronic signal which is passed to the operably connected LRC which, in this embodiment based on the magnitude of that signal, manages how much light passes through that LRC and then on to the eye.

Applicable, for example, to FIGS. 1, 2, 3, 8, 9, 10 and 12, whether the magnitude of a sensor signal reduces light passing through the operably connected LRC, or whether it causes it to let, where possible, even more light through is up to the implementers and the intended applications in component selection and assembly adjustment. It can also be changed in real time in many embodiments.

Liquid crystal LRCs are so ubiquitous in imaging that we loosely use the "normally white" and "normally black" (or "normally on" or "normally off") nomenclature from the liquid crystal lexicon for these as well as other LRC technologies herein. Thus, when describing herein a "normally white" LRC, it also applies to other fully applicable embodiments (besides LCDs). So, when you see "normally white" describing an LRC herein, all it necessarily means is that a charge applied to it results in the reduction, to the extent currently possible, of its transmissiveness of encountered light. When you see "normally black" describing an LRC herein all it necessarily means is that a charge applied to it increases, at least up to the extent currently possible, transmissiveness of encountered light.

For example, an electrochromic LRC, is easily used as a "normally white" LRC that, up to a limit, responds to a stronger charge or signal by letting less light through. This preferably follows a graduated response curve wherein some graduated response is applied as is common and as is described herein either by non-processor-driven electronic components associated with them and/or via direction of an associated processor either at the individual sensor and/or LRC level or global processor control.

Incidentally, that same electrochromic LRC like most other forms of LRCs can also serve as a "normally black" LRC by, for example, adjusting charge fields and/or polarity (from the normally white parameters) and often modifying the common charge thresholds, ceilings, etc. that are commonly used in configuration so that, for example, the view therethrough is never completely black (which is normally preferable in a device that a viewer wants to see through).

Thus, whether by the normal adaptations and configuration of the LRCs themselves (many of which are discussed herein) and/or adjustments such as thresholds, floors and ceilings (some of which are discussed herein) effected by normal and preferably at least partially transparent electrical components as discussed herein, some application-specific adjustments allow fine tuning for optimal performance.

For example, in a normally black embodiment it will be common for implementers to establish what is effectively a minimum if end percentage of transmissiveness for the LRC so that at least some visibility exists even when the device is completely unpowered (turned off). Also, most implementers will also establish a threshold of sensor charge magnitude below which the LRC will not respond by reducing its transmissiveness.

Thus, in one such purely exemplary embodiment configured for an outdoor application, LRCs are set by one implementer to a minimum transmissiveness of roughly 40% (so, even when the assembly is turned off, roughly 40% of light can come through) and the implementer also selects and configures preferably transparent electrical components between sensor and associated LRC(s) so that a charge that will cause an LRC to increase its transmissiveness will only be sent to that LRC when the charge magnitude exceeds the implementer selected charge magnitude threshold. In this outdoor example, the implementer might choose a charge magnitude threshold that will, for the first measurable charge above that charge magnitude threshold value, result in an LRC transmissiveness of 41% (this charge magnitude threshold will, of course, vary significantly based on LRC sensitivity, etc.). This same implementer, however, for an indoor application might choose a minimum transmissiveness of roughly 50% and a charge magnitude threshold that will, for the first measurable charge above that charge magnitude, result in a transmissiveness of roughly 51%. These values for minimum transmissiveness and charge magnitude threshold are, of course, merely exemplary.

And, of course, for spike protection, general adjustments for ambient light and other SAGA-related functions, many implementers will also identify and apply a signal ceiling value. That is, a maximum acceptable magnitude value for a sensor-delivered charge/signal that will be sent to the LRC to increase its transmissiveness further. Alternatively and or additively, implementers may opt to otherwise configure a maximum transmissiveness for the LRC itself. And In embodiments where processors (between sensors and LRCs or globally operating processors managing multiple sensor-LRC adaptations) direct these parameters, programmatic logic and/or a user, via any common user interface with the processor(s) can also make these changes to adjust the real time view. Of course, in any and all embodiments where a central processor is operably connected to both sensor and associated LRC, the electrical components that control such control factors (e.g., charge magnitude threshold, percentage of transmissiveness, etc.) certainly do not have to be located between sensor and associated LRC.

Similarly, in embodiments where implementers configure LRCs to be normally white, there will be, despite the fact that normally white LRCs upon activation effect a natural form of spike control and bright ambient light reduction, at least some applications where 100% light passage through LRCs is undesirable. One configuration to deal with such a situation is an applied charge to "darken" the naturally white LRC as necessary to establish an implementer-chosen maximum percentage of transmissiveness. To avoid the need for additional power, an alternative approach is to adjust the relative rotations of the normally crossed polarizers of the LRCs and/or multiple other commonly understood adjustments to these and the many other LRC forms to establish an LRC maximum transmissiveness without the necessity of charge overhead. Of course, the addition of a neutral density filter is an acceptable alternative or additive solution. However, a neutral density filter does not leave room for responses to environmental changes in which that 100% transmission might suddenly be quite desirable. One of benefits of controlling the maximum percentage of transmissiveness of an LRC electrically and/or by well-known adjustable means, is that, potentially in a processor-present embodiment this can be adjusted in real time as the need arises (e.g. sudden darkness) either programmatically and/or responsive to user input.

Also, with normally white LRCs (not unlike with the normally black LRCs already considered) some implementers will select and configure preferably transparent electrical components as described elsewhere herein so that a charge that will cause an LRC to decrease its transmissiveness will only be sent to that LRC when the charge magnitude exceeds an implementer-selected charge magnitude threshold. Here, the implementer identifies a charge magnitude threshold (these will vary by LRC sensitivity, etc.) that will, for the first measurable charge magnitude above that chosen charge magnitude threshold value, result in an LRC transmissiveness that is, in one preferred embodiment, just below that implementer defined maximum percentage of transmissiveness.

Many implementers will also identify and apply a signal ceiling value (to keep the user's view from getting too dark). That is, a maximum acceptable magnitude value for a sensor-delivered charge/signal that will be sent to the LRC to decrease its transmissiveness further. Alternatively and or additively, implementers may opt to otherwise configure a maximum transmissiveness for the LRC itself.

In such embodiments where processors (between sensors and LRCs or globally operating processors managing multiple sensor-LRC adaptations) direct these parameters, programmatic logic and/or a user, via any common user interface with the processor(s) can also make these changes to adjust the real time view.

In some embodiments the LRC is powered solely by the sensor-generated power and in other embodiments it is powered by alternative power sources (several described herein) and in others a combination of multiple power sources are used. In embodiments with processors, these are managed either at the LRC level or other levels. Also, processors will often be used to make other adjustments such as to adjust how much light passes LRCs including thresholds and curves of LRC responsiveness to charge. Changes in environmental lighting and the necessary LRC changes to adjust to them are not, in the real world, always linear. Therefore, these curve-driven (or LUT based) processor driven responses as well as others for certain environments are very useful since everybody is different and different applications (e.g., a pilot fighting both glare and too much light at the same time and someone trying to look through fog with headlight reflection) often benefit from a different set of system responses.

There are, of course, yet other embodiments where the right matrix is made up of any material that darkens responsive to increases in received light intensity (e.g., photochromic materials). In such case, there is not necessarily a separate LRC array since the darkening sensor serves the LRC function as well. For these specific embodiments, the separate LRC array will not be there. Thus, in all the figure's used herein, for such cases of photochromic LRCs, simply consider the right matrix to also perform the LRC function and ignore the drawn LRC array. However, these sensors (e.g., photochromic) can, as the Legend suggests, be selectively more sensitized (either by the natural or configured nature of the component or by the addition of a filter layer) to Group A or Group wavelengths as drawn in FIG. 2 and benefit from the AOI selectivity and spike removal applications associated with FIG. 2 as discussed with respect to Group A and Group B wavelengths (and as many other groups of wavelengths that implementers require).

Again, because LCDs are so familiar, exemplary embodiments will tend to use them or at least their nomenclature/lexicon as examples realizing that they also serve as placeholders in those discussions for other applicable LRC elements. Here, LRC elements of the LRC array (or, of course, LRC areas on an LRC surface) are, as described in detail herein, connected to sensor elements or sensor areas of the right matrix). A simple LCD LRC embodiment in normally white mode will now be discussed. When no charge is applied, such an LRC is fully transparent or at least partially transparent (since some darkening may be desirable at baseline for some applications and this can be done by modified polarizer angle, applied charges, half wave plates, etc. as described herein). Then, such a charge from the operably connected sensor will allow less light through (to darken the "bright spot") which is a very common use (e.g., in a simple "remove the headlights before it reaches the eye" application).

In applications where it is very desirable for a charge to actually lighten the view (that is, a charge to an LRC from an operably connected sensor like a PV would cause the LRC to try and let more (unless it's already wide open) light through. In those cases, still using the same liquid crystal LRC example, the liquid crystal would be operating in normally black mode or be otherwise adjusted to get brighter in response to a stronger charge. Thus, how much light the LRC allows through can be proportional to or inversely proportional to a magnitude of received charge. Thresholds of baseline brightness, charges, electric fields, ceilings, etc., as commonly used are certainly examples of normal configurations of applicable embodiments of the current invention. This is easily and commonly done because often some minimum amount of light coming through the LRCs is desirable. Some implementers will intentionally configure LRCs to, even though technically normally black, always allow a certain amount of light to pass through and many put these configurations into the factory-assembled configuration. However, with the addition of elements as discussed herein and/or other control elements such as polarizers or default standing charges which can be changed in real time, these may be changed in real time programmatically by the processor and/or in response to user directions.

Figures 8A, 8B:
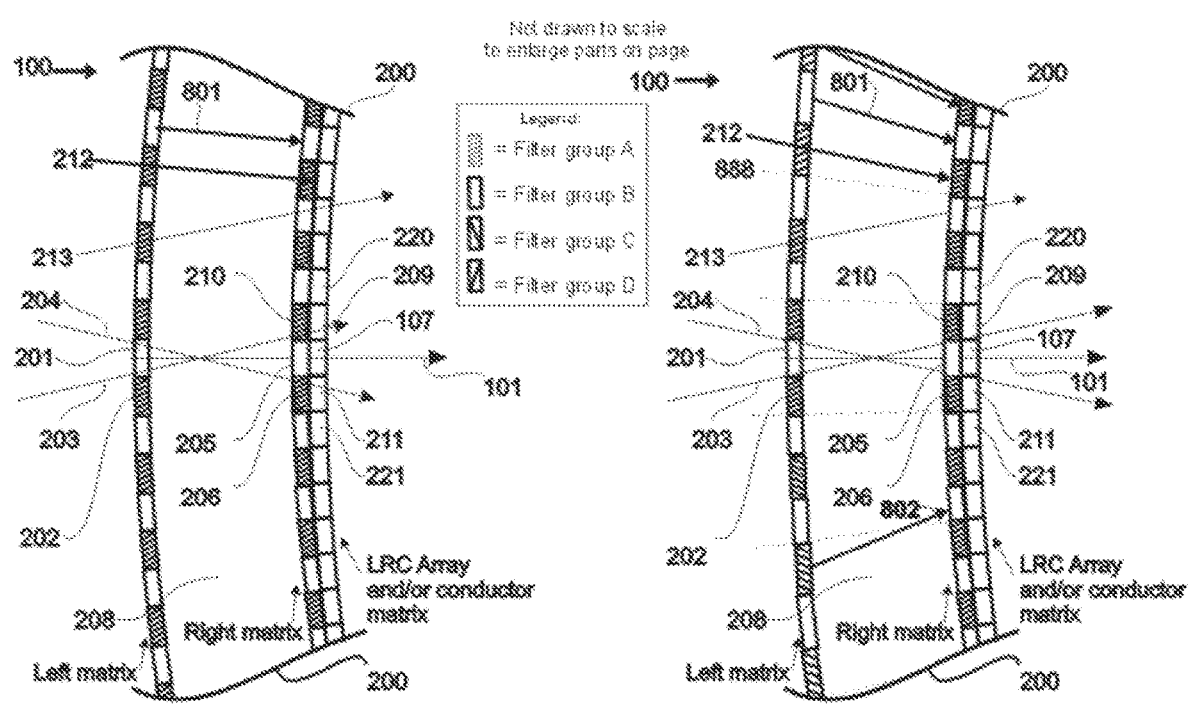
FIG. 8A illustrates another embodiment performing the work of an angle of incidence limiting component.
FIG. 8B is a image of the next layer of 100 that is located behind the layer of 100 that is illustrated in FIG. 8A.

Another example embodiment can be understood looking at FIG. 8A and considering the LRC array to be configured to darken in response to a magnitude of a signal. Here, normal, or at least a low AOI, light (e.g., along the line of arrow 212 or 101) results in a low charge or no charge all since the right matrix sensor element doesn't receive the wavelengths it needs. That is because, for light following the path of the arrow 101 for example, 201 removed the filter group B wavelengths and those were the wavelengths that sensor 205, being a filter group B sensor, attempts to convert into a charge/signal. Thus, this LRC isn't darkened (or at least not much) and thus this low AOI light passes comparatively undiminished to the eye. However, higher AOI light like along the arrow 213 develops a higher charge because the sensor it encounters receives the wavelengths it uses. This high charge results in significant darkening. Thus, higher AOI light is at least partially occluded.

This ability to favor normal light passage is also used to provide better vision with other benefits (such as SAGA functions to eliminate light spikes, darkness adaptation, artificial pupil and instant environmental correction of the ambient light) as further detailed herein.

Another example embodiment of angle of incidence limiting components configured to favor passage of light with at least one preferred angle of incidence can be understood looking at FIG. 8A and considering the LRC array to be configured to lighten in response to a magnitude of a signal. Here, normal, or at least a low AOI, light (e.g., along the line of arrow 212 or 101) results in a low charge or no charge all since the right matrix sensor element doesn't receive the wavelengths it needs. Thus, the transmissiveness of this LRC isn't increased (or at least not much) and thus passage to the eye of this low AOI light is substantially reduced. However, higher AOI light like along the arrow 213 develops a higher charge because the sensor it encounters receives the wavelengths it uses. This high charge results in significant lightening (i.e. the transmissiveness of the LRC is increased). Thus, the LRC is more transmissive of higher AOI light. Thus, the embodiment of FIG. 8A, when the LRCs are considered to be configured to lighten in response to a magnitude of a signal, favors the passage of non-normal light.

This ability to favor non-normal light passage is also used to provide better vision with other benefits (such as SAGA functions to eliminate light spikes, darkness adaptation, artificial pupil and instant environmental correction of the ambient light) as further detailed herein.

While we're looking at FIG. 8, any number of additional layers, like the left matrix that is drawn for FIG. 8, may be added to the one drawn. Preferably, as each such layer is added, it is added distal to the location of the left matrix drawn in in FIG. 8 and preferably some gap is left between each layer but that is not required. Something like that is already done in FIG. 9 (which can also have further expanded layers).

However, there is no need for the elements of the right matrix to be the same size or shape as the elements of the LRC array. In fact, for example, making the elements of the right matrix smaller than the elements of the LRC array (optionally with each sensor sharing a center axis; e.g., the path of arrow 201 would pass through the center of both the smaller 206 and the center of the larger 107) is a good way to increase the AOI sensitivity of the device. Nor is it necessary for the elements of the left matrix to be the same size as the elements of the right matrix or the LRC array. In fact, even in the simplest embodiment the elements of the left matrix will often be slightly larger than the elements to its right in FIG. 2A (particularly when 208's separation of the left and right matrices is significant) because of the nature of the eye's radial view of the world (which is also why, in such case, the overall size of the left matrix will normatively be slightly larger than that of the right matrix).

Blinders and other AOI limiting embodiments based on wavelength selections and positioning (like, for example, FIGS. 2, 3, 8, 9, 12 and 13) are all good examples of angle of incidence limiting components. Some embodiments will have one of them and some will have both. An example embodiment can be described as:

A device through which light passes from a field of view of an eye of a user to that eye comprising: a first array comprised of see-through light sensitive elements; a second array comprised of light controlling elements; wherein said see-through light sensitive elements are operably connected to at least one of said light controlling elements; wherein said first array and said second array are configured so that the light passing through at least one of said see-through light sensitive elements, as the light proceeds from said first array towards said second array, stimulates a signal to at least one of said light controlling elements; wherein, responsive to said signal, at least one of said light controlling elements is configured to control how much light is allowed to pass through said light controlling elements; and further comprising angle of incidence limiting components configured to favor passage of light with at least one preferred angle of incidence; wherein said angle of incidence limiting components are one of: 1.; at least one additional array comprised of at least one wavelength-removing area; wherein all of said arrays are positioned to favor the passage of light that has an angle of incidence within at least one chosen range; 2. components that prevent at least some light with an angle of incidence that is not among those preferred from reaching said second array, 3. both 1 and 2.

Explanation of legend in FIG. 2A: Although any number of filter groups and/or see-through light-sensitive elements (e.g., PVs) and wavelengths selected by them are applicable to the current invention, only 2 such wavelength groups are illustrated in FIG. 2. These wavelength groupings by color are, of course, applicable to both the left and right matrix. Shaded elements (with lines inside the blocks like 202, 214 and 205) are examples of a first set of wavelengths labeled as "Filter group A" (even though, technically, the legend's group shading and wavelengths also apply to non-filters like PVs). Examples of unshaded elements (simple white blocks like 201, 210 and 206) are indicative of a second set of wavelengths labeled as "Filter group B" (even though, technically, the legend's group shading and wavelengths also apply to non-filters like PVs).

So, in the current example, when light (presumed to be coming from the left in FIG. 2A) strikes a shaded element in the left matrix like 202, that filter (it's just a filter in this one example and while using the images of FIG. 2) removes mostly wavelengths from filter group A (let's use, just for this example, ultra violet, UV, as the wavelength group A). Similarly, when light strikes a white element in the left matrix like 201, that filter (201, in this exemplary discussion using FIG. 2, is just a filter element) removes mostly wavelengths from filter group B (let's use infrared for this example for the wavelengths for filter group B).

In preferred embodiments the wavelengths most affected (e.g., filtered out and/or converted to energy) by one left filter group (or, for other embodiments, light-sensitive elements in the left matrix) are significantly different from the wavelengths reduced by another filter group. It will be advantageous when components are configured to make the wavelengths reduced by Filter group A as mutually exclusive to the wavelengths reduced by Filter group B as possible (e.g., UV for Group A and IR (infrared) for Group B). So, the layer of 100 that is most distal to the eye (the "Left matrix" as it is identified in FIG. 2A) is made up of filter (or in other embodiments, light sensitive, e.g., PV) elements.

In one preferred embodiment using the current example, sensors (which generate a charge/signal and are in one preferred embodiment are PVs that selectively convert the wavelengths that they "filter" into power/signal) in the right matrix (e.g., 214, 210, 205 and 206; attributes are suggested by their being shaded or unshaded per the legend) are PV elements that create a charge when light hits them by removing wavelengths that the eye isn't particularly sensitive to. This can eliminate the need for a separate power provision element in some embodiments.

Finally, to the right of the right filter matrix in FIG. 2A, is an array of LRCs (like the numbered examples 209, 107 and 211). Even though these LRCs are illustrated as unshaded, they are not to be confused with the unshaded elements in the more distal left and right matrices. A white box looks like any other white box but those in the LRC array to the far right of FIG. 2A are LRCs, not filters.

Again, at least for this exemplary drawing (FIG. 2A) and for the preferred embodiments (and as can be seen in the legend and as indicated by the shading convention), Group B wavelength elements like 201, 206 and 210 (all unshaded) all take away some of the wavelengths associated with Filter group B. Filters, like 201 just remove those identified wavelengths while sensors like 206 and 210 use them for power conversion. Similarly, Group A elements drawn as shaded, like 214, 202 and 205, reduce passage of group A wavelengths.

Of course, implementers can choose which groups of wavelengths are in which group and they may also choose to select and implement any number of additional groups rather than limiting the number of groups to two as they are in this particular example.

Figure 7:
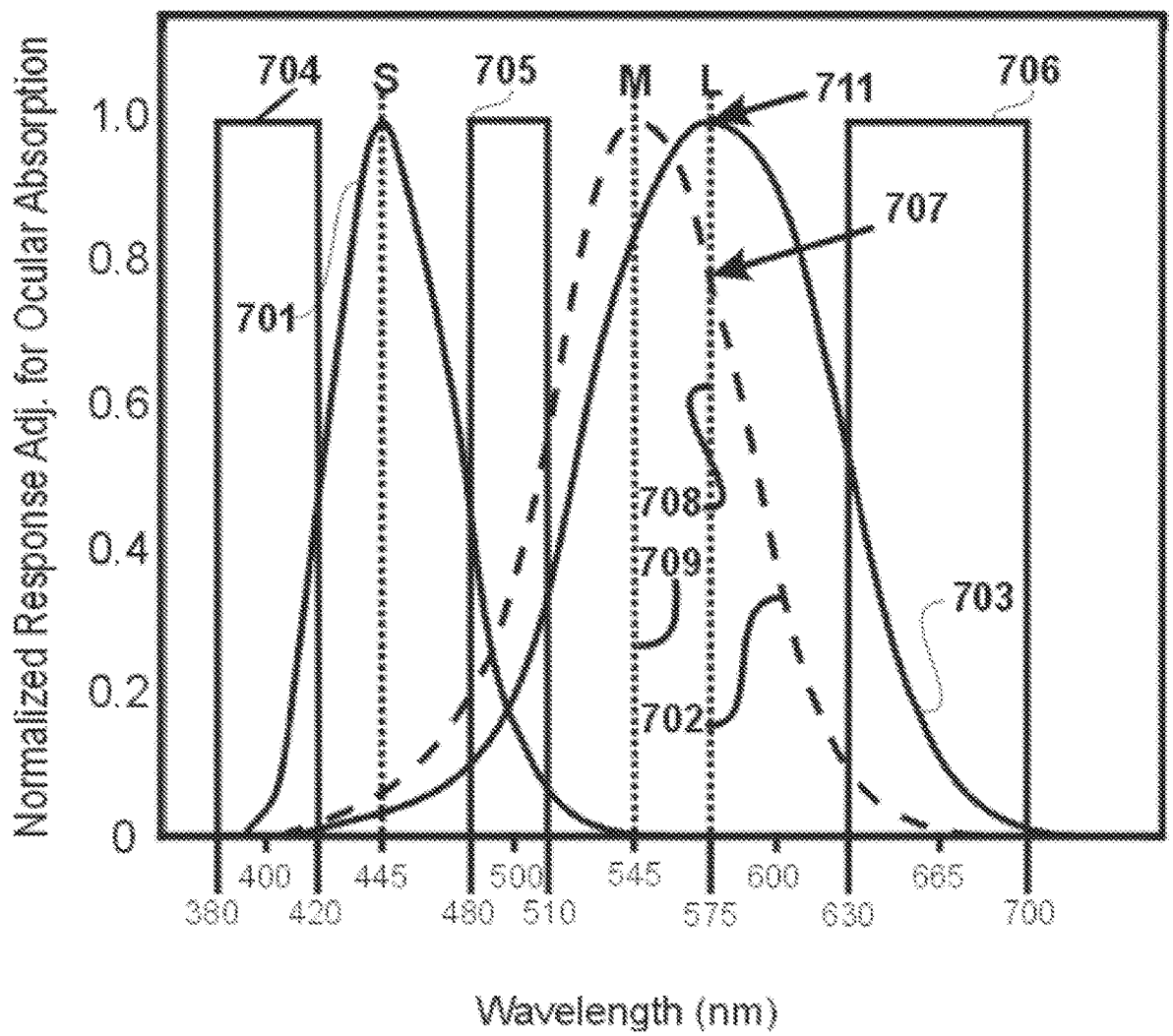
FIG. 7 is not drawn to exact proportions or scale but represents the general response of the human eye (at least to some individuals) to certain wavelengths. However, unlike some commonly published graphs of the absorption response of short, medium and long retinal cell chromophores to wavelengths of light.

Sensitivity Maxima wavelengths, Sensitivity Minima wavelenths, etc.: Just a note here before we get back to our example. In other example embodiments groups A and B (and optionally C, D, and on, etc.) will be different groups of low-retinal-sensitivity wavelengths that are completely within the visible wavelengths. For example, sensitivity minima which are those wavelengths that fall within the visible range but far from the Sensitivity Maxima Wavelengths (SMWs which are the peaks of the eye wavelength sensitivity curves) so that their removal will not be normally missed (a concept discussed at length in the patent applications foundational to and incorporated in this patent application). FIG. 7 summarizes some of these as the not-peak sensitivity ranges of 704, 705 and 706. Additively and/or alternatively these can include wavelengths that are effectively invisible to the eye. Hybrid embodiments will include bandwidths for A and B (and, optionally, many more groups) that include some or all of these kinds of wavelengths. In the examples now discussed it is helpful to recall that groups A and B are preferably mutually exclusive. So, just for the moment, we will simplify discussion of optical mechanics by simply referring to only two sets of wavelengths: group A wavelengths and group B wavelengths.

In the currently discussed embodiment (although there are also valid embodiments wherein measurement of light passing through elements of the right matrix is handled by a separate additional sensor or PV elements), elements in the right matrix convert at least some of the wavelengths into electrical energy. E.g., 205 removes/converts Filter Group A wavelengths, etc.

In embodiments where the space 208 (whether it is transparent, vacant or otherwise filled) between the left matrix and the right matrix, is significant, it will, of course, be normative for the elements of the left matrix to be configured to be slightly larger than the elements of the right matrix. This will normally be based on the comparative areas of the surface of the left matrix compared to the area of the surface of the right matrix). Other measurements and equipment adjustments are understood by those skilled in the art.

Now, using the above example values and definitions, consider an application and embodiment where a stronger charge from a sensor results in less light passing through an associated LRC (to the extent that that is possible). Consider FIG. 2A with all the elements still defined and set as described just above. Then, when normal rightward light coming from the left of 100 in the illustration of FIG. 2A along a vector coincident with the one indicated by the example arrow, 101, passes through 201, the group B wavelengths are removed and the light continues to sensor 205. Although 201 removed the Filter group B wavelengths it left all of the filter group A wavelengths that the next-to-be-encountered sensor 205 is waiting to convert to a signal/charge. Thus, at least the primary associated LRC 107, to the extent possible, reduces the passage of light therethrough. However, light with a higher AOI, such as light along the path of the arrow 203, passes through left and right matrix elements from the same filter group. In this example discussion, that means that the wavelengths that were removed when passing through 203 were the same wavelengths that would've been converted to energy by 210 had 201 not already removed them. Thus, a weak charge or no charge and all is created by sensor 210 so that the transmissiveness of LRC 209 is not responsively diminished. Thus, for the embodiment of FIG. 2A as defined above, for LRCs that allow less light to pass responsive to a sensor(s) charge, visible light with a higher AOI (e.g., non-normal light) is favored for passage.

Of course, this can be useful. Spike protection is inherent since a sudden flash of light in the FOV results in a sudden darkening of LRCs. Also, bright sunlight to a human eye which has a limited dynamic range shifts that available dynamic range towards the extremely high end to the detriment of low-end perception (perhaps a pedestrian in the shadows). A bright headlight at dusk or later has the same effect. A properly configured LRC that darkens responsive to a charge naturally prevents not only spikes but also, in the presence of bright light, shifts the eye's dynamic range so that it can better perceive that pedestrian in the shadows. While the extremes of the upper brightness range are thus LRC reduced thereby arguably reducing perception in that high range, it is generally not a problem to perceive the location of the bright sun or of the bright headlight in the dark.

For many applications including this one it will be useful to establish a threshold below which the view of the eye will not be darkened by LRCs and this is easily accomplished in the initial setup of the LRC itself (for example, establishing such a threshold via orientation of polarizers, secondary polarizing conditioners, ordinary charge-adjusting electronic components, standing charges, other component orientation, etc.). Alternatively and/or additively, such a threshold can be established or simply fine-tuned using ordinary transparent electronics that are familiar to those in this area. For one example, a resistor between the sensor (like 205) and at least one associated LRC (like 107) is easily used to establish a tolerance threshold of ambient brightness (or, more correctly, a threshold of charge caused by that ambient brightness) below which LRCs will not responsively reduce their transmissiveness. Of course, multiple additive or alternative transparent components (e.g., Transistors and/or capacitor's, etc.) can be used.

Similarly, though perhaps not as often, some implementers will use common transparent components like transistors, resistors and/or in some cases capacitors to effect an LRC response ceiling (a maximum LRC response; i.e. it will only restrict the light so much). Then, when so much light hits a sensor that the charge from that sensor is above that ceiling (i.e., above a certain charge to the LRC from an associated sensor), no additional charge above that ceiling-related charge will be passed to the LRC. Of course, the same thing can be alternatively accomplished by simply setting up the LRC itself to effect a limited closure (restriction to light transmissiveness) as part of the normal materials and selection and configuration assembly process.

In embodiments with one or more processors, the same functions can be accomplished potentially better and optionally in real time responsive to programmatic input and/or user input. For example, in embodiments with a dedicated transparent (or located on the unit outside of the field of view) processor associated with, for example, one LRC, that processor can selectively direct these electronic components to deliver a modified charge to the LRC according to the same thresholds and ceilings and/or be responsive to instant instructions by the user.

In embodiments using more centralized processing, a single processor operably connected to each LRC and its associated sensor(s) can, of course, via transparent electronics associated with that LRC, control the signals sent to the LRC. However, once a centralized processor is available, that processor, operably connected via transparent electronics to each sensor and LRC, can alternatively access on-board power and, responsive to the signal from the sensor, forward the desired signal (which reflects any and all ceilings, thresholds, etc.) directly to the LRC. That on-board power, as discussed herein, can come from any means including collection of power generated in any of the filter layers when those filters are PV elements (which removes selected wavelengths that also converted to power). This ability to access and direct to the LRCs on-board and/or alternative sources of power also substantially relieves the need for the sensor to come up with enough power to drive its associated LRC(s). This provides the implementer with much more flexibility in component selection since sensors and LRCs can then be smaller and/or less efficient and still do the job. Of course, these processors also provide the ability to control and direct the SAGA, darkness adaptation control, artificial pupil control and other functions described herein.

Now, still using the above example values and definitions, consider an application and embodiment where a stronger charge from a sensor results in more light passing through an associated LRC. What could that be used for? Consider FIG. 2A with all the angle of incidence limiting and other elements still defined and set as described just above and the LRC array configured so that a stronger charge from a sensor results in more light passing through an associated LRC). Then, when normal rightward light coming from the left of 100 in the illustration of FIG. 2A along a vector coincident with the one indicated by the example arrow, 101, passes through 201, the group B wavelengths are removed and the light continues to sensor 205. Although the light reaching 205 is missing some or all of the B wavelengths that 201 took, these wavelengths are not missed by 205 because it, being a filter group a sensor, is primarily or at least more sensitive to (i.e. is activated by) Group A wavelengths which were largely undiminished by 201. Thus, 205 will develop a strong signal to pass on to associated LRC(s) i.e. to adjacent or at least electrically nearby (i.e. low resistance path even if it's a longer physical path) connected LRC(s) like 107 because. However, non-normal light that flows along the path of the arrow 203 loses the wavelengths associated with Filter group B (in this example, IR) when passing through 201 and arrives at 210 which is sensitive essentially only to the same Filter group B wavelengths that were just removed in 201. Thus, sensor 210 will send a weak signal or none at all to LRC 209 so that this light does not result in any further opening of LRC 209 to visible light. Thus, for the embodiment of FIG. 2A as defined above, for LRCs that allow more light to pass responsive to a sensor(s) charge, light with a lower AOI (e.g., normal or near-normal light) is favored for passage.

LRCs in this FIG. 2A configuration that are normally black will favor the passage of normal light. Thus, the brighter the entering light, the more light reaches the eye. To provide spike protection, SAGA functions and/or darkness adaptation controlled with this particular embodiment and without benefit of any processor(s), ordinary transparent electronics associated in the connection of the sensor (e.g., 205) and any associated LRC(s) (e.g., 107) are used as is understood by those familiar with the area.

This increase in LRC transmissiveness responsive to a flash of light might seem adverse to the concept of spike removal such as protection of the eye from headlights or sun flashes. However, this is easily accommodated with the establishment of a maximum transmissiveness for the LRC which can be part of the factory configuration in assembly. And/or, of course, can also be controlled by transparent local electronics (e.g., local to the sensor and the LRC) such as capacitors and resistors. However, in embodiments with processors, it is also easily accomplished (since processors can direct the LRC transmissiveness in real time by processor programmatic control and/or responsive to the user interface.

You might think that low-AOI-favoring process might be defeated by light with such a high AOI that it would go through, for example, 201 and then to the next sensor shown, e.g., 214 which would, in fact, be highly responsive to the Group A rich light that survived 201's Group B filter. Such light might provide a strong signal to its adjacent LRC. However, particularly when the space between the matrices (208) is small, the extremely high AOI required to get to 214 would result in most of the light reflecting off the surface of the left matrix rather than ever reaching any sensor.

Thus, a very high and adjustable (as will be seen) preference for passage of light with a chosen AOI range is practical with the current invention.

Figures like FIGS. 1, 2, 3, 8, 9 and 12 are sagittally oriented cross-sectional views. For example, "below" the slice of 100 ("into the paper") shown in FIG. 2A is the slice illustrated by FIG. 2B. To see these adjacent slices from another perspective, FIG. 4 was drawn to illustrate a 90-degree yaw-rotated view to help illustrate how the eye would see 100 for several embodiments (FIG. 4A). Also, FIG. 4F rotated 180 degrees from FIG. 4A illustrates how 100 would look to someone standing in front of the wearer. Both of these example views look like a bit like a "checkerboard". For embodiments using only 2 filter groups, the FIG. 2B elements that are drawn as filter group C and filter group D should be considered filter group a and filter group B respectively as if there were only two filter groups (where that is the case). In FIG. 4F the shaded rectangles (with 2 slashes in each, analogous to the black rectangles on a checkerboard) represent filter group a and the unshaded rectangles (analogous to the white rectangle on a checkerboard) represent filter group B. The dotted line 400 can be used to indicate the plane (slice of 100) that is illustrated in FIG. 2A and the column of rectangles just to the right of 400 can be used to illustrate the slice of 100 that is illustrated in FIG. 2B. Then 107 in FIG. 4A would be the eye's view of LRC 107 that we saw in FIG. 2A. Behind 107 in FIG. 4A (not seen in FIG. 4A because they are between layers) is, of course, the Group A (shaded rectangles) sensor 205. Elements immediately above and below 205 and to the immediate right and left of 205 are Group B sensors (unshaded in FIG. 2A and, again, not visible in FIG. 4). In this "check-erboard-like" example then, it is easy to see one simple embodiment from 3 different perspectives between FIG. 2 and FIG. 4. Of course, LRC 128 in FIG. 2A is LRC 128 in FIG. 4A, etc.

With that in mind, consider a very simple 2 filter group embodiment wherein filter group a will be UV light and filter group B is IR (infrared) light. That will mean, in this example illustration of an embodiment only, that a left-matrix filter like 202, will filter out UV light and a right matrix filter group a sensor will convert UV light to a charge/signal. Similarly, a left-matrix filter of filter group B like 201, will filter out IR light and a right matrix filter group b sensor will convert IR light to a charge/signal.

Also, let the LRC array be configured to be more transmissive in response to a greater charge. Consider for example normal light (perpendicular to a surface and having zero AOI) entering along the path of arrow 212 in FIG. 2A. It first encounters a filter group A left matrix element which removes the UV light. When that light (still following the path of the arrow 212) reaches the right matrix element which is a filter group B sensor element, that sensor is sensitive to IR light which was not removed in passing through the left matrix. Thus, the sensor's associated LRC receives a signal to cause it to increase its transmissiveness. However, non-normal light, such as light following the path of the arrow 213 in FIG. 2A, will not result in an adequately substantive charge/signal between the encountered sensor and its associated LRC(s) (because the UV light it is sensitive was removed by a filter group A element in the left matrix already). Thus, low AOI light is favored for transmission.

No visible light photons are harmed in the process so the process provides a bright view (no visible light is lost; all the heavy lifting is done with the energy provided by invisible wavelengths), better vision (glare reduced and normal light favored) and safer vision sans UV and IR radiation. For even less radiation and better perception, including sensitivity minima in the wavelengths removed and converted to signal, which is covered separately herein (since that typically would be provide PVROD functions e.g., photovoltaic-actuated retinal optimization), will improve vision even more while further protecting the viewer.

It should be noted that if every photon that strikes your retina comes straight from a point emitter in your FOV to the point of its arrival on your retina (particularly the light destined for a direct path to the fovea), things will look different revealing elements otherwise obscured, glare is reduced and many if not all of your eyes' focal flaws are reduced or eliminated. A bright FOV will, of course, appear a little dimmer when, for example, the outer portions of a spreading "pencil" of light from an emitting point in your FOV are thus reduced (leaving only a more central bundle of less divergent rays in that expanding beam and thus following an at least approximately more direct route that takes a more singular path to the retina rather than so much of it having to be focused, or mis-focused, back down to the same point on the retina where the central ray of the pencil arrives). Thus, the corneal and lens flaws that would otherwise fail to bend those more divergent beams back to the exact same point on the retina, do not as significantly increase the circle of confusion.

Consider an embodiment where 100 in FIG. 2A is part of a contact lens assembly and light from what the eye is focused on (centered on) enters approximately along the path of arrow 101 through the center of 100, the cornea and the lens to arrive in the area of the fovea. Little or no refraction is involved in light that approximately follows this path and thus little or no refractive error is added to expand the circle of confusion. Not inconsequentially, by reducing the transmission of higher AOI light, glare is also reduced or eliminated allowing the eye to see deeper into some materials and views. This foveal area is now receiving largely low AOI light that is largely un-refracted (and, thus, not mis-refracted) and glare-reduced. The fovea is the hyper high resolution receptor portion of the eye that the eye scans (saccades as much as 60 times a second) around the FOV so the brain can map (from the scanned images from this tiny area) the high-resolution image for the entire FOV that we perceive. While providing low AOI light to the eye benefits all portions of the retina, it is especially powerful to improve the precision and remove glare noise from the eye's highest resolution receptors. Low AOI light entering far enough beyond arrow 100 to miss the fovea but still encounters the macula produces similar benefits.

However, an additional advantage exists from this reduction in defocusing elements in the path to the fovea. The fovea is all cones and extremely dense. Thus, it's the highest resolution color recognition area of the eye. By shrinking the circle of confusion or just softening its edges (which in practice, as the circles overlap, has a similar effect) particularly in this area we improve both general color perception and color area discretion. Secondly, this is a huge and irreplaceable factor in the brain's edge-detection function which drives image comprehension, depth perception and the closed-loop feedback system used by the physiological processes to adjust the lens for good vision in real time. Thirdly, in removing defocused or off angle light that will result near the fovea and macula and shrinking the circle of confusion we reduce color bleed over (better color vision) that also misinterprets, for example, a blue object and a nearby red object as one purple object (which also then causes the brain to fail to see the color-contrast edge between them which further impedes lens focusing functions that depend on that lost edge detection).

Figure 10A:
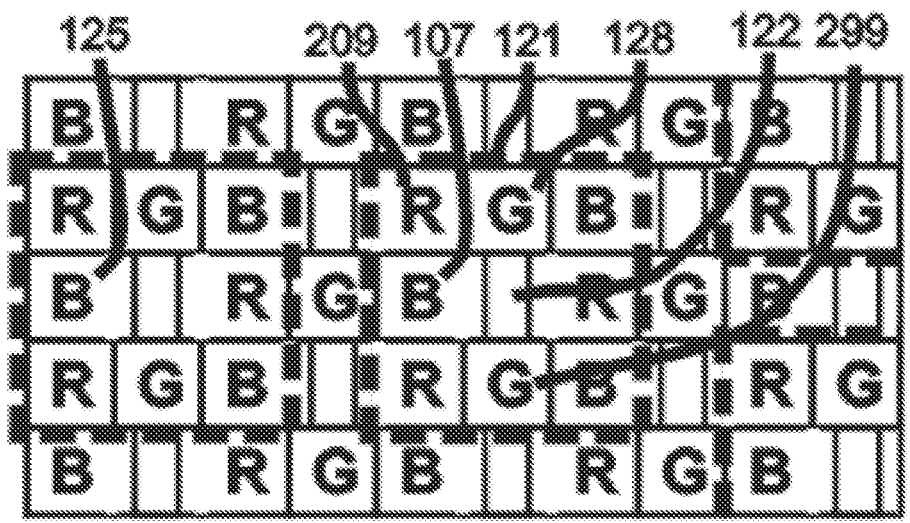
FIG. 10A is a view of the assembly 100 from the perspective of the eye with added color indicators.
Figure 10B:
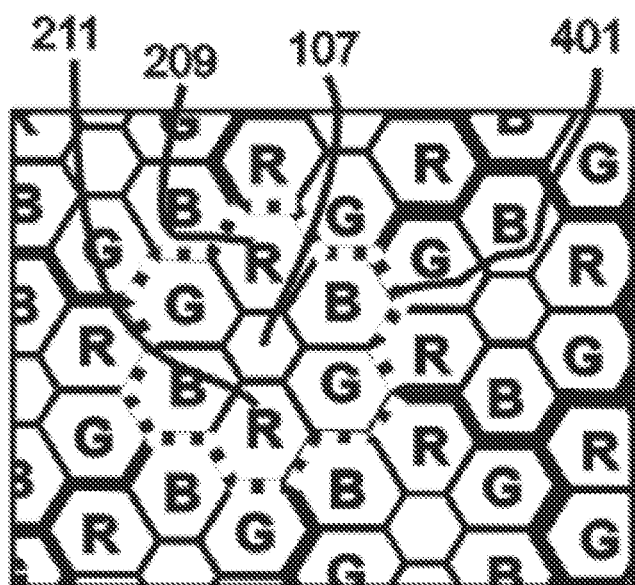
FIG. 10B is a view of the assembly 100 from the perspective of the eye with added color indicators.
Figure 10C:
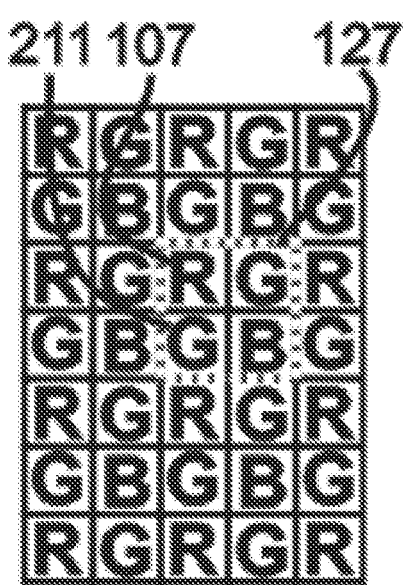
FIG. 10C is a view of the assembly 100 from the perspective of the eye with added color indicators. This view is similar to the familiar Bayer format.

Finally, in embodiments discussed at length herein where color groups are managed separately e.g., in discussions of FIG. 10A, FIG. 10B and FIG. 10C, color ranges chosen will further (beyond elements already discussed) improve color vision for many with colorblindness. The most common type of colorblindness involves the inability to distinguish red from green. Less often it is difficult to distinguish between blue and yellow or to distinguish no color at all at least in limited light. There are several embodiments of the current invention that help all of those except those with no color sensitivity at all.

1. Consider, for a very simple example, FIG. 2A. This will also be applicable to FIGS. 1, 3 8, 9, 10 and 12 and, in fact, in any embodiment where the light exiting elements of the LRC array are separably perceivable colors.

Many are under the misimpression that we see red because the "red" (l for long) cones are excited by a photon and we see blue when a photon excites (strikes a blue chromophore to begin visual transduction) on a "blue" (s for short) cone and we see green when a green cone is excited. In fact, we see a color based on the ratios of excitement of the 3 types of cones for each perceived color which is why we can see millions of colors in wavelengths that do exist as well as purple which doesn't exist with only 3 types of sensors. While in R, G, B (255, 0, 0) is indeed a dark saturated red, (255, 96, 59) is red too and one shade of purple is (128, 0, 128).

The problem for colorblind people, like this writer, who have weak color response in one or more cone types making it hard to distinguish, for example, red from green (particularly in low light) is that we see the wrong ratio. Thus, using the current invention to selectively shift the ratios of those colors to match the brain's perception table, we correct that vision.

In a non-processor "passive" embodiment using FIG. 2A this can require no more than careful selection of what wavelengths we consider red and green to be. In some other embodiments included herein we use violet and blue as what we will call a blue wavelength range, at least some parts of green and yellow into what we will call a green wavelength range and at least some parts of orange and red into what we will call a red wavelength range. However, to correct a red-green distinguishing problem, consider FIG. 7. Here in this wavelength/sensitivity curve for a typical eye we see 3 blocks 704, 705 and 706 which are discussed elsewhere. We also see 3 sensitivity curves, one for each type or cone (R, G, B or better s, m l). The lowest wavelength curve 701 peaking at about 445 nm (adjusted for wavelength absorption of the cornea and lens) indicates that the maximum sensitivity for the s (short or "blue") cone is (absorption adjusted) about 445 nm. The curve 702 identifies the dotted line curve for the sensitivity of the m (medium length or "green") cones and 703 is the sensitivity curve for the l (long or "red") cones. At the peak sensitivity for 703 identified by arrow 711, there is the letter "L" for long (for long color cone) and there's also a dotted vertically descending line 708 that divides that curve in half (at its maximum point of sensitivity, 711). Similarly, there is an "M" for medium above the curve 702 and a dotted descending vertical line below it cutting the M curve in half so that approximately half of the wavelengths of green that the eye is sensitive to is to the left of that dotted line and about half is to the right of it.

One approach to passive color adjustment for better color vision can be efficiently effected by selecting/defining about the right half of sensitivity curve 703 in FIG. 7 say 575 to 630 nm as "red". Similarly, the left side of sensitivity curve 702 say 510 to 545 nm can be used as green. 420 to 480 nm is one range that can be used for green. You will notice that the sensitivity minima in the ranges of 704, 707 and 706 in FIG. 7 are not included.

Using these rough example-only values, let's consider an embodiment that is so simple that is not illustrated with a figure. Consider a single worn filter that allows only the following wavelength ranges to pass through: 420 to 480 nm, 510 to 545 nm and 575 to 630 nm.

FIG. 700 illustrates, for example, that at the wavelength indicated by dotted line 708, the excitation for red color cones (the point on the sensitivity curve for this is at the location indicated by arrow 711) is substantially greater than the green sensitivity for that wavelength (indicated by arrow 707). And that wavelength, at 708, is the worst case (for the ranges that we use in this example) wavelength for bleed-over to green of all the wavelengths that the filter permits for red (i.e. to the right of 708). For other wavelengths to the right of 708 (for the ranges that we use in this example; for example we eliminate the sensitivity minima wavelengths in the range identified as 706), the ratio of excitation for red divided by the excitation for blue is even greater. Thus, the red light that the red-green challenged viewer sees coming out of the LRCs will increase the ratio of red excitation to green excitation and be perceived less as mud and more as red. Similarly, the green light that the red-green challenged viewer sees coming out of the LRCs will increase the ratio of green excitation to red excitation and be perceived less as mud and more as green.

Thus, the wearer looking through this filter assembly can much more easily distinguish between red and green and truly see real red and green rather than some substitute color that looks less natural. Not only that, the wavelengths of light that do reach the wearer's eyes are largely sensitivity maxima. Thus, natural color perception is not only improved, but the retina is substantially more sensitive to the light in the FOV thus receiving the benefits associated with that as covered in the previous patents. Other forms of colorblindness between different colors are handled in the same way as will be understood by those familiar with the area.

With that example as a warmup (though it is a significant embodiment of the current invention it is much simpler than the one that follows), we now discuss a slightly more involved embodiment using FIG. 8A as a visual aid especially, in this example, for those having trouble differentiating between red and green. For this example embodiment only (which uses only approximate exemplary values), filter group a will be 480-510 nm. That will mean, in this example embodiment only, that a left-matrix filter like 202, will filter out the frequency range identified as 705 in FIG. 7 (which is approximately that 480-510 nm) as well as 545-575 nm. The right matrix filter group A sensors will also convert at least some 480-510 nm light to charge/signal.

Similarly, for this example embodiment only, filter group B will be 665-700 nm. That will mean that a left matrix filter like 201 will filter out the frequency range seen as approximately the right half of 706 in FIG. 7 which is approximately that 665-700 nm as well as 545-575 nm.

Also, let the LRC array be configured to be less transmissive in response to a greater charge. This example embodiment will not only provide spike protection (darkening in response to bright light) and preferable transmission of normal or at least low-AOI light to improve the clarity of the view, but it will also improve the ability of the viewer looking through this assembly to distinguish between red and green. Consider for example normal light (perpendicular to a surface and having zero AOI) entering along the path of arrow 212 in FIG. 8A. It first encounters a filter group A left matrix element which removes the ranges 480-510 nm and 545-575 nm. When that light (still following the path of the arrow 212) reaches the right matrix element which is also a filter group a element, that filter group a element is sensitive to 480-510 nm which was already removed in passing through the left matrix. Thus, the sensor's associated LRC does not receive a charge to cause it to reduce its transmissiveness.

However, non-normal light, such as light following the path of the arrow 213 in FIG. 8A, will result in a charge between the encountered sensor and its associated LRC(s) and thus that LRC will responsively reduce its transmissiveness. Thus, low AOI light is favored for transmission. The improvement in the wearer's ability to distinguish between red and green are due to the removal of light in the range of 545-575 nm as it passed through left matrix.

Also, normal light that first encounters a filter group B element in the left matrix such as light following the path of the arrow 101 will, for the same reasons, not generate a significant charge/signal for LRC 101 and thus the transmissiveness of LRC 101 will not be lowered. Thus, that normal light is favored for transmissiveness. The improvement in the wearer's ability to distinguish between red and green are due to the removal of light in the range of 545-575 nm as it passed through left matrix.

Of course, the same principles apply to other color distinguishing deficiencies; all that varies is which wavelengths are removed to better separate the two colors that are difficult to distinguish for the user. It is also worth mentioning that for this unique embodiment the only wavelengths that are removed by both the left and right matrix are sensitivity minima and the just the narrow band of wavelengths we remove to improve the distinction between confused colors. Thus, the light passing through the LRC array can be of any color and/or all strongly visible colors at the same time. Thus, for this embodiment, the view from the perspective of the eye as illustrated in FIG. 10C could result in all of the letters in that figure being changed to "W" instead of R, G or B.

Some implementers will, alternatively, simply add a filter or the equivalent thereof to any of the embodiments of FIG. 1B, FIG. 2A, FIG. 3, FIG. 8, FIG. 9 and FIG. 12 to accomplish, almost identical results.

For example, in the case of the viewer having trouble distinguishing between red and green, adding a filter to the right of the LRC array that removes wavelengths 545-575 nm makes the two colors more easily distinguished by the wearer. Or, that same filter can alternatively be placed distal to the distal matrix (e.g., of FIG. 9A), between the distal matrix in the left matrix, between the left matrix and the right matrix. left matrix, between the left and right matrix labeled as 208 and even between the right matrix and the LRC array. However, wherever this filter is used, it will not be necessary for any of the other filters to remove those wavelengths (545-575 nm).

Also, it is probably obvious at this point that the framework illustrated in FIG. 2A can also be used to accomplish the same goals as long as the LRC array is configured to increase LRC transmissiveness responsive to an increase in charge/signal.

FIG. 8A seen from the eye's perspective in FIG. 10C. (FIG. 8A can also be used to describe parts of other embodiments including an assembly that favor non-normal light for passage so please note the differences here as we are now describing an embodiment that favors normal light for better color perception.)

Just for this one example use of FIG. 8A, we'll interpret FIG. 8A's Filter group A to be green "protecting". In this exemplary embodiment only, that means that filters in filter group A will remove all colors except green and that sensors in filter group A will sense (and in that process remove at least some green to convert it to a signal). Similarly, for this example only, we will let Filter Group B be red which will mean in this example that filters in this filter group B will protect red (removing all other wavelengths) and sensors in this filter group B will convert at least some red to signal.

Thus, when seen from the aforementioned perspective of LRC 107 in FIG. 10C, light entering towards that LRC 107 along the path of arrow 101 in FIG. 8A enters the red protecting left matrix filter (and/or PV), 201. The red light that continues to the red-sensing sensor 205 which creates little or no signal for the associated LRC 107. Thus, with LRCs configured to be less transmissive with an increase in charge, will, with little or no charge to make it less transmissive, will, when possible, result in it being more transmissive of the red-containing light that we see exiting 107 in FIG. 10C.

Similarly, normal light passing through 202 will lose all of its wavelengths except green and in the preferred embodiment that emphasizes sensitivity maxima, those green wavelengths will be limited to the ones to the left of 709 in FIG. 7. That normal green light will similarly be favored for transmission since little or no charge will be generated by sensor 206 because it needed the wavelength removed by 202 and, thus, transmission of green light through LRC 211, as can be seen in FIG. 8A and FIG. 10C (which has a "G" in 107 to indicate the green color).

Of course, a non-normal path such as light passing through 201 (and thus losing everything but red) and then striking 210 (a Filter group A sensor that is only sensitive to green) results in no activation of LRC 209 thus favoring normal light. A quick look at FIG. 9A will, with all the preceding explanations, will assure that the same functions described here will work in an embodiment with additional layers, such as the Distal matrix as well as more colors (including white). However, it will be much quicker for all of us to continue to use FIG. 8A in this discussion.

These illustrative specific wavelengths are, of course, simply place holders but they do explain the concept. Not only do the sensitivities of certain people's eyes, particularly when these are adjusted for corneal and lens absorption, there are regional disagreements in the scientific community on the exact placement of these wavelength groupings. Neither is it necessary to divide the curves to the right or left of their maximum sensitivity point on the curve. This was simply exemplary as one functional wavelength parameter of the many that will be used by those familiar with the art. For many applications that large a division will be considered extreme and smaller changes will, in fact, add to brightness. However, FIG. 8 is a very simple example of one set of values applicable to exaggerating the difference between two confused colors with the current invention to improve the distinguishing of one over the other. For tritanomaly, the much rarer blue-yellow colorblindness where it is difficult to distinguish between, for example, blue and green due to inadequate blue sensitivity, at least some of the longer wavelengths of green are similarly filtered out or filtered down. The shorter green wavelengths are less filtered down since these also activate the blue cones which need all the help they can get. Other adjustments will be apparent to those skilled in this area and these vary somewhat between users.

When spike removal functions are in use, these may be effected simply by application of local electronics preferably between the sensor and the LRC as are commonly understood including, capacitors to enforce a maximum by a siege, resistors, it's ever. However, when processors are engaged, spike control is better administrated by the processor(s). When SAGA and/or dark adaptation are in use, the processor has the ability to control the signal to the LRC and thus effect the desired amount of passage through the LRC.

Simultaneously improving color separation perception while removing glare and severe bright spots (spikes of light) as well as optionally managing darkness adaptation to keep the brightness to the eye instantaneously adjusted a rapidly changing environment significantly improves the vision of the viewer. Each of these individual components are, of course, optional but in combination they exceed the sum of the individual component benefits.

2. In another optional embodiment, an additional filter layer preferably proximal to the LRC array (i.e. between the LRC array and the cornea of the eye) added to any of the embodiments. For example, FIG. 2A (also, of course applicable to FIGS. 1, 3 8, 9 and 10) filters that (like those just discussed above that provide more separation between two colors that are confused by a user) may be arrayed in any form but the simplest to explain may be the Bayer-like format of exemplary elements inside perimeter 127 (which is a dotted-line perimeter) have limiting the green wave lengths passing therethrough is added. By referring to FIG. 7 the nature of the added filter for the blue and red LRCs will be apparent. As in the previous example that alternatively used the already present left matrix (and/or distal matrix) for this function, color perception for those with difficulty distinguishing between certain colors is enabled by selecting which portions of each color when used would provide the best color separation perception.

3. Processor control of the relative color intensities using the current invention further enables potentially more efficient (brighter) images and/or more perfectly identified colors than even the already disclosed elements. As already disclosed, selectively filtering to augment the difference between color groups is an effective way to improve color identification for those with color deficiencies. Alternatively and/or additionally, processor controlled color balancing can substantially improve even that.

From the perspective of the eye, "color" LRCs like 107 in FIG. 10C may be arrayed in any form but the simplest to explain may be the Bayer-like format of FIG. 10C. The dotted line 127 simply highlights the grouping of what may be considered analogous to a 3-color (RGB) pixel. For example, behind the "red" LRC 107, (in fact, way behind 107 at the most distal layer which in FIG. 8A is the left matrix) is a red-protecting filter that, in this embodiment, remove all the wavelengths except red. After normal light passes this filter, it encounters a red-sensitive sensor that is also behind 107 and creates the charge that activates LRC 107. Similarly, the two green LRCs that are also within the dotted line 127 have green protecting filters and green-sensitive sensors behind them to activate them when light strikes those green protecting filters. The other LRC in 127 is blue and, of course, has a blue protecting filter and a blue-sensitive sensor behind it. The significance of 127 is simply to identify a grouping in the format of FIG. 10C that can be considered to act like a pixel. That is, when appropriately proportioned, sized and positioned, the three colors grouped together in 127 appear to the human mind to be a single color (analogous to a pixel). The relative brightness of each of those three colors determines the perceived color of that pixel as is commonly understood by those familiar with RGB-based pixels. Thus, even if the filters in the left matrix do not, as above described, enable better color selection by selected wavelength ranges that accomplish that, the processor(s), connected to these LRCs adjust the relative openings of the LRCs in 127 to achieve a balance that will, to a person with some color blindness, appear more correctly colored.

For example, to use an earlier example, consider that same viewer who is exposed to what a normal viewer would see as bright red light with relative values of (255, 135, 0). However, due to color vision deficiencies, the viewer sees something perhaps equivalent to a muddy (210, 180, 0). This time, instead of using filtering to solve the problem which can incur some brightness loss, the processor further increases the passage of light through the red LRCs in 127 while simultaneously reducing the passage of light through the green LRCs in 127 to allow the color weak viewer to see a corrected color, e.g., (250, 135, 0). The correction amounts will, of course, as understood by those familiar with correction of color vision, be different for almost every user. This will, in embodiments without an adequate user interface, required data specific to each user. However, as detailed herein, an optional user interface (whether a laptop computer, a telephone, hand signals recognized an image captured by the processor in embodiments using camera functions, audible signals, or any elements that a user uses to communicate with a processor via a wired or wireless connection), will provide the user the ability to adjust the levels of these programmatic brightness controls for different color elements in real time and to their preference. This is advantageous because it allows the use of an all three shelf product that can be simply configured to each user. This is an advantage also over the earlier-disclosed filter controls because it can be adjusted by the user and/or the processor in real time. For example, the processor can make independent programmatically-driven changes and/or user instructed changes to balance adjustments based on the instant lighting environment that the processor has sensed through its connections to the sensors.

4. Custom pixel component color shift without a processor: Of course, LRC settings in original assembly can accomplish the same functions but they are less amendable. This can be as simple and permanent as selecting corrective responsive output of LRCs for each color at the time of manufacture. Or, ordinary transparent electronic components (transparent resistors, transistors etc.) can be used without a processor to similarly boost or reduce the output of each of the 3 colors in a pixel to thus correct vision.

5. Finally, enabling the filters of the current invention to, for each color, favor the passage of sensitivity maxima wavelengths also aids in causing the viewer to see true colors. By using the wavelengths that the color cones and rods are more perfectly tuned to, balancing the relative color ratios can be done with great precision by fixed electronics and/or processor control as described above.

In some embodiments and for some users, it will be advantageous to use one combination of these elements in one eye and another combination of these elements in the other.

Although any of these can be used individually as a useful embodiment, they also work well in any combinations of them to improve human vision. In one preferred embodiment, all of these vision improvement elements and others are used together. For one partial example, normal light is favored, extremes of brightness and glare are further controlled by the electronic pupil (discussed herein particularly with reference to additional camera applications) and SAGA (spike-attenuation) and darkness adaptation instantly adapt the light entering the eye to rapid changes in and extremes of environmental lighting conditions. For applications where color vision improvement is needed, many of the above color vision improvement elements can be simultaneously applied.

In original manufacture the filters of the left matrix (and/or any other filters including distal matrices used an embodiment with additional levels e.g., FIG. 9A) are arranged, as described above, to provide at least slightly better perception of separation between colors based, as described above, on the sensitivity wavelengths that are approximately described in FIG. 7. However, when all the elements are used together, less filtration is required and this is good for overall brightness.

Processor control of at least R, G and B containing pixels (they can also contain white and black LRCs) which further allows additional perception separation by individual processor control of LRCs. This allows both processor driven and user directed adjustment in real time. The magnitude of these needed changes can be minimized by the implementation of non-processor custom pixel shift during manufacture to provide some of the separation as described above. Finally, in selecting ranges to be filtered, sensitivity maxima are protected.

In summary, with reduction of high AOI light, removal of glare, protection from spikes while continuing to protect a wide dynamic range for the retina, instant adaptation to sudden changes in lighting environment and, optionally where needed, color corrected vision, you can see gooder.

Figure 5A:
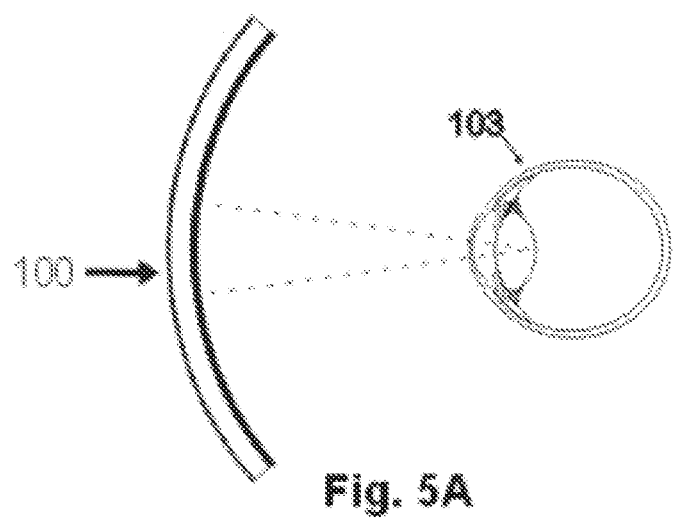
FIG. 5A describes a positional relationship of an eye to an assembly 100.

As the eye saccades, of course, the assembly 100 follows along with it keeping the center of the eye's high-resolution areas as discussed above no matter how much or how fast the eye is moving around. However, this is not just applicable to contact lens embodiments. The curvature of the matrices and LRC array in FIG. 2A is intended to also aid in illustrating an embodiment that is worn like spectacles. Here, these elements and at least central portions of the cornea and lens are configured so that as the eye rotates, its central view simply moves to a similar angular environment. For example, when the not-illustrated eye of FIG. 2A (though the relative positions of 100 and an eye are summarized in FIG. 5A) rotates upward such that the arrow 212 in FIG. 2A now points (as did the arrow 101 did before) towards the fovea, the AOI light management works the same way as just described above.

Thus, using these embodiments to selectively favor passage of light with a low AOI and, alternatively (optionally in the same adjustable device) to disfavor passage of light with a low AOI provides an enhanced view into objects (not just revealing crystals but other difficult and complex views) that allows things to be seen that might otherwise be missed. In adjustable embodiments, some of which are described herein, the user and/or processor logic adjusts the AOI acceptance angles until the desired view is achieved and otherwise hidden elements in the objects viewed are revealed. And, the visible effects of flaws in the shape of your cornea and lens are also minimized or removed.

Thus, modifying the thickness of the region identified by 208 by adjusting the distance between the left and right matrices optionally in real time will adjust how much preferential transmission of near-perpendicular light is implemented. Of course, choice of element size is also an implementer preference that adds to the ability of the assembly to accommodate a wider variety of applications and conditions. Thus, a user wearing "glasses" with 2 surfaces (e.g., the left and right matrices) separated by an adjustable space like 208 will be able to adjust how well dim objects may be observed and how much glare from high AOI light is removed. These settings may, of course, by implementer preference, be fixed for a specific application. However, in assemblies resembling spectacles, an adjustment screw or actuator-based adjustment (e.g., actuated via smartphone connected usually by radio frequency to the assembly's actuator(s), etc.) modifying the distance illustrated by 208 allows fine tuning of the assembly 100 to the needs of the current ambient light environment and the needs of the user at the moment.

For embodiments where the elements of FIG. 2 are in or part of contact lenses and are intended to be adjustable, adjustments can be made with piezoelectric (leveraged or unleveraged) expansion/contraction of 208 (or other mechanics for adjusting 208). Here a piezoelectric or any other actuator is placed between the left and right matrices to adjust the magnitude of that divide as is commonly understood. In the preferred embodiment there are 3 actuators located equidistantly on a vertical plane normal to the paper of FIG. 2A and between the left and right matrix. Addition of a lever, preferably one for each actuator, to increase or decrease the magnitude of actuator response and/or to reverse the direction of change is not drawn but commonly understood. These 208 adjustments can be automatically responsive to the magnitude of charges received by LRCs either by simply linking, for example, the piezoelectric or other expander to the charge passed between sensor and LRC wherein the magnitude of that charge automatically drives the thickness of 208 either directly or leveraged. Or, in embodiments with processor elements (either processors for each LRC or more generally linked processors), the processor(s) may be used to drive these adjustments. Also, additional power sources added to any of the above circuits is an obvious embodiment of the current invention.

In the above example (using the equivalent of a "normally black" LRC array with an effected threshold so that it's not too dark) the wearer/user is protected from glare by the partial removal of high AOI light. Thus, light coming straight from an object and normal to the eye is a little brighter than high AOI light. So, light from the viewer's periphery is prevented from glaring into the assembly 100. Even light from the same semi-isotropic emitter that provides that preferred light straight to and perpendicular to the curved assembly of FIG. 2A but that is in the outer part of the "pencil" (expanding) beam from that emitter (rather than the central beam) will have a higher AOI and, with proper adjustment and design, is also at least partially reduced or eliminated. Thus, the user has a superior (and optionally adjustable) view. Proper assembly and setup is necessary, however, to assure that the normally black LRC array/surface does not unnecessarily darken the view via proper thresholds.

However, there are also applications of the assembly of FIG. 2A that benefit from the spike removal e.g., "headlight and sunspot removal" and similar application capacity of a normally white LRC arrangement. Note: as used herein this nomenclature is not limited to the liquid crystal components that have popularized the "normally white" and "normally black" (or the "normally off" and "normally on") descriptors. They are just very handy and widely understood references to those characteristics.

Those familiar with the SAGA (Spike Attenuating Gate Array as described in the parent patents to this one) elements will see the obvious applications thereof here. For example, when looking straight at a headlight with that direct light coming towards the eye along the path of arrow 101, the strong (based on the Group A unattenuated signal to 205) signal to 107 (either by direct electrical transit via already discussed components or via processor control) results in the attenuation of that light through 107 thus protecting the eye. The establishment of thresholds, ceilings, floors and graduated responses whether by electronic components (e.g., resistors, capacitors, transistors, etc.) associated with operably connected sensors and LRCs and/or processor controls, while discussed herein are also commonly understood. When the wearer is looking at a shaded pedestrian on the road, that dimmer light sourced signal results in a smaller or non-existent attenuation of the LRC that it reaches so that, while the headlights are dimmed, the pedestrian is not.

Although, to be less tedious, most descriptions herein use liquid crystal LRCs as an exemplary LRC, it should be noted here that there are many other applicable LRCs and that, for those embodiments using electrochromic LRCs, filters in the left and/or right matrix will often be configured to remove filter group wavelengths that match a predominant wavelength injected by the LRC. For example, if an electrochromic LRC responds to a charge by darkening from clear to a narrow range of blue, it is advantageous if that at least some part of that range of blue wavelengths is removed by any of the filter groups so that the view of the user is not as excessively blue in appearance. For example, that range can simply be partially or fully removed from one or more filter group just as an additional wavelength to be removed (optionally, multiple ranges removed by a single group). However, it's even better when, in this example, that blue range is one of the wavelengths converted by the sensors into charge/signal. Additionally or alternatively, to maximize potential vision brightness while mining/removing wavelengths to provide power/signal for the LRCs, it's also useful to do so with sensitivity minima where practical. Sensitivity minima, suggested by the approximate ranges indicated by 704, 705 and 706 in FIG. 7, as discussed extensively in parent patents, are wavelengths that, while in the visible spectrum, are less absorbed by chromophores of the retina. For example, the higher wavelength (right) side of range 704 and the lower wavelength (left) side or 705 may include blues that can be mined for power without as significantly reducing brightness while still favoring a ratio of S, M and L color cone output (the ratio of these 3 numbers together is what the brain uses to determine the color we "see"). Thus, the color can be managed to not be as excessively blue (or whatever other color needs to be adjusted with respect to the eye's perception).

In embodiments where the LRCs are at least partially adjustable between completely normally black and completely normally white (via partial rotation of at least one of the polarizers in assembly or in real time, charge adjustments to liquid crystals, polarization control of entering light, half-wave plate insertion or rotation or any other form of adjustment) these adjustments allow a useful "mode selection" ability for changing circumstances. As described herein, these can be intrinsically electrical requiring no processor, processor driven, smart phone interface driven and/or user controlled.

One advantage of all embodiments using global processors (e.g., a single processor controlling the entire assembly instead of a tiny processor for each node or node cluster such as a sensor and its associated LRCs . . . although it should be noted that both global and per/node processors will exist in some applicable embodiments) includes the ability of the processor, responsive to processor identified data, processor logic, and/or user/smartphone app interaction to adjust these and other adjustment criteria responsive to a current situation. In some such applications with a clock function associated with the processor, the SAGA function functions can all be implemented in these embodiments. So, for example, the eye can be caused to be gradually dark adapted and immediately adjusted to sudden bright light by processor-driven adjustments to LRC passage of light.

In highly useful hybrid embodiments, both spike reduction and vision quality enhancement from low AOI preferential passage via LRCs will exist at the same time in the same assembly. For example, as directed by processors and/or electronic elements associated with the sensors and LRCs, in this embodiment low AOI light will (as described in detail above) be brighter (less LRC-reduced) to the eye than glare and light from the outer portions of a pencil (expanding beam) of light from an object. However, for very bright points in the FOV resulting in large sensor charges, brightness ceilings are implemented by processors and/or simple capacitor, resistor and other component charge-passing ceilings (i.e. any electrical component that limits charges to LRCs to a maximum or graduated moderated range). Even a naturally black LRC can be used for spike protection (e.g., reduction of headlight brightness) by this management of excess brightness. While this may be implemented as a simple cutoff, it can also follow a graduated scale that reduces light more the brighter the source (and thus the charge to the LRC) is. In embodiments where processors are operatively connected between sensor and LRCs, these are managed programmatically. In embodiments that don't use processors for this function, ordinary electrical components, preferably between sensor and LRC, effect these changes (e.g., graded grounding of excess signal charges via capacitors and resistors and other electrical components as is common).

A camera in a contact lens: The current invention's ability in a number of embodiments to selectively manage the transit of light based on its AOI or other directional characteristics provides a useful mechanism that can be applied to not only improving the view therethrough but to capturing an image of it electronically and simultaneously. For example, permitting only the passage of light that is roughly normal to an optic can be very useful beyond removing glare, glint and even fog. For example, this selectively oriented light plus the electronic charges it creates on the sensors is representative of an image of the FOV. Consider for example the assembly 100 in FIG. 2A a path of light that is normal to the surface of 100 (and may also be near normal to the surface of the cornea of the eye). By selecting the distance between the left and right matrices (the separation area 208) and/or selecting the size of the elements in the left and right matrices (they don't have to be the same size), light that is approximately normal to the surface can be adjustably favored for passage through the LRC array. Adjustments can be made by a user and/or processor to control AOI preference to adjust for best vision. Transparent conductive connections (e.g., indium tin oxide or ITO) between an optional processor and the right matrix of sensors as is normal for image data collection allows interpretation of the charges to represent an image as is commonly practiced (e.g., interpreting CCD signals/charges to form an image).

The charge image can be adjusted in real time or post-processed to flatten the image as is common. You can think of the left and right matrices of filters as a kind of a lens. Like a pinhole lens, it organizes the light into a discrete image from the chaos of light coming from all directions to collide on the cornea.

In fact, an embodiment having just the left and right matrices, in coordination with a processor to capture the charges from the right matrix elements via conductive connections are (in an assembly that does not require an LRC array and thus is best illustrated by simply erasing the LRC array in FIG. 2A) is a camera roughly analogous to a lens and a CCD with a processor to read the charges from that charge coupled detector. As a node on a CCD represents a portion of the FOV that is organized by a lens, a sensor in the sensor array represents a portion of the FOV that is affected by the elements and relationships between the left and right matrices. The distance between the lens and a CCD determines the focus of the image on the CCD and the depth in (distance into) the FOV that it favors. The distance between the left and right matrices in most embodiments (e.g., FIG. 2A) serves a similar function. However, with the addition of the LRC array so that the assembly appears as shown in FIG. 2A, the vision improvement functions are also simultaneously available. The LRC array's presence also adds new features to the camera.

The elements in FIG. 3 can be seen as fully functional cameras. Both FIG. 3A and FIG. 3B include "blinders" like those identified as 300. These particular angle of incidence limiting components configured to favor passage of light with at least one preferred angle of incidence; are called blinders due to similarities with the old blinders that used to be worn by horses to block equine peripheral vision while fully allowing a view of what is ahead. Although these illustrated in FIG. 3A appear to have only a "ceiling" and a "floor", they can also be configured to potentially block (at least when activated for active LRCs) and protect any of and/or all the sides of the channel. A channel can be defined by a rectangular light path whose proximal end we see in FIG. 4A or FIG. 10A or FIG. 10C. A channel can also be configured to be a hexagonal light path whose proximal end we see in FIGS. 4B, 4C, 4D, and FIG. 10B. And channels can be grouped by perimeter-bounding blinders acting as a perimeter for that group like 401 in FIGS. 4C and 10B or like 121 in FIG. 10A.

These LRC (passive or active) blinders may be simply at the top and/or bottom of a channel as drawn for applications where overhead sunlight and/or reflected light off of water (respectively) are the major concerns (left and right are obviously options). Or, the blinders may fully surround the channel topped by LRC 107 (the channel we look through when looking through 107 (in FIGS. 1, 2, 3 and 4). Some blinders surrounding a single LRC-topped channel will be square or hexagonal as shown as the channel topped by 107 in FIGS. 4A, B and C. Regarding the use of "topped" herein: the LRC is the closest thing to the eye so it looks on "top" of the channel of elements behind an LRC. Alternatively, some blinders will follow the outlines of the potentially larger apertures of groupings like 401 groupings. And some will do both. For example, in one embodiment the individual hexagons (like the channel topped by 107) only exist at the top e.g., the top of the channel topped by LRC 107 in FIG. 4C to knock out extremes in overhead light but will be fully surrounded by a super channel like 401 wherein the paths topped by the elements in 401 are fully surrounded by blinders to protect against glare and high AOI light while reducing diffraction compared to fully surrounding each individual and smaller hexagonal channel (this is useful in very high-resolution embodiments where LRC sizes are very small).

For example, light following a path similar to that of arrow 301 in FIG. 3 can have a high enough AOI to reach a sensor that would, despite the light not being normal, still encounter a sensor (like 214 behind, i.e. distal to, 220) from a group that converts the still available wavelengths to a strong charge. However, these will be blocked by LRC blinders (even if they are just opaque layers or if they are active LRCs) to further refine the AOI selectivity for a better view and captured image.

In fact, FIG. 3B, which is normally seen as a screen or spectacles, can, with processor(s) operatively connected at least to sensors and even without the LRC array, be seen as a fully operative flat-panel camera. As drawn, the paired filters and sensors of the left and right matrices select, based on the separation of 208 and the resolution of the elements, largely normal light. The precision of this AOI selectivity is enhanced by a larger number of matched groups some of which are discussed herein. Also enhancing the effectiveness of AOI selectivity are the LRC (passive, active or both) "blinders"

FIG. 3B even without the LRC array, is a simple telecentric camera whose undistorted image is the same size as the portion of the FOV that it images. Without the LRC array you can still look through the assembly 100 to see what is being photographed as you would look through the viewfinder of a camera. However, some telecentric camera embodiments will include the LRC array to better see how it looks, to adjust the gap 208 and position the camera for the best image.

In appearance, these can look like a piece of glass. Large embodiments increase the potential for detail. As part of a flexible assembly these can even be rolled up as some displays now are. A relatively thin layer on the back of a notebook or folio can be a camera as can the wall of a room or building.

The same logic applies when we see FIG. 3A as a camera except that it is not telecentric since it samples normal light from the FOV. This camera is not limited to any width and can, in a fully spherical (100 is a ball from the outside) embodiment, capture 4 Pi steradians of image at once which is a rather unusual feat for a non-stitched and un-warped real time image.

Of course, since the processor(s) interrogate(s) the sensors in real time, these cameras all record both snapshots and moving images.

Microphone: Of course, a microphone to capture sound to an operatively connected processor for transmission via Bluetooth or other wireless communications to external devices, etc. to go with a live video image, can be simply attached to the contact lens (scleral contact lenses have extra room when needed) or to any other embodiment including large-scale cameras and the frames of spectacles However, an additional layer normally distal to the left matrix on spectacles or even contact lens embodiments, can also serve as a highly sensitive microphone when that layer varies its conductivity responsive to small changes in pressure. Commonly known examples include carbon or silver-containing plastics or crystals. In one such embodiment a current is run across the layer and the processor monitors the changes in current flow and converts as is commonly understood these fluctuations into sound. In other embodiments, such as those using piezoelectric elements, the charge produced responsive to the pressure can be enough to sample the sound. In one embodiment at least one piezoelectric element is somewhere between the most distal layer and a subsequent layer which may be at 3 points in 208. In fact, the assembly used to adjust the distance between layers itself, normally a geared adjustor as will be understood, is itself, with the insertion of a piezoelectric element on or as part of the adjustment mechanism to generate a signal as sound vibrates the distal layer and this vibration continues to apply pressure to the piezoelectric or other pressure sensitive electronic element.

The assembly of FIG. 2A including its LRC array and preferably with a global processor (controlling LRC elements centrally via transparent, e.g., ITO, traces in addition to any also applicable direct connections) enables additional camera and vision improvement functions beyond capture. The aids to the user's vision problems do not require distance-to-view change accommodation (adjustments for the distance to the object).

For example, farsighted people (with hyperopia) can't see near objects well because light from near objects entering the pupil's diameter have a higher divergence (the pencil of light from a single point on the near object to the diameter of the pupil is a larger expanding angle) than the less divergent (i.e. more nearly parallel) light from a more distant object whose pencil of light has a much lower divergence angle. For hyperopes this near object's pencil is too divergent for it so that the cornea and lens can't get the outer edges of the pencil focused back down to a point in time for landing on the retina. (Myopes have the same problem but in reverse e.g., focusing to a point before reaching the retina for far objects, so, that being obvious, they're not mentioned here.) However, in each such pencil of light from a point emitter in the FOV to the opening of the pupil (forming a cone or "pencil") there is a central beam and nearby beams nearly parallel to that central beam that enter the cornea near its intersection with the optical axis. Corneal curvature distortions and their focal-error issues are typically less serious or even non-existent for light passing through and relatively near this central point.

So, consider, for example, a contact lens embodiment of FIG. 2A. Though the eye moves, its relationship with the angles of incidence from relative points in the instant FOV remain constant (unlike spectacles where any focal differences in different parts of the lenses, e.g., progressive lenses change those spatial relationships as the eye moves). Although a scleral contact lens (weighted and otherwise configured to attain and hold position) is preferred, any contact lens form factor is applicable. With adjusted filter and sensor positioning, the relative positions of the left matrix elements and right matrix elements (and the LRC elements that typically follow the positions of the elements of the right matrix) are arranged to favor passage of light that enters near the center of the pencil of light's passage through or near the intersection of the distal corneal surface and the eye's optical axis. I.e. both normal light is favored for transmission and a pupil is effected as needed as described herein. (Regarding using the optical axis as a reference point, some implementers may prefer to use the visual axis as the reference point here instead of the optical axis. That reference point is also an acceptable embodiment of the current invention; simply insert "visual axis" where we say 'optical axis" when it's being used as a reference point.)

Instead of or in addition to that, when a global processor is used, a global electronic pupil (GEP) can be implemented by individual or group processor activation of LRCs. This is powered either by captured energy from sensors, additional light sensitive elements like PVs, conventional power sources like battery, etc. or any combination of the above. Here, in the preferred embodiment, LRCs near the optical axis (e.g., along the path of arrow 100) are less or completely unrestrictive to passing light while those more peripheral to the optical axis are more restrictive responsive to the charges to them as directed by the processor. For example, when the LRCs in FIG. 2A are seen as normally black (one of the options), then light passing through the path identified by arrow 101 will have the wavelengths that the target sensor/PV it encounters (here 205) converts into power and that charge/signal will open up the associated LRC(s) (in this example 107).

However, imagine concentric circles all centered on the optical axis. The areas on the contact-lens-mounted assembly between each pair of adjacent concentric circles we will call bands. In some embodiments (including this example one) there will not be a band coincident with the optical axis (that "null band" having one of its "sides" being the optical axis itself) since some light coming through is normally desired. The small always "open" area centered on the optical axis is called the null band. It can be "shut" but is normally open. But, from the first non-null band (just distal to the null band at the optical axis; this is the smallest of the concentric bands) through the most distal band are known locations on 100 that need not change in terms of processor addressability. Thus, addressing them is a simple matter that doesn't change with user area of instant interest.

There can be any number of bands but for simplicity let's look at a really simple (i.e. low resolution) embodiment in FIG. 4C where (as FIG. 4C is now imagined to represent the current example) LRC 107 is centered over the optical axis and thus, in this really granular example, is the null band. (The numbering similarities between FIGS. 1, 2, 3 and 4 are intended to make the various views easier to be seen as different views of the same device.) The innermost non-null band, band 1, includes 209 and 211 and the other 4 hexagons inside 401 except, of course, the null band where we find LRC 107. This defines a rather granular circle made up of only 6 channels around 1 null channel (in most applications there will be many, many more LRCs than we could illustrate here and thus much greater resolution and thus less granularity; but this is a good simple exemplary view) as seen from the view of FIG. 4C.

Although it is not a matter to the current invention which addressing method implementers use since there are so many, a couple will be mentioned as examples.

1. Wherein bands are addressed by local processors that are local to a group of elements. Here, (in addition to other grouping transparent electronic elements that, for example, establish floors, ceilings, etc. for LRCs and/or sensors) each band is directed by a processor with connections to LRCs and/or sensors and power to change the activation levels of that band. These local processors can be programmed to respond, for example, to a threshold brightness level (seen as a charge/signal level from one or more of the elements in the group (e.g., 210 which is the sensor directly behind 209) by reducing or increasing passage through that band based on that brightness (i.e. that charge/signal). Thus, a contracting or expanding pupil can be controlled completely by a band-specific local processor or processors without central processor control between the various bands since each band has its own parameters. In the embodiment with a processor for each band operatively connected to at least one sensor in that band and controlling the LRCs in that band it will be normative, of course, for the band closest to the null band to have the highest brightness threshold for beginning to darken a band. The farthest band from the null band will normally have the lowest threshold and so on typically along a gradient so that the assembly behaves like a normal pupil except for at least two factors. First, the pupil can be adjusted by the user to his satisfaction and secondly each band does not have to be either opaque or transparent but any band can be partially darkened. That is important when user or processor adjustable brightness needs require a higher "f number" (a smaller aperture) but brightness considerations represent a need for user selection along with scope of 208.
2. Wherein bands are addressed by central (or at least grouped; e.g., by bands) processors. Here, instead of a processor for each band individually operatively connected to a single band for the control of only that band, the bands or at least groups of them, are managed by a smaller number of more central processors.
3. Wherein bands are managed by both central and local processors. Some implementers prefer these for hierarchical control which also adds economies in communication bandwidths and power economies.
4. Wherein bands are addressed by processors (of any kind or groupings) as directed by the user.
5. Wherein bands are controlled not by processors but just by electronic components commonly used to maintain charge, voltage or current thresholds (e.g., capacitors, resistors, etc.).
   a. In one such non-processor-needed embodiment this can just be a single sensor for each band (or an additional sensor specifically added for this function) to, responsive to the signal/charge received, darken or lighten a band. Of course, each band will still have a different threshold as discussed.
   b. In another non-processor-needed embodiment a single central processor operatively connected to at least one sensor in each band, performs the actions.
   c. In another non-processor-needed embodiment, electronics associated with each individual LRC, responsive to at least one associated sensor, adjust to that charge/signal according to the band they are geographically located in. In one embodiment all of the LRCs that fall within a given band perform the same electronically enforced response to brightness and thus perform at least approximately as a unified band. This embodiment easily incorporates both overall brightness control for the entire FOV and individual LRC spike protection to remove bright spots of light whose bright signal to any given LRC can make that LRC darker, for example, than other LRCs in the same band.
   d. In another non-processor-needed embodiment groups of LRCs like 401 in FIG. 4C perform in the same way. For example, the charge from sensor 205 (that's behind LRC 207), according to local thresholds or scales effected by electronics local to 401, darkens or lightens LRC 107. In one embodiment all of the groups (e.g., 401) that fall within a given band perform the same electronically enforced response to brightness and thus perform at least approximately as a unified band. This embodiment easily incorporates both overall brightness control for the entire FOV and individual group (like 401) spike protection to remove bright spots of light whose bright signal to any given LRC can make that group like 401 darker, for example, than other groups in the same band.
6. Wherein bands are controlled by any combination of one or more local or more global processors and local electronics.

Options include gradually, in either the presence of more light or user preference or processor facilitation of darkness adaptation, darkening towards the null band according to a graduating curve which can be context driven and/or less gradual changes or even square wave changes (e.g., white to dark like the boundary condition of an actual pupil's inner edge) at some point away from the intersection with the optical axis. Thus, even as the eye moves and focuses at different ranges, more of the light arriving at a given point on the retina passes through near the center of the cornea (at least when the user or a processor feels that additional clarity or selective brightness is needed) and thus the light on this point is more made up of the central beam of a pencil of light than it is of its outer edges.

This minimizes focal errors and acts as a spatial filter so the wearer sees more clearly analogous to a larger f-stop number in photography. However, the ability of a graduated darkening peripherally in order to favor better vision (without a hard edge equivalent to the leading edge of an f-stop-driven "aperture") provides the means to adjust in real time responsive to changing conditions. A graduated change towards the periphery will often remove the outer edges of the circle of confusion on the retina because the very outer edge of the pencil of light is the most reduced leaving more of the image to the eye (and to that smaller circle of confusion) coming from the central conduit of the pencil of light. Of course, with smaller spatial filters comes less light so the SAGA (Spike Attenuating Gate Array) functions and concepts discussed at length in parent patents is especially useful and now considered briefly here and elsewhere herein.

SAGA: As conceptually discussed at length in the parent patents, this potentially brightness-sensitive (based on right matrix charges/signals) assembly can be used to allow the processor to gradually and unnoticeably effect dark adaptation and also open quickly to respond to a darker environment (like entering a tunnel from a bright day). That same assembly an also protect from spikes (like a headlight or sun) both to allow an effectively broader portion of the eye's dynamic range for dimmer objects and to protect from even the temporary sun blindness or sun spots that are detrimental to true vision.

In the preferred embodiment, the processor captures sensor charges/signals from the sensors (e.g., right matrix) as part of the image capture process anyway and will, in a preferred embodiment as needed naturally increase the f-number, i.e., increasingly darken the periphery and later the bands nearer the null band as the ambient light read in those sensor charges/signals increases. Also, or alternatively (though preferably "also"), the user interface (which is any user interface of any kind to the processor including touch signals, image signals, Bluetooth or other RF communications from a smartphone, keyboard or other computer device) includes the user's ability to control the f-stop equivalent operation just described as well as to control the magnitude of the space 208 and the general view brightness (which is typically increased by adjusting the net charge to LRCs associated with a band or otherwise signaling them to restrict passage less or more via processor traces to LRCs). In one preferred embodiment the user's FOV (e.g., processor interpreted from right matrix sensors) is communicated to external equipment via the user interface's communication elements, the user sees images via the communications components and LDEs (see info on FIG. 13). The user interface also includes the ability of the user to adjust the device using a smartphone and/or physical adjustment on the equipment.

Even in embodiments where camera image capture is not present, implemented, configured or used, this EGP (Electronic Global Pupil whether local or more global processor environments are used" (controlled by a "global" processor thus named because it is operatively connected to many sensors e.g., PVs) pupil is useful and preferred to improve vision particularly for those with imperfect refraction and preferably with both user control and processor rule-based responses to ambient light, etc.

Of course, as every photographer knows, increasing the f-number (decreasing the aperture diameter) while it increases image clarity particularly at distances distal to the precise focal plane of the optics (since it increases depth of field), also decreases available light to the film or CCD and, in the current case, to the eyes. Thus, this is a good time to very briefly revisit the benefits of some of the SAGA (Spike Attenuated Gate Array) and darkness adaptation features that were so thoroughly covered in the parent patents and to a lesser degree elsewhere herein. The LRC array can be seen as one form (of many applicable forms) of a gate array and it is, in the most basic and processor-unrequired embodiments, driven by the sensor array of the right matrix (See FIG. 2A). There will be, in some embodiments, sensor and/or LRC level processors managing both communications beyond a sensor and one or more LRCs.

Using the means described in the parent patents, the processor can facilitate the high potentials of facilitated eye darkness adaptation. For example, it can darken all of the LRCs or just those in particular groups (like 401 in FIG. 4C) or just those in particular bands as described herein responsive to high ambient light (again sensed by the operatively connected sensors) and this is a valid embodiment.

However, an embodiment that improves vision better even in low light performs its darkening in bands (rather than just general darkening which darkens foveal and macular light) to improve perception while managing brightness. Here, the above EGP is reduced in diameter responsive to brighter light and expanded responsive to dimming light. Of course, this means that in any of the graduated or square wave adjustments, manual or automatic, described above, the peripheral portions are darkened to effect a device-controlled pupil. Better than darkening the entire LRC array, this reduces light to the eye while simultaneously increasing depth of field, removing the outer edges of that pencil of light from a point in the FOV, maximizing brightness to the fovea (ideally completely unrestricted) and increasing image sharpness.

As described for parent patents, this provides the processor-managed ability to, in bright or very adequate light, very gradually reduce overall light to the eye (while sharpening the image to the eye) by narrowing the EGP (darkening peripheral LRCs) thus managing a very gradual adaptation of the eye to darkness (making it much more sensitive to light). When this darkness adaptation is managed by a processor according to known timings of the visual transduction system, the managed darkening can be just slow enough to be imperceptible by darkening within the rates of eye darkness adaptation. Thus, good vision is maintained at all times. And, when leaving, for example, a dark tunnel suddenly into bright light, the downward adjustment of LRC light passage is only as much as is needed to maintain instantly adjusted view brightness thus preserving some eye darkness adaptation to be ready for the next tunnel.

This kind of electronically controlled pupil allows largely undiminished light to reach the fovea to provides both good detail, color clarity and stronger edge-detection enabling better depth perception and object recognition. When the ambient light dips suddenly or even gradually, the processor which monitors the LRC signals adjusts the EGP (more open) by increasing the light passage through LRCs associated with bands nearer the null band. Then, as ambient light increases, bands are darkened from the outside in (like a closing pupil).

Thus, the ECP allows the wearer to go from bright sunlight to a tunnel and instantly adjust (because the EGP opens instantly to only the needed degree to preserve adaptation constant) as opposed to getting used to the dark taking many minutes while headlights in the tunnel further blind the eye. In preferred embodiments the user can adjust/override this as well.

Also, in the preferred embodiments, bright spots or "spikes" (like those headlights just mentioned) are still removed using, as described herein, the simple charge from the sensor to associated LRC(s) and/or processor control (optionally incorporating nearby electronics to adjust the signal).

Although the simple embodiments so far only had one filter matrix (the left matrix; that filter preferably being in the form of a PV that removes a wavelength range by converting it to power), both cameras and worn devices (often the same device) can have more layers. These apply the same principles to extended elements to refine performance, for additional applications and/or to gain better resolution. For example, in FIG. 9A an additional layer distal to the left matrix is shown which provides a more tortuous path for light with a non-normal AOI. In the same example we'll describe a color camera embodiment. In this embodiment there are 4 filter groups and more are optional. The distal matrix (the one farthest from the eye and shown at far left in FIG. 9A) like the left matrix can just be filters but both are preferred to be photovoltaics (PVs converting at least some of the "filtered" wavelengths into power that is routed by normal transparent traces to power the unit). At this point the applications and concepts are probably obvious but a good example seems helpful.

Note: In FIGS. 2, 3 and 8 already discussed, life was a bit simpler than in higher-numbered figures. For FIGS. 2, 3 and 8, if Filter group A was red then that meant that a Filter group A filter removed red light and a Filter group A sensor was to sense red. However, the meanings for the legend elements as applied only to filters is different for those figures with a figure number higher than 8 (e.g., FIG. 9 and FIG. 12). That is, because when a filter is to remove multiple wavelengths/colors at a time it is much simpler and less confusing to consider Filter group-identified color(s) to be the color(s) that filters protect rather than the color they filter out. However, sensor legend nomenclature is the same for all figures. For example, a sensor from a red filter group still means that the sensor senses (converts at least part of it into a signal) red.

Consider one example embodiment in FIG. 9 in which Filter group A is Blue. This means that, for a filter in the distal matrix elements in this group like 801 (shaded) or a filter in the left matrix (shaded) like 201, the filter will, in this example, protect blue light and normally remove all other wavelengths (or convert them to power to be used to power at least part of the assembly; either way it's removed). Thus, this example embodiment includes removal of UV and IR for this group. But, for sensor-like elements of the right matrix (e.g., 205) being in shaded group A means that it converts at least part of the blue to a signal.

Similarly, sensor group B regards red. Again, for filters, red is protected (while all other wavelengths are at least partially removed, including IR and UV) and for sensors red is converted to a signal). Group C regards green.

Group D regards white which is a little bit different than the others. Filters in this group will not, in this exemplary embodiment, remove hard-to-see wavelengths (here UV and IR) and sensors in this Group D will convert UV and IR into a charge/signal for at least the adjoining LRC. The more UV and IR the Group D (white) sensor encounters the more charge will be sent to the adjoining LRC, etc. to let white light through.

Of course, we don't have to have 4 groups or color-based groups at all any more than we need 3 layers of matrices to feed the LRC array but this example gives us a chance to demonstrate a number of design benefits and characteristics in a single example.

A brief explanation while looking at FIG. 9A would be that there are 10 arrows illustrated. Only two (101 and 212) are normal to the distal matrix (which is so titled) and only thus these two activate their target sensors creating a strong enough charge/signal to cause more LRC opening (allowing more light through thus favoring low AOI passage of light). Here, a target sensor is the sensor that falls on some approximately straight line that, like the arrows 212 and 101, passes normally through a distal sensor element and a left matrix element that both share the same filter group. So, the target filter for light on the path of arrow 101 is 201 (since it is of the same filter group as 801) and its target sensor is 205 for the same reason.

All of the arrows passing thought point 901 pass through a Group B distal matrix element but only normal arrow 212 passes through both its target filter (a Group B filter in the left matrix) and its target sensor (a Group B sensor in the right matrix) and thereby creates a charge/signal to cause an LRC to open up to allow more light. In embodiments where the LRC array is normally black, it may, as in most normally black embodiments, be adjusted by implementers, as described herein, to a non-black baseline where the LRCs aren't totally black in the presence of no charge/signal but they are lightened (allow more light to pass) responsive to a charge/signal at least up to a point (e.g., in embodiments simultaneously providing spike protection, dark-adaptation and other SAGA benefits wherein the charge/signal from excessively bright light is reduced either by local, at the node, electronics e.g., capacitance limiters and/or by processor control).

The other 5 arrows that pass through point 901 are lost to posterity. The arrow paths above and below 212 as well as arrow 902 do, in fact pass through the left matrix like it's clear glass because all three arrow paths do, in fact, pass through a Group B (unshaded) left matrix element (which are also red-protecting, thus only remove the wavelengths that are already removed so nothing is lost in the left matrix). However, when these 3 non-normal arrows get to the right matrix (having no blue light after passing two filters that remove it and any other wavelength other than red) they encounter a Group A-protecting sensor (blue) that converts blue to signal/charge. But there is no blue so there is no charge so, in this embodiment, the LRC lets no light through with those AOIs.

Non-normal light entering along the paths of 903 and 904 don't even make it that far. As they enter the distal matrix they lose all but red light and when that red light encounters the left matrix it passes through a blue-protecting sensor (Group A, shaded) which removes that red light (along with anything else that isn't blue) thus light with that AOI is DOA at the left matrix (essentially all the light has been removed by the distal and left matrices).

Normal light along the path 101 (like arrow 212 as described above) has an easy ride. Its path takes it through two filters (or PVs, etc.) that remove all but blue. So the second filter might as well, as far as the path 101 is concerned, be a piece of glass and the target sensor, 205, converts that blue light to a charge/signal which causes light to pass through LRC 107 (and other LRCs in more mixed embodiments).

Regarding power sharing, in simple camera applications, of course, there will not be an LRC array (ignore that array at far right of FIG. 9A for those applications) and thus all the power generated by the distal and/or left matrices as well as any other form of onboard power (e.g., battery, solar cell, external power transfer elements, etc.) is available to power the processor(s). The charge/signal generated by the sensor provides the data (signal) that the processor needs to, along with other nodes (i.e. other sensor locations) form a signal and store it on local devices and/or transfer it by wire or wirelessly (obviously wirelessly being the preferred embodiment for contact lens applications).

For embodiments using all the elements of FIG. 9A for both camera and vision improvement, the processor is still operatively connected to any needed power sources and it can also manage the signal back to the LRCs. In these embodiments the processor can also enhance the signal to provide more or more complex signal to LRCs as is commonly understood. However, in other processor-present embodiments the processor can alternatively just sample the sensor's charge without substantially depleting it so that the rest of the sensor's charge (e.g., afferent signal to processor and signal to LRC(s) wired in parallel with different resistances) can flow directly to the adjoining LRC (and, in many embodiments) other nearby LRCs as discussed herein.

In camera embodiments where there is no processor and no LRC array (just a camera embodiment), the right matrix signals are still routed to a location but the traces do not have to be transparent since nobody is necessarily looking through the assembly. However, in the preferred embodiment transparent traces are still used so that the camera operator can look through the assembly as one would a camera viewfinder and, optionally, the LRC array is also included to include the benefits of the light passage management (SAGA, etc.). The location that these sensor signals are routed to is an included transmitter and/or storage element so that the image can be transmitted (by any means so that the image can be interpreted by a processor connected to whatever receives the transmitted signal) and/or stored. In embodiments where a plurality of images are stored, the management of those images usually involves a processor-assisted storage device. However, in simplest form, the storage device can simply store the raw charge/signal values for at least one image by well known elements. Multiple forms of data storage including stored signals from the sensor matrix (right matrix in most figures), stored data and even communication buffers are a part of many embodiments that include processor(s).

Of course, FIG. 9A is a cross-sectional view which makes an image with 4 colors (including white in this example) difficult to describe without a change of perspective. To get an idea how 100 in FIG. 9A looks from the eye's perspective (a perspective rotated by 90 degrees) consider FIG. 10A. For example, LRC 107 in FIG. 10A can be seen as the LRC 107 in FIG. 9A. The color of light expected to be coming out of an LRC in FIG. 10A from the perspective of the eye is in most embodiments based on the sensor right behind it. Thus, 107 in FIG. 10A has a "B" in it signifying that the sensor behind it (that sensor behind 107 can be seen in FIG. 9A as 205) is a blue-protecting sensor and you can expect any light that comes to the eye from there to be blue. Looking at sensor 205 in FIG. 9A we see that it is, in fact, a blue-protecting (Group A, shaded) sensor. Of course, 209 (just above 107 in both figures) is the LRC that the eye should see red light coming through since it has (visible in FIG. 9A) a Filter Group A (red-sensing) sensor, 210, behind it and so there is an "R" in 209 on FIG. 10A just to confirm that. Of course, these R, G and B letters in FIG. 10 are simply to identify the color associated with the LRC that they are on since to draw arrows and an identifying number to each would be unreadable. The same is true for all of the elements in the same column as 107 and this matches the sagittal slice of 100 that we see in FIG. 9A. These color arrangement formats are, of course, optional and any Bayer (one of the more historical and common formats) or other format (other examples are FIG. 10B and FIG. 10C) is an applicable embodiment.

Now, looking at FIG. 10A, consider the column to the right of the one we've been looking at. This column is populated by whites and Greens. LRC 122 is in that column. This column, seen from the perspective of FIG. 9B, is the next sagittal slice of 100 (1 slice deeper into the paper).

To help in this thought process are now, hopefully helpfully presented, crudely estimated "calculations" that serve better to grasp the concept than to predict a sensor value at an actual node. They do not take into account varying color makeups in instant ambient light (which varies constantly and even wildly in real time), sensor vagaries, filter curves that change with light amplitude, or wavelength energy values (e.g., blue>green>red). They are what used to be called "spitball" if not SWAG estimations of things that vary unpredictably that can be very useful in understanding general concepts. But do not expect to use them to calculate a future charge potential on you Fluke multimeter when you build an assembly.

As part of this oversimplification, we find ourselves talking like red, blue and green make up the visual spectrum. In fact, though they can together reproduce much of the visual spectrum in human perception based on their relative excitations of short, medium and long cones as interpreted by the brain as color, they are actually just 3 of many useful color frequency ranges in the light energy spectrum. This also helps answer the question "how many Filter Groups could we have?" Answer: as many as you choose. For example, you could establish a pattern that, unlike the simple 3 color plus white of FIGS. 10A and B and the 3-color example of FIG. 10C, sports eight separable Filter Groups (UV, Violet, Blue, Green, Yellow, Orange, Red and IR) each of which represent a well understood and well-known and definable range of frequencies. However, so many groups are unnecessary for this discussion, that many are physically unnecessary (although they are acceptable and covered embodiments) to achieve the effect (which needs far fewer filter groups) and to consider so many groups in an introductory discussion is a recipe for a long and boring patent application. So, let's, for this conversation, think of at least some frequency ranges of violet and blue as what we will call a blue wavelength range, at least some parts of green and yellow into what we will call a green wavelength range and at least some parts of orange and red into what we will call a red wavelength range. To better handle white light, implementers will choose different ranges of IR and UV to balance white light LRCs like 122 to be comparable to the output of individual color LRCs like 128 as is discussed herein. All the possible interactions and complications of 3 visible colors and 2 invisible are enough to bore anyone reading a patent application.

Let's first presume a white light source emitting what we can loosely think of as being ⅓ red, ⅓ blue and ⅓ green despite some pesky details some of which are described and managed herein. While we're making presumptions let's say that for that white light source there are 100 units each for R, G and B for a total of 300 units in our light sample.

So, let's give non-normal white light entering through 912 along arrow 917 a magnitude of 300 units (all colors combined and all colors equally represented for simplicity here). Then, with all those presumptions for that white light, the ideal (max efficiency, minimum loss) ballpark units arriving at a color sensor like 928 for example (the other colors work the same way) which converts green light to a charge/signal would be 100 units. That ideal (essentially ~100% efficient transmission) would, of course, be 300 units if that light source is all green light. Thus, if an all-green light source with the same sensor-excitation capacity as our white light source entered the normal path indicated by arrow 923, that 300 units of green light would survive the distal and left matrices filters (since these Filter Group C filters/PVs remove all but green) and arrive at the green (Filter Group C) sensor as 300 units. The same is true for a normally-aligned red light source and a normally aligned blue light source. So, if all the light is from a single color group range (R, G, or B) and it enters normally (essentially zero AOI) at a distal matrix element protective of that particular color (as 923 is for green, etc) then 300 units at the target sensor is the goal for that roughly monochromatic light source less absorption overhead which is ignored here.

Now, consider normal white light from our 300 unit 3-color white light source that enters via a distal matrix Filter Group D element e.g., 912. (recognizable by its forward slash as being white-protecting as illustrated in the Legend). It is filtered differently than distal matrix elements from other Filter Groups (e.g., the green group we just looked at). For example, light along the path indicated by the arrow 991 has a unique journey. As it passes 912 it loses ¾ of its red (that's ¼ of the original rounded 100 units of red remaining or 25 units of red left), ¾ of its blue is lost (25 units of blue left) and ¾ of its green is gone (25 units of blue left). If all colors were equally represented, that first filter/PV (912) would only pass about 75 of the original 300 units (divided up into 3 colors of 25 units each). Thus, there is significant loss of this normal white light (which contains R, G and B) on its way to a target sensor (like 922).

However, when normal white light enters a green filter (or PV, which is always an option for a filter) like 930, it loses all of the other visible colors (here blue and red) as well as all UV and IR light. (This effect is also true for a blue or red filter in this one exemplary embodiment.) So, perhaps (in terms of our loose magnitude values, imaginatively presuming again equal representation and other things approximately equal), in one such environment this would result in a green filter losing roughly ⅔ of its visible light i.e. the blue and red leaving only 100 units of the original light. Similarly, the blue and green filters can also be thought of as only passing roughly ⅓ (thus losing ⅔) of the light attempting to traverse them (keeping only 100 units each). Comparatively, the distal matrix white elements like 912, only kept 75 units so, it would seem that red, blue or green filter group sensors would create somewhat higher charges to further open their associated LRCs (since the number 100 is larger than 75). However, the white sensors like 922 also convert UV and IR light to signal and, depending of course on how much (how wide a frequency range of UV and IR and how much of it to convert by percentage) implementers convert of these invisible wavelengths, this can be scaled to, in general, with the increased UV and IR converted charge, make the white LRCs emit more light, ideally roughly equivalent to the magnitude of output of red, green and blue LRCs. It does not need to be "equivalent" in magnitude however since it is white light and implementers can determine how much system brightness they want and then choose to converting a broader or narrower band of UV and/or IR to exaggerate the white component (or to mute it). Also, white LRCs will typically also be, by implementer preference, be set "bright". That is, for example, if the LRC is a normally black LRC, more light may be passed due to the UV and IR charges and/or the LRC itself may be set for more passage of light. As discussed herein and as commonly known, this can be done by standing charge (that keeps it partially open) and/or orientation of polarizing layer(s) and/or choice of other settings or materials, for example, different or differently applied nematic materials. Thus, while the above percentages (fractions) are exemplary only, implementers can make the white LRCs "bright" despite the color reductions in the distal matrix. Left matrix elements of the Group D persuasion like 916 filter nothing. With those implementer options considered to compensate for the otherwise 25 unit shortfall in white brightness of a normal light path (like along the path of arrow 991 and 914 in FIG. 9B), we adjust the rough activation of sensor 922 to 100 units (75+25 units from invisible light plus LRC permissibility adjustments). It will be seen that, for the imaginary but consistently fixed magnitude light source that we use as our imaginary light source for each of the paths in this example (e.g., 991, 917, 918, 923 and 914), the anticipated maximum magnitude of normal (roughly zero AOI) white light reaching a white light target sensor like 922 in the right matrix is 100 units.

Thus, we have the ability to balance the comparative light-passage efficiency of white LRCs like 122 and color (R, G and B) LRCs like 128 for normal white light to a rough comparative-only goal of 100 units.

There are, of course, other reasons for this odd treatment of white light in this singularly exemplary embodiment. That normal white light following the path of arrow 991 (like normal light passing along the path of arrow 914) results in 100 units to the target (the element in the path of that normal light) sensor 922 as just discussed. It would be unfortunate, however, if we were trying to favor the passage of normal light and non-normal white light similarly excited sensors that were not on the normal path (examples of normal paths are arrows 914, 991 and 923).

Now consider that same light in the FOV shifting orientation so that it now enters the same distal matrix element, 912, but now along the slightly (how slightly depending, as a matter of scale, on the magnitude of separation represented by 308 and 208) higher AOI path of arrow 917. It is unfazed, of course, by the Group D element, 916, that it passes in the left matrix. But, when this non-normal light that shouldn't be allowed to reach the eye encounters the Group C (green) right matrix sensor/PV 928, that sensor does not benefit from the surviving UV or IR light (its set up to only convert green light) nor does it benefit from the red and blue components of that white light.

So, even just considering the loss of the other 2 visible colors, the light to be converted by the sensor 928 into a charge was already down to about 100 units of the original 300 (i.e. the green component only). And, all but about ¼ of that ⅓ of even the green light that the sensor could have used was removed at the port of entry (912). Thus, of the light source's 300 units, only about 1/12 (or 25 units) of the light that will actually excite the sensor is left so far. Also, though it is not a required element, it can be seen in FIG. 10A and FIG. 10B examples that the white "footprint" is ½ that of the footprint for those other (R, G and B) channels (seen from the LRC side in FIG. 10). So, the magnitude of light along this path capable of exciting the sensor 928 is again halved to 12.5 units. Thus roughly $1/24^{th}$ of the non-normal light excited the wrong sensor.

Similarly, white light with a higher AOI along the path of arrow 918 loses roughly ¾ of its green light passing through 912 which is all that survives the Filter Group C (green) filter it crosses in the left matrix. This leaves only ¼ of the green (25 units) and nothing else survives the Filter group C filter. When it strikes the Filter Group C sensor in the right matrix the light's footprint is roughly half that of the sensor leaving only about 12.5 units to create a charge/signal in the sensor which, compared to the 300 units of green light that came to the same sensor at a normal angle through a green (Filter group C) filter is not a significant bleed-over.

Also, consider high AOI green light winding up at a white (Group C) sensor like the light entering along the path of arrow 924. Let's assume worst case and let all 300 units be green. That 100% green light source survives the distal matrix but is cut to ¼ or 75 units as it crosses the Group D filter or PV in the left matrix. Then, the Group D sensor's footprint is only half that of the light thus absorbing only one half of those 75 units (37.5 units) to excite the sensor (i.e. effect a charge/signal).

Looking at FIG. 10A to think about that footprint issue we begin to consider some of the complexities of three dimensions (multiple slices; FIG. 9A and FIG. 9B illustrate the two repeating sagittal slice patterns) that come into play only with non-normal light. The patterns in FIG. 10 are repeating patterns and you can pick any relative grouped position like the ones grouped by 121 and work from there.

Continuing that same example, the arrow 924 in FIG. 9B enters the distal matrix behind 128 in FIG. 10A which is labeled with a "G" for green because it is a Group C LRC. Notice how much larger the area of 128 is compared to 122. So, half of the light entering behind 122 (along arrow 924) is lost on the narrow little 122 further reducing its effect on that unintended target (presuming we want only normal light). What about the blue LRC, 107, on the left of 122 and the red LRC on the right side of 122? 25% of the entering light's area does overlap onto both of them. However, after passing the distal matrix along the arrow path 924, it's only green light anyway. Since both the blue sensor behind the blue, 107, LRC in FIG. 10A (which is where the arrow 924 intersects the right matrix in FIG. 9B) and the red sensor behind the LRC that is to the right of 122 in FIG. 10A are unresponsive to green, there is zero effect on them from this non-normal light. Other 3-d issues are also covered herein.

Non-normal white light that follows the path of arrow 923 loses all but its 100 green units at the distal matrix. As it traverses the left matrix it loses all but ¼ of that 100 units and is thus down to 25 units. Since it then encounters a Group D sensor which is about ½ the area of that light this limits the non-normal light to excite that Group D sensor to about 12.5 units thus minimizing any effect of the non-normal light.

The above estimations work for the other colors and in other directions as should be visibly evident by this juncture. Of course, in this example "slice" of 100 that FIG. 9B represents, normal light can only strike Filter group C or D which are already covered above. However, non-normal light striking the Distal Matrix slice described in 9B can, in fact, cross over to another slice that's visible in FIG. 9A. In FIG. 10A the slice represented by FIG. 9A (the column containing 107) is to the left of the column representing the slice described in FIG. 9B. It can be hard to visualize in three dimensions however so a detailed example will be provided.

Consider non-normal and all-blue light entering the Group A element on the distal matrix at filter (and optionally PV) 801 in FIG. 9A. That location on the distal matrix seen from the perspective of FIG. 10A is way behind 107 (all the way to the distal matrix). Of that light, only the blue light survives 801. The non-normal angle of that light (and in this example the light is also not parallel to the sagittal plane) takes it next to the left matrix as is normal but this time in another slice (the one depicted in FIG. 9B and seen in FIG. 10A as being to the right of the slice of original light entry) and at another level (i.e. higher as seen in FIG. 10A). There are no 3-D moving graphics in patent applications but you can imagine while looking at FIG. 10A blue light coming through the distal layer way behind 107 (which removes all but the blue light), passing through the left matrix layer and on to the LRC array at 107. Thus, from the perspective of FIG. 10A it comes towards the eye and up and to the right from behind 107 to exit at LRC128. Since the sensor behind 128 doesn't respond to blue light, the non-normal light doesn't change the charge/signal at all. Of course, depending on the magnitude of separation between layers represented as 208 and 308, it might also be possible that in the above example; the light might hit the corner of the red sensor behind 209. However, that sensor also has no use for blue light. Any other combinations should now be easily grasped.

Admittedly, these are crude guestimates that will vary drastically with ambient color composition and sensor wavelength-driven efficiencies within frequency ranges, etc. etc. but they do communicate design characteristics and purposes. Also, to expand the number of layers for FIG. 9, any number of additional and preferably identical distal matrices can be added distal to the distal matrix drawn in FIG. 9.

In the previous example optional addition of white as an unprocessed natural image component was demonstrated. For the camera the optional addition of white as a "color" as illustrated can also serve as a key brightness control element due to its lack of a color bias. To the viewer looking through 100 with or without a camera function and with or without a processor, white provides a natural white balance correction for a system otherwise limited to RGB combinations and filters. In processor-present embodiments white LRCs and their channels of components (including filter(s) and sensor(s)) can be used to adjust brightness simply by dimming white LRCs without harming any color balances which is a huge advantage. That said, white filters and sensors are optional elements. That said, another example embodiment that includes white follows.

In another sample embodiment illustrated by FIG. 10, each LRC has at least one filter (think of just 1 filter/PV for simplicity now) and at least one sensor (think of one for now though there can be many) behind that LRC. Both cameras and worn devices (often the same device) can also have significantly more than the simple two group examples illustrated in FIG. 2 and FIG. 3. Theses are just placeholder exemplary illustrations and any number of wavelength range or color groups can be used.

At this point, enabled by our tediously earned familiarity with the logic and basis of FIGS. 1, 2, 3, 4, 8 and 9 and detailed prior explanations of how layers are used, we will explain this embodiment example while looking solely at FIG. 10 but understanding what is behind it. It is a much simpler conversation. And it can also illustrate a 2 matrix (left and right matrices) embodiment like FIGS. 2, 3 and 8 or a 3 (or more) matrix (distal, left and right matrices) embodiment like FIG. 9. Each LRC shown in FIG. 10 emits a range of wavelengths. For example, 209 emits red light, 128 emits green light, 107 emits blue light and 122 emits white light.

etc.) we know that behind it is a sensor/PV (in the right matrix) and behind that is a filter (or PV serving both a filter and power harvesting function in the left matrix). And we know that 107 in FIG. 10A is in one sagittal slice (as 107 was in FIG. 9A) and 122 is in the next sagittal slice (as it was in FIG. 9B). Thus, with the understanding of how sagittal slices are behind the LRCs in FIG. 10, we will proceed by referring only to FIG. 10 for a while.

RGB Camera and/or Color Corrections for the eye: Filters can easily be made that select out any range or combination of ranges of any number of wavelengths. Larger numbers of wavelength groups are especially handy when you want to respond to colors. Using the familiar Bayer format, the R, G and Bs refer to what colors the eye would see coming out of the assembly (red, green and blue respectively).

So, with a simpler reference approach, let's take an even more complicated example using 4 groups that will make the earlier examples and even the Bayer example seem simple. Consider another embodiment where we want to distinguish between the colors red (R), green (G), blue (B) and white at the LRC level. The optional adding of white not only adds brightness but can help in white balance and color perception both for the eye and any camera applications for the same components. In FIG. 10 we use those letters for R, G and B and just leave a white space for white in FIG. 10A and FIG. 10B which makes the symmetry of the layout more visually obvious since understanding the logic is easier "seeing" white as something of a symmetric center in this particular example.

Note that in FIG. 10A the white elements are drawn to be ½ the area of the other elements like R, G and B. This is an option and, in some embodiments, white elements will be the same size as the others. But so that we can illustrate some of the advantages of the narrower white elements, they are thus shown and discussed here.

With 4 colors with non-color names like "Filter group A" etc. it can be tedious and confusing to refer to color groups by such names or sequence numbers. So, to further simplify nomenclature and explanations for these more complex examples, a different way of describing them will be used for these multi-filter group examples. FIG. 10A can now be seen as a view of an assembly with at least two matrices behind it. It can have more matrices as described herein but for simplicity in this example we'll just talk about a sensor layer (like the right matrix of other examples but any number of layers are applicable) right behind each LRC shown in FIG. 10 and a filter/PV layer (like the left matrix of other examples) behind that sensor layer.

The square dotted line 121 in FIG. 10A is not a physical element but only a rectangle drawn to identify a group of 9 (3 rows of 3) solely exemplary elements. At the center of 121 is a white block, 122, with no letter because the color the eye sees there will be white. Just a reminder, the color identifications you see in FIG. 10C are the color that will make it through the assembly to the eye.

Since we're looking from the perspective of the eye, then 122, like all the other color-lettered or white blocks in FIG. 10, is part of the LRC layer. So, what we're looking at, in FIG. 10 (like in FIG. 4) is the most proximal layer of the assembly. The terms "proximal" and "distal" herein, unless otherwise qualified, are always based on the distance from the eye. So, the most proximal layer is the layer closest to the eye and a more distal layer is farther from the eye.

Just distal to the LRC (behind it in FIG. 10A) that we see as 122 is the right matrix sensor element (which, being behind the LRC is not visible to us in FIG. 10). Next, distal to that right matrix element hidden behind 122 is, of course, the optional and preferably adjustable gap 208 (and/or 308; we saw one or more of them in earlier examples). Finally, just distal to 208 (even farther behind 122) is the left matrix filter (as seen in FIG. 2A; further optional layers are not mentioned in this example). This left matrix filter is, optionally, not just a filter but can be a PV element that acts as a filter that, rather than just absorbing a wavelength range, converts it to power optionally providing or at least adding to the available power used to power the device. LRCs will in the preferred embodiment be in some equivalent of normally black mode but other embodiments are also included.

In one preferred embodiment then, for each letter (or lack thereof in the case of an LRC shown as an empty white block) that letter (let's just take B as one example) means that we're seeing an LRC that should be letting blue light through towards the eye. For example, behind that LRC labeled B (in FIG. 10A) is a blue-protecting sensor (a sensor that converts some wavelengths to a signal to send to the LRC proximal to it but, at least for the most part, protects or leaves blue alone so it can reach the eye). And behind that blue protecting sensor and any separator (like 208) is a blue protecting filter in the left matrix. Thus, you can look at a letter, like G in FIG. 10, for another example, and instantly know you're looking at a green-passing LRC with a green-protective sensor and filter(s) behind it. Yes, sensor to multiple LRC connections will be common as discussed at length herein but these simple connections now being discussed are foundational and normally the strongest connections anyway and thus are, at minimum, a simple way to illustrate a disclosed principle of AOI angle favoritism.

Also, this discussion acts like the device is a flat assembly a little like FIG. 1A and FIG. 3B with elements conveniently arrayed in line with each other and these are, in fact, valid embodiments. However, FIG. 10A also can be used to describe these relationships for a curved embodiment because, from the perspective of the eye radially viewing the FOV as discussed herein, the elements in FIG. 2A crossed by arrow 212 appear to the eye as every bit as "in-line" and "arranged behind each other" as the elements crossed by arrow 101.

Implementers will often prefer that the components not all be the same size. More distal elements naturally benefit from a small increase in size compared to less distal elements. As discussed elsewhere herein, this is due to the diverging nature of the eye's radial view. Even without the eye moving, any 2 significantly separated points in the FOV will each have a path to the retina and the angle between those linear paths is divergent from the eye. Thus, for example, the view of an LRC would normally, if the breadth of gap 208 in FIG. 2A is large enough, be just slightly smaller than the size of a left matrix filter element. In the embodiment discussed, 208's gap is small enough for the sizes to be drawn as nearly the same size in this example embodiment. Another reason for different sizes of components is that implementers will often prefer to, like the design of the eye itself, have higher resolution close to the optical axis. Thus, they will make the components near the eye smaller than those more distal to it and preferably along a gradual gradient of increasing component size with increasing distance from the eye. As in other embodiments and as discussed elsewhere herein, components will often be in continuous sheets rather than cut up and separated like little rows and columns of individual components. In those cases, the area and boundaries of those components are defined by the areas affected by electrical connections, electrical components and/or shortest resistance-path (i.e. path of least resistance).

White: Use of white as a color is optional even in color camera and/or color viewing applications without camera elements. However, where it is used, there will, in one preferred embodiment, be a "white protecting" element in the filter matrix that is located in the most distal layer behind LRC 122 (e.g., the left filter matrix that's behind the right sensor matrix). Light coming through LRC 122 is normally seen as white light by the eye; thus the color of the square titled 122. Although these percentages will vary by implementer and sometimes by application and/or user, in this example the white protecting filter filters out, in this embodiment, 67% of IR, UV and blue-green (BG) light. 67% is just an exemplary percentage. In an example of an even more discrete removal of non-normal light, white-protecting filters will remove 75% of the hard-to-see wavelengths. However, in this discussion we're using 67%. The range referred to here as BG light will also vary by implementer. In FIG. 7 the wavelength range 705 is an exemplary example to suggest any range in the visible range that is sufficiently between any of the maximum sensitivity curves (labeled in FIG. 7 as S, M and L which will be familiar references to the short, medium and large or blue, green and red) so that, with a narrow enough adjustment to the width of the wavelength range, its removal is typically not noticeable. That range, like all ranges used for UV and IR may be, in practice, narrowed, broadened and/or shifted to start and/or end at another wavelength by implementers. This allows implementers to manage the charge on LRCs converted by sensors from the 3 hard-to-see wavelengths to be balanced. In this example, the white protecting filter way behind LRC 122) takes out 67% of each of the hard-to-see wavelengths). To achieve the desired balance in charge to an associated LRC these wavelength ranges will be adjusted and, of course, the filter percentages can be adjusted. All that said, in this simple example, as optionally adjusted, white-protecting filters positioned (behind white LRCs like 122) to, for normal light, primarily affect "white" LRCs like 122, remove approximately 67% of IR, UV and BG light. The sensor behind 122 receiving the sum of the converted energies from IR, UV and BG light opens LRC 122 responsive to that signal. All other things being constant, that signal, though made up of the 3 wavelength ranges that the sensor behind 122 converts to a signal, that combination-of-3-wavelength signal is comparable to the magnitude of an undiminished (100% not 33%) signal for R, G or B.

Blue: Adjacent to 122 and within the dotted line 121 are 3 LRCs labeled "B". Behind each of these in FIG. 10A on the most distal layer (behind the B which is the left matrix) is a blue protecting filter that removes essentially all of red, green, IR and BG light. Thus, for normal light, only blue and UV light strike the blue-protecting sensors that are directly behind the LRCs labeled B (and optionally at least partially activating other LRCs as is discussed elsewhere but not discussed here). Those sensors, e.g., a PV element in this example, convert the UV to the power/signal that then reaches (directly, via processor direction or both as is the case for all colors) the associated LRC(s). Optionally, a portion of the blue light is also converted by the sensor to signal to maximize color correctness. To the degree that this opens the LRCs labeled "B", blue light proceeds towards the eye.

Red: Adjacent to 122 and within the dotted line 121 are 3 LRCs labeled "R". Behind each of these in FIG. 10A on the most distal layer which is the left matrix is a red-protecting filter that removes essentially all of blue, green, UV and BG light. Thus, for normal light, only red and IR light strike the red-protecting sensors that are directly behind the LRCs labeled R (and optionally at least partially activating other LRCs as is discussed elsewhere but not discussed here). Those sensors, e.g., a PV element in this example, convert the IR to the power/signal that then reaches the associated LRC(s) Optionally, a small portion of the red light is also converted by the sensor to signal to maximize color correctness. To degree that this opens the LRCs labeled "B", blue light proceeds towards the eye.

Green: Adjacent to 122 and within the dotted line 121 are 3 LRCs labeled "G". Behind each of these in FIG. 10A on the most distal layer which is the left matrix is a green protecting filter that removes essentially all of blue, red, IR and UV light. Thus, for normal light, only green and BG light strike the green-protecting sensors that are directly behind the LRCs labeled G (and optionally at least partially activating other LRCs as is discussed elsewhere but not discussed here). Those sensors, e.g., a PV element in this example, convert the BG to the power/signal that then reaches the associated LRC(s) to stimulate opening (i.e. more light getting through). Optionally, a small portion of the green light is also converted by the sensor to signal to maximize color correctness. To the degree that this opens the LRCs labeled "G", green light proceeds towards the eye.

These exemplary criteria, like many other applicable criteria, favor light with a selected AOI or range of AOI's to the surface of the left matrix (or any additional layer distal to it).

In particular, as drawn here, the assembly will favor light that is normal to a surface, often the most distal surface. However, components can also be arranged so that this favors light that is, in end effect, normal to, for example, the cornea, the lens of spectacles, or any layer to achieve a preferred effect. For example, consider normal light entering the filter behind 101 in FIG. 10A. That filter (or filter area for continuous surface embodiments) is normally but not necessarily shaped like 122 (though potentially slightly larger as discussed herein). Since this light is normal, it will later encounter the white-protecting sensor that is also behind 122 (which is normally but not necessarily shaped like 122) and, since, for normal light following this path, it can carry all the wavelengths that this sensor converts to power/signal, it sends a strong charge/signal to LRC 122 to let white light through. Again, the signal is strong because, although 67% of each of the UV, IR and BG colors was removed, the sensor behind 122 converts and sums the power of the remaining 33% for all of UV, IR and BG which is normally adjustable by wavelength ranges, etc. to be roughly 100% of a magnitude comparable to what a full signal is for that particular LRC. "Full signal" may differ between LRC types and LRC's vary by sensitivity or other adjustments. These values are, again, adjustable by implementers.

Similarly, light that is normal to the left matrix and passes through any of the LRCs that are adjacent to 122 (and within the instructional dotted line 121), will also strike a sensor that is configured to be looking for precisely the wavelengths that the preceding filter element in the left matrix did not remove thus sending an essentially undiminished (strong) signal to the LRC. This is probably already too obvious for many but just for one example, consider light whose entry vector is normal to the distal side of the left matrix and enters the green-protecting filter element (or filter area) that is behind 127 (as drawn) which filters out all wavelengths except green and BG. Then, because that light is normal to the surface, it passes through to a green-protective sensor (at least the one sensor behind 127 with that 127 labeled with a "G" indicating the eye will see green there) that converts essentially only BG wavelengths (and, optionally some green for color correctness) to a signal. This signal can be strong because the green-protective sensor it struck was specifically sensitive to the readily available BG and optionally small amounts of green light are measured/converted too. Thus, (presuming there is enough light in the FOV in the $1^{st}$ place which is presumed, of course, in all of these cases) the LRC 127 in FIG. 10A "opens" (or at least allows more transit of light to the extent that it is possible) to allow more normal green light. That increase of light passage is proportional to (this is the preferred embodiment) or inversely proportional to the charge/signal depending on the optional configuration of the LRC.

All LRCs may be set to default and adjusted default degrees of light passage. In this embodiment discussion we typically presume the LRCs are some LRC-type-equivalent of what is known as normally black and thus become proportionately brighter (let more light through) with a stronger charge/signal up until the point that it's "wide open" of course. However, it will not be uncommon to adjust them, as discussed herein, so that they aren't totally black in the absence of a charge; still a charge will increase passage above this "floor" as is possible. Also, in some embodiments, the LRCs can be some equivalent of what is generally called normally white. For example, these can be kept black (or, as in the previous case, not completely black but darkened) by a standing charge (or other means) that is offset by the sensor/PVs charge (in a polarity offset, switch, or by processor control, etc.) which, in one of those options reduces the net of the two charges (thus the stronger the charge from the sensor the lower the net of the two; thus in a sense inversely proportional). Now you see why we chose to use the simpler-to-explain the optionally adjusted normally white example.

Green was just one example. Of course, it will be easily seen that normal light passing through any of the other left matrix filters that protect a color (like R or B since we already used green as the above example) will also proceed through a sensor that protects the same color (just as normal light passing the green-protecting filter in the above example then encountered a green-protecting filter) and then to its operatively connected LRC in a process that favors the transmission of low AOI light. These are all applicable to a camera and/or a vision improvement device.

However, now consider non-normal light entering behind LRC 122 in FIG. 10A but, due to its non-normal AOI, it misses the white-protecting sensor (the sensor behind LRC 122 that doesn't remove white light but, instead, removes 67% of the hard-to-see wavelengths like UV, IR and BG). Instead, that higher-AOI light strikes the green-protecting sensor below that white-protecting sensor (behind 299). Thus, via that encountered green-protecting sensor's connections to its primary distal LRC 299, LRC 299 is activated. This creates a problem if you want to pass only normal light. This light passed and it was not normal to the surface. We don't want that if we want to strongly favor normal light.

Fortunately, that "G" labeled LRC 299 will be minimally affected by that non-normal light thus preserving the favoring of normal light. This is due to a combination of factors. First of all, the white protecting filter in the left matrix that it came through already removed 67% (and some implementers will choose to remove even more) of the hard-to-see BG light that the green-protecting sensor that it hits uses to make a charge/signal thus leaving any charge resulting reduced already by 67%.

Secondly and additively, in many embodiments (including this one and FIG. 10B), this light came through the smaller white-protecting filter which only has only about ½ the light energy collection area that a larger-sized red-protecting filter (or one for blue or green for that matter) would. This is why the white boxes in FIG. 10A like 122 and the white hexagons like 107 in FIG. 10B are shown to have only half the area of the R, G and B elements that surround them. In those cases, the white-protecting filter behind 122 will normally be smaller too thus not wasting light collection area.

Thus, so far only about ⅙th of the non-normal light activates the unwanted (normal light coming through a white filter won't hit it) green LRC just below 122.

Thirdly, the higher AOI results in more reflection off of the distal surface as well as any other layers having a significant refractive index. Thus, approximately less than ⅙ of that non-normal light results in any bleed-over.

So, normal white light or any of the colors (like R, G or B) entering a white-protecting left matrix filter will exit strongly at one of the LRC "blocks" in FIG. 10A that has no letter (like the all-white block 122 in this example). However, if it has a high enough AOI to just miss the white-protecting sensor behind 122 and wind up at the next red-protecting sensor or blue-protecting sensor or green-protecting sensor, then it will only in a minor way affect a R, G or B LRC. This is because, for each of the R, G and B colors, the wavelengths their protective sensors need to create a signal are largely removed from the non-normal light by the white-protecting filter that that light originally passed (in the filter matrix). Also, the small entry footprint cuts even that impact in half as described above.

The layout of FIG. 10A is positioned to favor landscape. That is, in a left to right error direction, the non-normal light entering the filter behind 122 could have such a high lateral AOI that it misses the sensor behind 122, misses the sensor behind B and the sensor behind G and the sensor behind R either to the left or the right of 122 without any significant bleed into the "wrong" sensor. Depending on the gap 208 (and/or the gap 308 when a third, i.e. distal as labeled in FIG. 9A), to miss 122 laterally could take an extreme AOI and high AOI reflection would reduce it. FIG. 10A can be rotated 90 degrees to favor portrait so that very high AOI light in a vertical dimension is better managed.

Incidentally, 121 is just an arbitrary illustrative dotted line which could be moved to encompass any square of 9 LRCs with a white one in the middle. The result of light entering any of these white-protecting filters is the same regardless of where we place the dotted squares (like 121). In fact, FIG. 10A shows 3 other dotted squares just to illustrate this.

But what if a beam of light from the FOV strikes not a white-protecting filter but, instead, a filter that protects R, G or B? As an example for blue that is also didactic regarding both red and green, consider the blue-protective filter that is behind the LRC 107 which is marked with a B for blue. Recall that the column in FIG. 10A that 107 is in represents a different sagittal slice of the assembly (to sagittal slice to the left, from the vantage point of the eye, of the one we were looking at for 122).

Of course, normal white light that strikes the left matrix directly at that blue-protective filter behind 107 will be reduced to contain only blue and UV light. And that UV (and optionally some of the blue light) will correctly make it through fine to the blue-protective sensor behind LRC 107 which is activated by the UV light that it is sensitive to thus sending a strong signal to "open" LRC 107. That's just normal light's thing. If that normal light is all blue then the same thing happens but with more blue (since all the photons apparently had a wavelength within the range we assigned as "blue").

But, what if light of any color striking that blue-protecting filter behind 107 instead has a significantly non-normal AOI. Then, the path of that non-normal light might result in it striking, for example, the adjoining white-protecting sensor behind 122 (just one sensor to the right of the intended blue-protecting sensor that's behind 107. That's not good for eliminating non-normal light since some of it comes through the thus at least partially activated 122. However, similar to the above discussion, the blue-protective filter already removed red, green, IR and BG wavelengths that would have helped activate 122. In addition to that filter-reduced energy, the half-as-large white-protecting sensor gets at most ½ of that already largely filtered out remaining light to mitigate bleeding.

So, what happens if the AOI is even higher so that the light entering that same blue-protecting filter (behind 107) strikes even farther away from the sensor behind 107 and hits the red-protecting filter behind the LRC that is just to the right of 122? The blue-protecting filter already took away all of the red, IR, BG and green so the IR that this red-protecting sensor converts to power is non-existent thus no signal sent to the LRC that is just to the right of 122. A shortcut or at least an insight to further reading may be the observation that this total, 100% elimination of unwanted sensor activation works for any sensor that encounters non-normal light that originally came through a filter that is protective any any color (like R, G or B) other than the color it protects. Thus, non-normal light entering the red filter behind 209 that encounters any blue-protective sensor or any green-protective filter will not excite that sensor to open any LRC to allow the light out.

So, non-normal light entering, for example, the blue-protecting filter behind 107 would have to have an extremely high AOI to miss the sensor behind 107, and miss the sensor behind 122, and miss the red sensor to its right and miss the green sensor to the right of that red sensor before that blue and UV light finally hits the blue-protective sensor to its right. In other words, the AOI would have to be so high that in missed the target sensor behind LRC 107 and, instead, hit 4 more sensors to the right (or the left) of it. For such a high AOI (presuming a reasonable value for 208 and/or 308) the bleed (unwanted excitation causing an LRC to open) would exist but be small due to the reflectivity of such high AOI light). However, white-protecting sensors, for embodiments that use them, do not remove 100% of bleed from non-normal light entering at non-white protecting filters but they greatly reduce it as shown above.

FIG. 10A can be rotated 90% to favor portrait focus. Currently, it favors normal light slightly more in landscape since our 2 eyes share a transverse plane and thus our effective FOV is wider than it is tall. However, for some applications, the orientation illustrated in FIG. 10A can be rotated.

We just looked at a couple of examples but did it so tediously that it should be simple to go through all the possibilities in this and the other embodiments in FIG. 10 regarding what happens when light hits at some point with some AOI. It will then be apparent that multiple degrees of AOI can be separately managed/controlled. In the previous example with landscape emphasis you had to be off by 4 later sensor elements, which is 4 steps of AOI control, to "beat the system" and get your non-normal light through 100 to the eye. Thus, particularly laterally in landscape mode in the embodiment drawn, many degrees of AOI control are available.

And, further controls on AOI selection, resolution and brightness make it even more controllable and this can, as detailed herein, be done in real time by the user and/or a processor. For example, increasing the separation between the left and right matrix (the separation area 208 in FIG. 2A and or, for embodiments with more layers as illustrated in FIG. 9B, 308) up to a point makes the system stricter (less tolerant of non-normal light). Reducing the separation at 208 (and/or 308) makes it more tolerant but potentially brighter. Different such settings will benefit different environmental conditions and intended uses preferably even as it varies in real time.

There is another factor that may be used to increase the already high percentage of normal light. A higher percentage of non-normal light than normal light reflects off the surface of the assembly. This is affected by the refractive index particularly of the most distal surface as well as any polarization. Some implementers will further select the material of the most distal surface in both flat and curved based embodiments based on its refractive index to further maximize this normal light favoring effect and manage refraction. Also, pre-polarization can be used to maximize reflection and one simple process for this in manufacturing can be accomplished by direction-specific brushing of the most distal surface of the assembly (or at least the most distal surface of the left matrix) to favor s polarization.

For additional purity of light normalcy (to obtain even more consistently low-AOI light), blinders, as discussed at length herein, will be added for some applications requiring significantly more selectivity of low-AOI light. These blinders can, again, fully or partially surround an individual channel. For example, like the one that can be identified by the shape of LRC 122 (just as 1 example) which is the proximal end of a light channel that we can see in FIG. 10A. However, to maximize brightness and minimize diffraction in high-resolution embodiments, a channel with blinder borders shaped like the perimeter 121 in FIG. 10A will, when opaque (active and partially obstructing passive blinders will not always be opaque) will prevent bleed over between like colors. Like-color bleeding (such as when light that enters, for example, a blue filter has such a high AOI that it not only misses the target blue-protecting sensor but hits another blue-protecting sensor to produce unwanted LRC light release) are thus prevented. This is the same of course for white and the other colors. Blinders catch potential bleeds caused by extremes in incidence angles that the others might miss and these can be larger (incorporating multiple channels) to maximize brightness and clarity while extending control to handle very high AOI light.

Hexagonal channel groups: One modification of FIG. 10A properties can be seen in FIG. 10B. Like the elements of FIG. 2A and FIG. 9A, these individual elements (like those marked R, G, B and those hexagons with no letters i.e. white) can be seen as the eye's view of the cross-sectional view of 100 in FIG. 2A of FIG. 9A. For simplicity in this discussion, we will speak as if we are using only FIG. 2A as our example of what is behind FIG. 10B from the perspective of the eye.

Thus, LRC 107 in FIG. 10B is the eye's view of LRC 107 that we see in the cross-sectional view of FIG. 2A. We can also see it as 107 in FIG. 4C. 209 and 211 in FIG. 10B can be seen as 209 and 211 in FIG. 2A as well as 209 and 211 in FIG. 4C. Much has already been said about these hexagonal elements and their grouping shapes (like discussions of FIG. 4C and FIG. 10B). These can be used to help visualize anticipated channels of light (exiting at LRC locations or elements). The individual hexagonal elements like 211 as well as the larger groupings like the 7 elements inside 401 in FIG. 10B are examples of smaller hexagonal channels and larger grouping channels respectively. These hexagonal shapes and grouping shapes, like all the others, can have separations between them (which is particularly useful in continuous surface embodiments as opposed to separated element embodiments) but are here drawn contiguously.

For example, for additional purity of light normalcy (to obtain even more consistently low-AOI light), blinders, as discussed at length herein, will be added for some applications requiring significantly more selectivity of low-AOI light. These blinders can, again, fully or partially surround an individual channel. For example, like the one that can be identified by the hexagonal shape of LRC 107 which is the proximal end of a light channel that we can see in FIG. 10B. However, to maximize brightness and minimize diffraction in high-resolution embodiments, a larger channel with blinder borders shaped like 401 in FIG. 10B (to shield and contain the 7 light channel within it) will, when opaque (active and partially obstructing passive blinders will not always be opaque) prevent bleed over e.g., from non-normal light. "Like-color" bleeding (such as when light that enters, for example, a blue filter has such a high AOI that it not only misses the target blue-protecting sensor but hits another blue-protecting sensor to produce unwanted LRC light release) are thus prevented. This is the same of course for white and the other colors. Blinders catch potential bleeds that that the others might miss and can be larger (incorporating multiple channels) to maximize brightness while extending control to handle very high AOI light. The assembly already above both captures as a camera image and/or passes to the eye a good color image but the blinders, by particularly removing unwanted light that "flattens" color contrast, add substantial image/view clarity.

In processor-present embodiments when there are active blinders, processors can darken the LRC blinders when sensors, e.g., any or all of those in the right matrix or alternative sensors, indicate brighter ambient light in the FOV and, of course such processor(s) can make active LRC blinders less opaque in dim light. Active blinders can be a huge asset in SAGA and dark-adaptation applications and can provide a huge improvement in glare conditions. Active blinders that are made of photosensitive materials are technically "active" but require no processor. Passive blinders (translucent, semi-opaque, etc.) can be shorter or longer than shown and can, of course, surround different channels or areas of light passage than those few examples discussed.

Some embodiments with processors sampling right array sensor output will also perform image processing to enable, for example, edge detection. In these embodiments this will enable the processor(s) to direct the adjustment of 208 and/or 308's separation magnitudes to automatically "focus" until the best edge can be detected. This is how the human brain "draws a focus" i.e. by adjusting the focus until edges are sharp (which is why you can't focus in a fog). The separation magnitude of 208 and/or 308 aren't a refractive focus but their adjustment can draw a sharper image that conventional image processing can identify which provides the processor the ability to know when it's in "focus" so it can stop adjusting when a sharp image is thus automatically achieved.

As is discussed herein, this can be useful in applying the assembly 100 in FIG. 2, 3, 9, etc. to a camera function capable of capturing an image of the FOV without the need of a lens between 100 and the FOV. This is particularly useful and applicable in a contact lens or even corneal replacement embodiment wherein each right matrix measured charge can be, in fact, a measure of the brightness of a point in the FOV, i.e. an electronic image of the FOV.

However, the assembly 100 can also be adjusted to favor a number of other preferred paths of passage. One simple example is, as illustrated for one embodiment in FIG. 8A, by reversing the shading of, for example, FIG. 2A's right matrix elements (that means, of course, switching the filter group of each shaded to unshaded and each unshaded to shaded which is one of the differences between FIG. 2A and FIG. 8A) we cause the assembly 100 in FIG. 8A (at least as defined in this current discussion e.g., with the LRCs still configured to increase transmissiveness responsive to a charge) to disfavor light that is normal and favor light that is more non-normal including light that is more peripheral to an AOI of zero (normal).

For example, consider light entering the assembly of FIG. 8A along the path identified by arrow 212 (recalling that this figure is, just for the moment, being used to illustrate a non-normal light favoring assembly). That light first encounters a Filter group A element that removes group A wavelengths and then encounters a sensor in the same filter group which means that the wavelengths that the encountered sensor senses have already been removed in passing the left matrix. Thus, no signal is transferred to the adjoining LRC, and that LRC remains dark thus not favoring that normal light. Of course, as is often the case in normally black embodiments, the settings will often be adjusted so that the view is not totally black even in the absence of some signal as is discussed elsewhere herein.

However, now consider non-normal light entering all along the path of arrow 213. It encounters a filter group A filter which removes filter group A wavelengths and then encounters a Filter group B sensor at the right matrix which is sensitive to wavelengths that have not been removed. Thus, the sensor produces a charge and the adjoining LRC is activated and that non-normal light is allowed to pass through. Thus, the passage of non-normal light is facilitated by this amended assembly.

Another non-normal-favoring assembly can also be explained while looking at FIG. 2A. For this example, let's presume that the LRC array is normally white or some adjusted near-equivalent thereof. Thus, normal light entering along the path of arrow 101 does cause the sensor 205 to pass a charge/signal to LRC 107 which reduces the passage of light therethrough thus disfavoring the passage of normal light. Non-normal light following the path of arrow 213, loses wavelengths in the left matrix that are needed by the right matrix's sensor that it encounters so that no charges created or sent to the adjoining LRC thus that adjoining LRC is not "darkened", again favoring the passage of not normal light.

Camera embodiment as an example: In many embodiments, however, including those with components spatially arranged in order to selectively process light with a low AOI, a key objective is to selectively process a subset of the ambient light that can be understood to be representative of a point map of the FOV. Again, favoring light with a low AOI as one example of this process, it can be seen that one embodiment of FIG. 2A (as well as FIG. 3A and FIG. 3B) is, in fact, a transparent wearable camera applicable to being located on or as part of spectacles, contact lenses and/or heads-up displays (HUDs). Although a preferred and more comprehensive embodiment includes both the LRC array (with components similar to 209 and 211) and a layer of transparent conductors (not shown but to one side of the LRC array, e.g., ITO) to enable both SAGA (the spike-attenuating gate array and/or dark adaptation described in the earlier foundational patents and applications) functionality for the eye and camera operability at the same time, a simpler version will be discussed first. In this simpler camera assembly the LRC array is removed. A network of transparent connectors operably connected to adjacent components in the right matrix provide at least a portion of the right matrix's signal to the processor(s). As the processor samples these right matrix charges, it interprets it as an image not at all unlike processor sampling of a CCD. It can be capturing a monochrome image and/or (as discussed regarding FIGS. 10A, B and C, capture a full color image.

In FIG. 2A, when light strikes 100 along the path of the arrow 101, the energy of that light is converted by 205 to an electric charge which flows along the transparent conductor that sensor 205 is connected to (e.g., in the approximate location of a transparent conductor that is where 107 is in FIG. 2A) to the processor element(s). From this point forward in the process, this electronic charge/signal may be, and typically will be, handled much like or exactly like the signal from a pixel sensor location on a charge coupled detector (CCD). When light strikes a pixel-level sensor on a CCD in a camera, that signal, along with numerous signals from numerous other sensors on the CCD is processed into an image by a number of processes all of which are well understood by those skilled in the art. The most foundational of these processes, of course, is the conducting of this charge for each pixel to a processor or other component wherein the magnitude of the charge is treated as at least the brightness or magnitude component of at least one attribute of the associated pixel (for now just think brightness but, of course, other attributes can and will be applicable such as color when that pixel is associated with a particular color or range of wavelengths). Therefore, when light strikes the device 100 along the path of the arrow 101, the energy of that light is converted by 205 to an electric charge which flows along the transparent conductor (that 205 is connected to) for one of any number of purposes with most identical to what we do with CCD output. For example, the transparent conductors associated with the output side of the right matrix made be connected to a processor which uses, interrogates, transmits or otherwise makes use of what is essentially image data captured by that assembly. Of course, the processor can consider and/or use this as either a positive or a negative image.

It should be noted and underscored that most illustrations herein are simplified single light path examples used as is common (e.g., ray-tracing) to simplify the illustration of a complex process. Wavefront management of light coming from all directions in the FOV at once is less simple to illustrate in a figure.

1. Objects that we typically encounter in life are normally not true point sources. A typical emitter in the FOV (even what looks like from a distance to be a very small headlight) will often if not always be larger than the individual elements of the left and right matrices and typically larger than the pupil of the eye as well.

For example, though light passing through 201 and then encountering 210 certainly suggests a small charge passed on to an LRC like 209 that is operably connected to 210, it is obvious that there can be other light from other points in the FOV that can simultaneously reach 210 after passing through a Filter group A element in the left matrix (like the one just above 201). Such light (having potentially a full complement of filter group B wavelengths) will find the PV 210 highly receptive to its energy and thus the LRC 209 will be significantly actuated. Thus this additional charge generated by 210 results in a greater total charge applied to the operably connected LRC (e.g., 209). This is by no means occasional. In fact, light from distant points in the FOV (like a distant headlight), while not collimated to a laser standard has a high complement of such near-parallel paths from a single distant light source to different PVs that are close to each other.

Because of the potential for a plurality of light paths from a single "point" emitter in the FOV to arrive at different matrix elements in the right matrix, a directly proportional embodiment would often not, for example, simply darken (i.e. reduce passage of light through) 107 responsive to a distant headlight reaching the assembly 100 along a central vector indicated by the arrow 101, there will commonly be other darkened LRCs that are around the one that may actually be at the geometric center of a pencil of light from an object in the FOV. The resulting and configurable larger darkened area is, of course, useful since the at least slightly divergent paths of light from even a distant point source require, as is discussed elsewhere herein, a buffer darkened area around a central point. This is to, for example, reduce passage of significant portions of the light from a headlight that are divergent from the geometric center of that pencil of light but will still enter the pupil and be focused by the eye back to the same point as light from the geometric center of that pencil of light. If some of that more divergent light is not blocked by such a buffer area it can contribute to the brightness received, after ocular focusing, at the same point on the retina as light from the geometric center of the pencil of light from the light source. Also, of course, in embodiments favoring (i.e. inversely proportional) or disfavoring (i.e. proportional) passage of light that is essentially normal to a component (e.g., the distal, to the user's eye, side of 100 and/or any entrance surface associated with the eye 103 in FIG. 5A) this also ensures that such light appropriately actuates the LRC element in the LRC array representative of the point of origin in the FOV.

Therefore, in, for example, a proportional response configuration, a bright light coming from a point in the user's FOV through which the vector represented by the arrow 101 passes will be reduced (or eliminated) before it reaches the eye of the user. Of course, this also all works for light that isn't straight ahead of the eye; light on the path following the arrow 212 is an example of more peripheral light passes first a Filter group A filter and then strikes a group B element which will generate a charge that is largely undiminished by the wavelengths removed by the Filter group A filter. It can be seen that the discretization controls discussed herein (including the width of 208 and the size of the matrix elements) can be configured to easily and controllably favor, for example, light that is normal to the surface of 100 and/or to the surface of the cornea of the eye. Such embodiments provide a response that is representative of each solid angle (typically a very small fraction of a steradian) in the FOV. This provides an effective device for selectively processing the passage light from points in the FOV responsive to their brightness. As is discussed elsewhere herein, such a device design also, by favoring passage of light based on the solid angle of its entry from the FOV with each such solid angle representative of a pixel, this is also an easily miniaturized (even applicable to a contact lens) image capture component or camera.

An optional adjustment mechanism to control the space between the left and right matrices allows this control to be made in real time by the user and/or by an optional processor interface. These adjustment mechanisms can be mechanical (e.g., user rotated or motor-rotated screw adjustment) or easily miniaturized electrical components (e.g., piezoelectric adjustment of the width of 208). When 100 is part of a contact lens assembly, very small adjustments are enough.

How strictly the assembly limits its discretization (to favor, for example, light from a particular distance, maximization of glare control, light-passage efficiency of 100, and the limiting of peripheral light penetration through 100) is most easily and best controlled by managing the components sizes of the left matrix elements, the right matrix element components, the magnitude of the separation between them, 208, and the distance between the assembly, 100, and the eye. Other configuration adjustment options include (in embodiments that incorporate them) AOI LRCs (like 102 and 108 in the 2-D illustration of FIG. 1B and the 3-D illustrations of FIG. 4), polarization elements (in excess of those that are part and parcel of that any liquid crystal LRCs), etc. These elements may also be used to favor the preferential extinction or passage-favoring of light from particular light sources or areas. For example, increasing the separation medium between the left 208 is the optional but very useful transparent medium (or gap) between the left and right filter matrices just described. In embodiments where implementers desire an adjustable 208 this adjust ability may be accommodated by ordinary mechanical and/or hydraulic means not shown in FIG. 2A. In one such embodiment 208 may include a gas or fluid whose current pressure (controlled by the user or computing components), expands or reduces the space between the left and right matrix. Other applicable components for varying the distance between the left and right matrix include his electric spacers preferably near the periphery of 100 and other electromechanical optional elements to achieve these useful adjustment. It will be easily understood that this fixed or adjustable (including in real time responsive to conditions and optionally by processor control) space (208; the distance between the left and right matrix) is useful in determining (and controlling) how preferential 100 is in what light it reduces (e.g., with what entry characteristics like AOI), effective visual "resolution", etc.

In some embodiments, additional elements will be placed in this gap 208 (and/or, in FIG. 9A, 308). For example, an adjustable (e.g., rotatable) polarizer is one easy and real time solution to adjusting LRC transmissiveness by adjusting the polarity and/or polarity attributes of light entering the LRCs. This can be eminently useful in setting or adjusting a baseline, threshold or even a maximum LRC transmissiveness.

Manageable and adjustable by designer or operator, selecting distances between the left and right matrices (208) as well as the managing the scale (size) of elements (e.g., "pixel size factors" like the size of the filters and LRCs and different embodiments where multiple LRCs are affected by one or more PVs) is useful in managing the light that passes through the LRC array and on to the eye so that they have some desirable characteristics. For example, light from a bright headlight at night will be blocked in part at the most sensitive point of ocular entry (AOI=0) but not as much from the area in the user's FOV that is around the headlight. Also, in terms of wavefront reconstruction, it enables the selection of light with useful optical properties. E.g., it selectively admits an identifiable and correctly placed packet of light from each point in the FOV to focus to the retina with reduced glare. And, of course, this is the foundational element of a new wearable camera that reconstructs the wavefront of random scattered light from the FOV into location-relevant charges (e.g., in the right matrix) wherein those charges (which can be acquired without blocking the user's view even in contact-lens embodiments) reflect the pixels of an image wherein each such charge can be representative of light passing through a tiny fraction of a steradian of the FOV to be delivered in image-like form to the eye and/or (i.e. simultaneously to both) a processor for processing of an image from those discretely selected solid angles.

Applicable to normal light from non-central portions of the FOV and through LRCs set to lighten (increase transmissiveness) in response to a charge: Though many examples focused on activity near the optical axis, it will also be understood by those skilled in the art that this process also works for light striking less-central portions of 100 (and therefore less central portions of the users FOV) and also for light that first strikes other elements of the left matrix. For example, light striking the left matrix along the vector indicated by arrow 212 in FIG. 2A passes through an element in the left matrix that is of the type Filter Group A (per the legend) but then encounters, in the right matrix, an element of Filter Group B. The A group filter did not remove the B wavelengths. Thus, this light still contains the wavelengths that the B sensor/PV element that this encounters (in the right matrix) is activated by. Thus, that right matrix element achieves and passes an electric charge to at least one adjacent LRC (one of which is seen being crossed by the arrow 212 in the LRC array). Thus, if implementers elect a configuration that "lightens" (removes less light and thus increases transmissiveness) responsive to a charge from a sensor, then the operably connected or "lightening" LRC permits this normal light to enter. Non-normal light, entering, for example, along the path of arrow 213, would not generate a strong signal at the right matrix and thus the adjacent (and any associated) LRC(s) are not lightened. Thus, normal light is favored for transmission.

The functionality of an assembly like FIG. 2A can be shifted at time of manufacture, by manual reconfiguration of the assembly and even by programmatic (via processor) and/or user direction. As discussed herein, the response of the LRC to a charge can be thus modified. It is even possible to change by rotating a polarizing plate located in the gap 208. For liquid crystal as an example this adjustment can also be used to adjust not only normally white or normally black and states in between but also thresholds for activation, ceilings, etc. Also, of course, switching from an effectively normally black to an effectively normally white LRC array can also easily be accomplished by the processor(s) (programmatically and/or by user direction) in assemblies that use them, simply by changing the signals sent to the LRC and/or to switching electronics associated with the LRC from a processor to respond in one direction or the other responsive to a signal/charge.

If, for example, in the previous example the LRC array was set to darken (reduce transmissiveness) responsive to a charge/signal, transmission of non-normal light such as light along the path of arrow 213 would be favored and normal light along the path of arrow 212 would not. Of course, as is normal in such cases, the addition of electronically and/or programmatically (including by user direction) ceilings, floors, thresholds, etc. prevent an embodiment with, for example, normally black LRCs from being opaque for light coming from dim areas of the FOV. Light from too-bright spots is also removed as discussed under spike removal. Similarly, for an embodiment set to normally white LRCs, the embodiment will normally be adjusted so that light from dim areas in the FOV is appropriately dim and, of course spikes are also removed for most applications as discussed herein.

Adjustment additional options: Of course, the light-path selectiveness of the system can be tweaked by adjusting the thickness of the intermediate medium (208), the refractive index of 208 (where applicable), and both the size and the placement of the elements of the left and right matrix in a manner that will be easily understood by those skilled in the art. For example, decreasing the distance between the left and right matrix (i.e. decreasing the thickness of 208) increases AOI tolerance up to a point. For example, in FIG. 2A, as drawn, the arrows 204 and 203 just barely miss sensor 205 thus treating them as non-normal light. However, if we move the left matrix a little to the right, they will be treated as normal light (the system is thus more tolerant of non-normal light). The opposite, of course, is true if we move the left matrix to the left which makes the system less tolerant of non-normal light. As discussed, making these changes in real time allows a great deal of user and/or processor-directed system adjustment. In contact-lens embodiments, the separation 208 can be adjusted by tiny actuators of which piezo electric actuators are simply one example. In worn spectacles or heads-up displays, a thumb screw to adjust this distance/separation allows easy adjustment.

Adjustments to the light-path selectiveness of the system can also be adjusted by modifying the size and placement of components in the left and right matrix as well as, optionally, the LRC array. If, for example, 205 was half as tall as it is illustrated in FIG. 2A (but still vertically, in this cross-sectional illustration, located so as to be split in half by arrow 101) this would leave a small space above and below 205 (in this cross-sectional drawing) that is not active (or at least is not designed to be sensitive to filter group A). Elements of filter group B like 206 and 210 can be similarly "shrunk". The size of corresponding (e.g., adjacent) LRCs like 211 and 209 do not need to be adjusted in order for this effect to be accomplished. That effect, of course, is that by reducing the size of the sensitive right matrix components is another effective means of making the assembly more selectively responsive to light with even lower AOIs.

Obviously, of course, the elements of the left matrix, right matrix and LRC array can be made smaller which both increases the resolution of the assembly and, presuming no change in the magnitude of 208, makes the assembly more AOI selective (reduces tolerance for angular error).

Also, as discussed elsewhere herein, optional processor controls and/or transparent electrical components associated with the components of 100 can also be used (for example to establish and enforce thresholds that must be overcome before LRCs reduce passage of light through themselves) which can be used to further enhance the light-path selectiveness of the assembly.

Of course, excessively increasing the width of 208 can cause, for example, light along the path of arrow 203 to cross an even more peripheral element like 214 which would, in fact, undesirably activate, for example, the LRC adjacent to 214. Thus, where this becomes a problem but such a large area 208 is still desirable, an additional layer such as the embodiments depicted in FIGS. 9A and 9B and FIGS. 12A and 12B allow stricter controls on AOI limits even when the separation of 208 is large.

Spike protection removes light that is too bright. However, the magnitude, as sensed by the output of a sensor or group of sensors in the right matrix, of what is too-bright light is determined by implementers and/or the user via the user interface. In embodiments using a user interface, the user can select in real time, for example, "sunglasses" mode which darkens even areas that are not excessively bright. However, in the preferred embodiment, the processor makes these adjustments instantly responsive to changes in the instant lighting environment and, where darkness adaptation is being managed by the processor, those adjustments take into account the darkness adaptation preservation that is discussed herein. Basically, a response to a sudden very bright ambient light environment by first removing any spikes and then, as necessary, generally reducing LRC array transmissiveness down to the point that the ambient light brightness does not appear to have changed in the perception of the user. This presumes, of course, that the lighting environment just prior to that very bright ambient light was bright enough for the user to see. Of course, if it wasn't adequate before, we wouldn't want to throttle down the passage of light to the eye down to that inadequate level.

In embodiments employing spike protection, light that is on a path coming directly from a too-bright emitting point in the FOV and arriving approximately normal to 100 (and, in the preferred embodiment, at least approximately normal to the cornea of the eye) is reduced (absorbed, converted to energy and/or reflected) by at least one element in the LRC array that is also on (and, in other embodiments, others that are near) that path (just as, in this example, elements were on the path of the vector identified by the arrow 212). However, the user can still see clearly through other portions of the LRC array that are not activated.

Why low AOI? Numerous approaches in a number of embodiments have been described with comparative simplicity by illustrating examples wherein light having a low AOI (and/or approximately normal to the left matrix e.g., the one shown on the left of FIG. 2A) is identified and managed responsive to that AOI. Why is so much attention being paid to light that just happens to have a low AOI with respect to the left matrix (and in some embodiments also or alternatively with respect to the cornea of the eye)? It is one of the useful criteria for many applications. One of those is where this favored transmission of light that is normal to the surface of the left matrix is used to largely select out the central beams of cones of light from emitters in the FOV. As is commonly understood, light from a light emitting point source in the FOV that reaches an effective aperture in an imaging system forms an expanding cone of light from the point source to the aperture. The smaller the aperture (e.g., the higher the F number) and the more effective the aperture is at allowing only the central beam of that cone (or another unique beam representative of light from a spatially identifiable point source in the FOV) the more the light passing through that aperture will be perceivable as an image at some plane (or curved surface like the retina). One example is the pinhole camera. By thus identifying a central (or at least a spatially identifiable though non-central) subset of the cone of light, we are selecting out portions of the light from the FOV that 1) is representative of an image which is used herein for a worn camera embodiment and a vision-improving embodiment), 2) allows us to block light passing through a specific LRC in the LRC array knowing that we are thus blocking light from a specifically identifiable point in the FOV applicable to spike-attenuating gate array (SAGA) applications as well as managing retinal dark adaptation for rapid response to sudden changes in environmental light (only by selecting such an "image", identified automatically by selecting largely normal light, can we identify the exact point in the FOV that is the center of the offending spike so that we can block the central LRC associated with that central spike as well as box some of the LRC is closely surrounding it to "feather" around that central spot.)

3) allows us to favor passage of light through a specific LRC in the LRC array knowing that by doing so we are improving the brightness of light to the eye from a specific point in the FOV (and allows us to "feather" an area around that point to minimize artifacts and 4) allows us to create a bias favoring the brightness of light to certain points on the retina relative to the individual sensitivity of those points on the retina for a simplified and optionally unpowered system with features like the Balanced Illumination Display (BID) and the Passive Balanced Illumination Display (PBID) described in previous applications and embodiments of this technology.

Favoring non-normal light-sets: In fact, managing low AOI light (e.g., light close to normal to the device 100 and/or the left matrix) (and typically managing higher AOI light differently) is simply one of many light-selection processes that is both useful and easily explained (enabling a less complicated introduction to the concepts). However, low AOI light that is approximately normal to the left matrix (and non-AOI light to be handled differently) is simply one of the very many applicable categorizations of light that we have to choose from that allow us to select a subset of all ambient light that is at least approximately representative of a point map of the FOV of the eye (rather than the chaotic mess of light of every conceivable vector that make up the ambient light wavefront).

Many implementers will, in fact, position and size at least the left and right matrix components in 100 so that the favored AOIs to the left matrix are specifically selected to favor the passage of rays of light that will enter the cornea with a low AOI and with a placement that will be perceived by the eye as being light from the location in the FOV of the emitter that is the source of that light. Of course, to be precise and maximally effective this placement will vary by the distance between 100 and the eye (which will vary by type of spectacle and can vary by user and, of course, contact lens applications will require a different but he easily expert calculated set of AOIs to the left matrix). With the possible exception of light entering 100 along the optical axis of the eye (along the path of the arrow 101), many of the AOIs selectively favored by those assemblies will be non-normal to the surface of the left matrix.

This selection of any such "favored paths" (e.g., paths of light normal to the left matrix and/or the cornea or any other light-selective protocol) by the assembly can be applied to:
1) Decrease the amount of light reaching the eye from an emitter in the FOV of the eye (e.g., for spike-attenuating gate array, SAGA, applications and to increase the retina's effective dynamic range and/or to promote dark adaptation as described in detail in prior applications) or to
2) Increase or decrease the amount of light reaching the eye from a favored path. For example, light having a low AOI to the left matrix and/or the cornea of the eye either by optional processor control (treating the charge from the right matrix element as data to selectively control LRC action) or simply, and without need of processors, by rearrangement of the left and/or right matrix elements as was done between the arrangement of these elements in FIG. 2A and FIG. 8A. One example of favoring the passage of low AOI light (light that is closer to normal) can be seen in FIG. 8A. Here, low AOI light crosses left and right matrix elements (e.g., along the path of arrow 101) sensitive to the same filter group (i.e. The affected sensor in the right matrix is sensitive to the same wavelengths that were just removed in the left matrix) and thus, develops no significant charge in the LRC that it crosses and thus does not modify passage of light through the adjacent LRC (like 107). Thus, if the LRC is (at least currently) configured to increase transmissiveness responsive to a charge/signal, then this normal light by creating no significant charge/signal will not cause the LRC to open to let it through and, thus, normal light is not favored for transmission. Non-normal light, like along the path of arrow 213, would result in a charge/signal (since the left matrix element on that path removes Filter group A and the right matrix sensor on that path thus causing the affected LRC to be more transmissive (again favoring the transmission of non-normal light). Had the LRC array been effectively normally white (or within some adjustment thereof) than normal light would have been favored over light with a higher AOI.
3) photograph at least portions of the FOV of the eye as is described elsewhere herein.

Wider peripheral vision is accommodated in one embodiment by adjustments in right and/or left matrix elements. In the embodiment illustrated in FIG. 8B, the elements of the left matrix become larger as they become farther from the optical axis. Thus, for example, arrow 801 in FIG. 8A is normal to the left matrix however arrow 801 in FIG. 8B is rotated clockwise as compared to its counterpart in FIG. 8A.

This could alternatively be accomplished by similarly reducing the size of the right matrix elements the father they are from the optical axis. And, of course, the size of the elements of both the right and left matrices can be adjusted to smoothly favor light with a preferred AOI as illustrated by the arrows 212 and 801. This is one example of a hybrid embodiment wherein normal light is favored closer to the optical axis but certain non-normal AOIs are favored farther from the optical axis. The eye itself refracts differently at the periphery of the cornea than it does closer to where the optical axis crosses the cornea and such adjustments aid in matching the eyes visual system for better peripheral vision.

When the LRC array is any reasonably adjusted version of normally white, a charge from a sensor will lower the transmissiveness of its associated LRC(s). Thus, in FIG. 8B, light passing along the path of the arrow 212 or 801 will generate no charge so light along those paths is not diminished and thus that non-normal light is favored even as light along arrow 101, which is normal, is also favored.

Light in the peripheral area of the assembly that does not follow the peripherally favored path, e.g., along the path of arrow 802, does initiate a charge in the right matrix (since the wavelengths removed in the left matrix were not needed by the encountered sensor in the right matrix) and thus darkens the associated LRC to disfavor the passage of light therethrough.

Figure 5B:
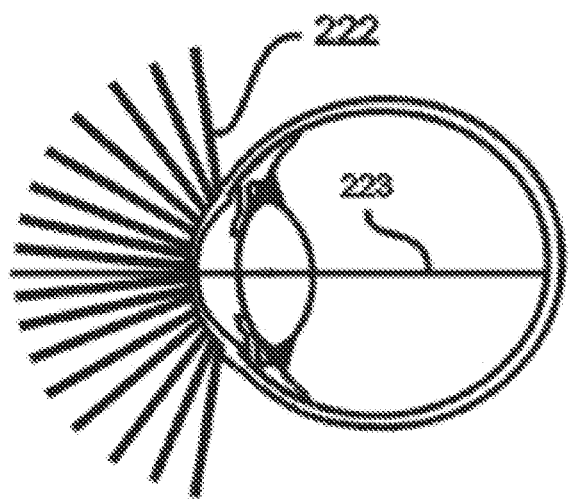
FIG. 5B illustrates some possible refractive patterns of the cornea.
Figure 6:
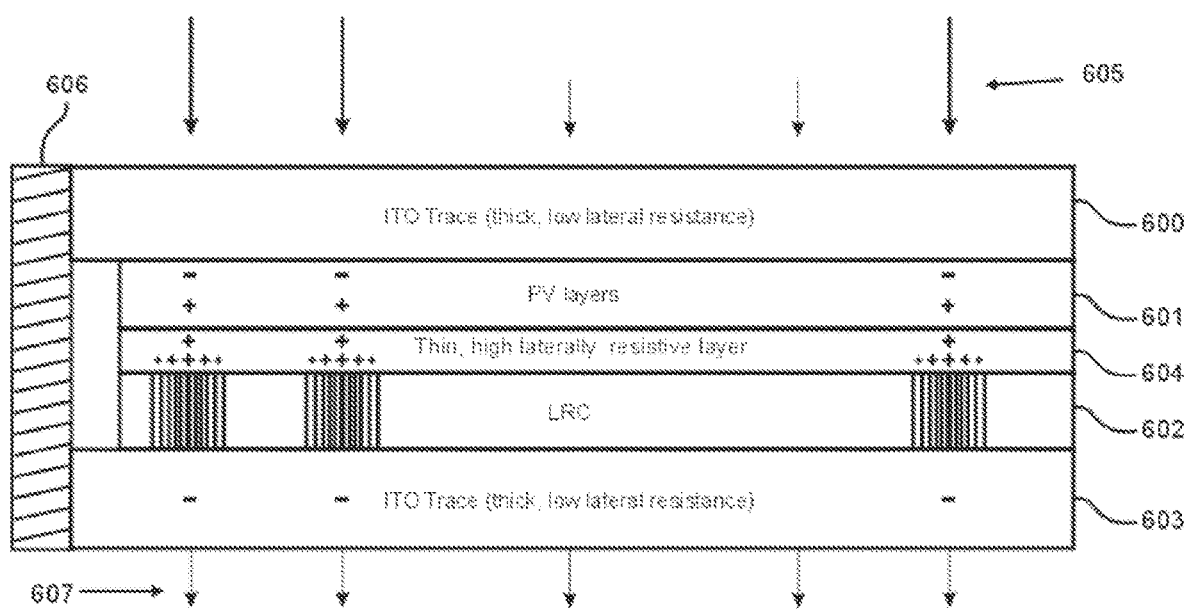
FIG. 6 illustrates an embodiment with at least one continuous surface.

It is probably obvious at this point particularly in light of the previous example, that we can select any favored paths that we like for transmission of light through the assembly by the selection of which left and right matrix elements go where in an assembly such as FIG. 2A, FIG. 3A, FIG. 3B, FIG. 8 or FIG. 9. In the absence of symmetry and glaring optical irregularities, this could be difficult. However, the refractive patterns of the cornea (e.g. the symmetric radiating paths like 222 in the sagittal slice of the eye illustrated in FIG. 5B) vary along an easily replicable pattern. Thus, in one preferred contact-lens-mounted embodiment, full peripheral vision of the eye is best accommodated by the favoring of the passage of normal light near the optical axis 223 with gradually (along a gradient; see the arrayed paths like 222) resized left and/or right matrix elements to favor the passage of light along those and similar physiologically consistent lines.

In many embodiments the sizes of the elements will vary by position. For example, elements will often be much smaller at and in near the optical axis (or the vision axis by implementer option) in order to accomplish higher resolution and better color control. This does not necessarily affect the relative size of an LRC to its associated sensor and its associated filters in the left, right and/or distal matrices. For example, as will be generally understood by those familiar with such optics, if an LRC is, as will be very common, slightly smaller than the associated sensor just distal to itself (so that the eye doesn't have to see the walls of the channels from its radial point of view) this relative relationship (the relative size of one component compared to the other) does not need to change.

In one such example, consider the group of LRCs within the dotted line perimeter 401 in FIG. 10B. Within the perimeter 401, there are 7 elements (one white labeled 107, two red, two blue and two green LRCs with sensors and filters behind them). These have already been discussed at length herein but now we want to notice that there are other groups surrounding 401 with the same shape as 401 and each of them also encompass a similar group of seven LRCs. Also, note that the size of the LRCs in the group whose parameter is 401 is the same size as the LRCs in the similar groups surrounding 401. However, if we let 107 be on or near the optical axis and would like to illustrate the concept of higher component concentrations (for higher resolution) near the optical axis as opposed to farther from the optical axis, we might use FIG. 11 as a good starting illustration.

Figure 11:
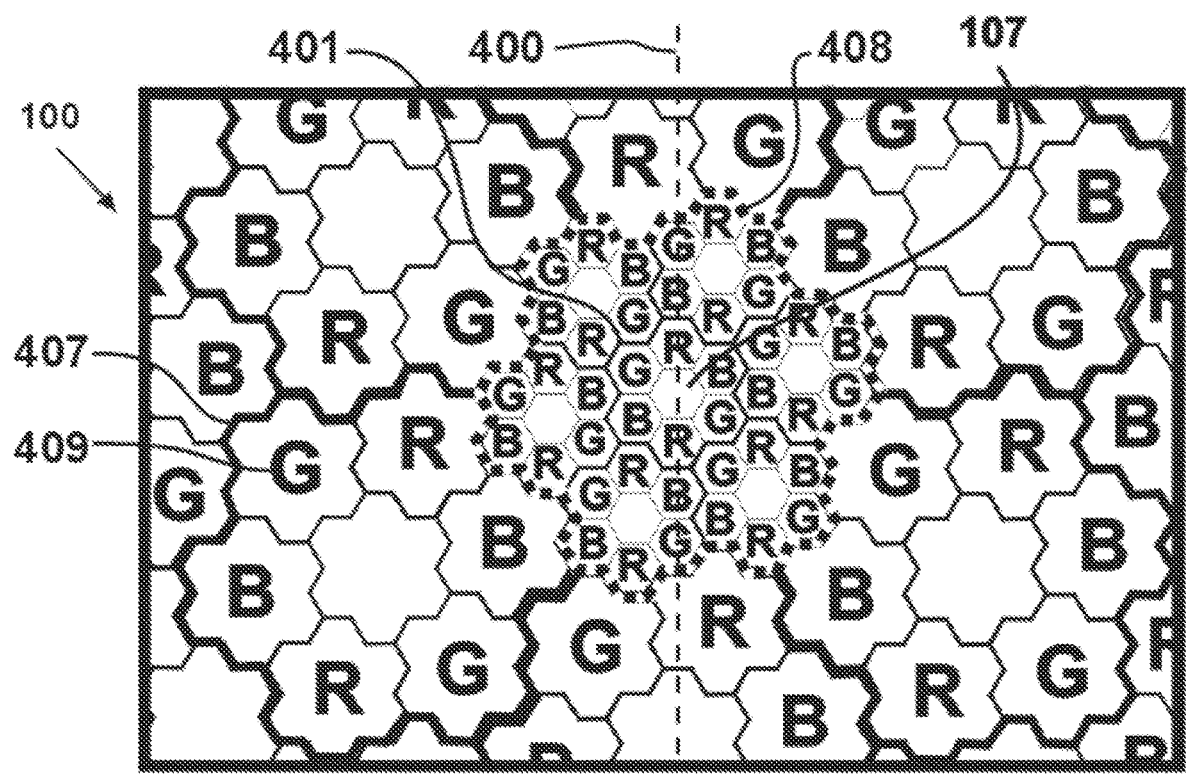
FIG. 11 is a view of the assembly 100 from the perspective of the eye with added color indicators. This illustration describes multiple layers of resolution/precision.

Here in FIG. 11, 107 is still on or near the optical axis (or vision axis in some embodiments) and 401 and the 7 elements within it and the sensors and filters behind it are unchanged. And, within the larger grouping perimeter 408, there are 6 other groups like 401 located around 401 and the LRCs within them are the same size as the LRC is within perimeter 401. The illustrated number of six groupings surrounding the grouping perimeter 401 is entirely arbitrary and, of course, this is not to scale, and there will normally be many more high-resolution groupings like 401 surrounding the optical axis at 107. However, patent figure's only have so much space. Also, notice that grouping perimeter 408 is surrounded by a number of similarly shaped and sized grouping perimeters like 407 and that each of these encompass LRCs for the same seven colors (if you count white is a color) and, of course, these seven LRCs are larger like the green LRC 409.

Also, as discussed herein, the placement, sizing and distance between the components of at least the left and right matrix and the LRC array are selected by implementers and here, in particular, to also favor foveal vision. In this case, emphasis (and preferably spatial density of these components) is arranged to minimize interference to light headed for the fovea (central vision) and/or maximize protection from glare (particularly from peripheral sources). Thus, although the sensor, filter, and LRC layers are illustrated as smoothly arrayed, contiguous layers, some portions of some layers will be more proximal or more distal than other parts of the same layer. For example, the components inside the perimeter 408 in FIG. 11 (perhaps because they are servicing an area of differing sensitivity such as the fovea and/or the macula) may be more proximal or more distal than other components in the same layer to effect these spacing-based tuning advantages With all of that said, just for brevity of description, the light-path selective process discussed here is selection of light having a low AOI with respect to the left matrix and/or the eye but it will be understood to represent any light-path selected process applicable to elements including those introduced in FIGS. 2A and 8A.

In some embodiments the grouping embodiments like 401, 408 and 407 will be indicative of the location of components that serve as the now familiar "blinders" (active or passive e.g., LRC or just shaded, surrounding or partially surrounding) to establish a channel for light to pass through to the eye while eliminating undesirable light (e.g., light with a high AOI or other angle-based criteria).

Thus, some (and this will always vary by implementer both in number and structure/format of the lay out) of the LRCs near the optical axis will be much smaller than those farther from the optical axis to enable better color control higher resolution through parts of the assembly 100 that pass light directly to the central fovea and the macula beyond it. While these are particularly applicable to contact lens applications, they also applied to heads up displays and "spectacle-like" embodiments.

Also, it should be noted that some implementers will also, for areas significantly farther from the optical axis (and thus not shown in FIG. 11), make no distinction between colors for locations that are in the very wide angles of far peripheral vision since light coming through these extremes of peripheral vision will reach areas of the retina where color rods are less of a factor. In some of those embodiments and in those extreme angles of peripheral vision, the blinders can serve as the primary enforcer of the acceptable AOI. However, as elsewhere illustrated herein, other wavelengths including invisible wavelengths can alternatively or also be used to enforce AOI controls and these can be customized to complement the unusual angles of desirable retinally-perceived light entering at far peripheral vision angles. Thus, as also illustrated elsewhere herein, at these (most often but not always peripheral) locations light that is favored will not necessarily be normal but will favor the AOIs that are primary to the peripheral feeding of peripherally perceivable light to the retina.

As elsewhere described at length herein, an additional way to even more discretely manage the transit of light through an assembly like 100 in FIG. 1B involves Angle of Incidence (AOI) managing "blinder" LRCs. These are LRCs used to form the adjustably transmissive walls of channels (like those channels discussed above as well as more complex channels some of which are discussed herein) that favor light entering the system at preferred angles. One example is a channel whose "floor" is identified by 102 in FIG. 1B and FIG. 4A and whose "ceiling" is identified by 106 in FIG. 1B and FIG. 4A. This unique form of LRC can be used instead of LRCs like 107 or (as illustrated in FIG. 1) in combination with them. An array of these AOI-managing LRC channels is shown in FIG. 1B by the 7 similarly angled lines drawn directly above 102 and the 6 others drawn directly below 102 to form a vertical array of 13 of these channels shown in the slice of 100 that the cross-sectional FIG. 1B illustrates.

In a preferred such embodiment, from the perspective of the eye, 103, these form quadrilateral channels which appear from the perspective of the eye to be an array of rectangles as illustrated in FIG. 4A (or, from a slightly different perspective, the "warped" view illustrated in FIG. 4E) or a hexagonal array as illustrated in FIG. 4B. Of course, any other channel shapes are also acceptable embodiments. The assembly, 100, may be curved and even semi-spherical in shape (e.g., The different embodiment illustrated in FIG. 2). When the surface of the left side of 100 is essentially a semi-sphere, the spheres inclusive of such semi-spherical surfaces of 100 and the sphere inclusive of the semi-spherical surface of at least the portions of the cornea near the optical axis will often be essentially concentric. The overall width and/or height of the sides of the channels can be larger on the distal end than on the end more proximal to the eye 103 so that, as the eye looks and rotates, the "walls" of these "channels" are angled to minimize interference with the view.

In one preferred embodiment these LRCs are effectively transparent in one state and darker (less transmissive of light all to pass through them) in another state. These can be constructed using any of the LRC types (some of which are discussed above) and, of course, any other form of light restrictive component (LRC). Thus, one applicable embodiment of the current invention requires only these AOI-managing LRCs like the one whose floor is identified by 102 to the possible exclusion of LRCs like 107. For example, when the walls of a quadrilateral "channel" (like the ones identified in FIG. 4A) are at least partially transparent, light entering at any angle is largely unrestricted and diffraction is thus minimized even when LRCs are extremely close together. However, when activated, e.g., by an electric charge and/or by any other means, it reduces light to the eye and also becomes a channel that favors transmission of light having preferred AOIs and/or other preferred vectors. This not only serves the purpose of restricting (to at least some degree) light passing through these LRC-walled channels (which delivers a somewhat similar result as the alternative or additive process of activating an LRC element like 107) but also favors (to at least some degree determined in the preferred embodiment by the degree of LRC activation for the channel) a preferential set of paths of light that will reach the eye. For example, light from a point source providing light that follows the vector indicated by the arrow 101 in FIG. 1B will be unrestricted (passing easily through a "channel" whose "floor" is identified by 102 in FIG. 1B and whose ceiling is 106). However, light from the same point source in the FOV, following a path approximately illustrated by the arrow 108 will not pass unrestricted since it collides with an AOI-managing LRC (that is located just below 102). It might have been a little better example if 108 had been drawn higher to intersect with 102 but the drawing was just too crowded there already.

Thus, in this one example as approximately drawn, light (like examples following paths indicated by the arrow 101 and both of both of the rays 105) have vectors that are favored for passage by AOI-managing blinder LRCs. Though there are many applicable light-angle-preferring options which may be used by implementers, in this particular AOI-preferring example as drawn, light whose vector is approximately normal to the surface of the cornea, 109, are (compared to other light paths with AOIs not consistent with normal entry at the cornea) preferred for passage. Looking at the 13 channels in the cross-sectional view of FIG. 1B, it can also be seen that these AOI-managing LRCs reduce passage of undesirable light that is far off axis such as glare from peripheral areas of the FOV.

There are, of course, many other such directional preferences that may be effected via the positioning of AOI-managing LRCs besides just favoring light that will be approximately normal to the surface of the eye. For example, since our wide peripheral vision is enabled by higher refractive angles for light entering parts of the cornea farther from the optical axis (more peripherally, e.g., the retinally perceived path of, for example, 222 in FIG. 5B), it will be advantageous in different embodiments to have AOI-managing LRCs arrayed differently near the optical axis as compared to more peripheral AOI-managing LRCs. However, implementers choose to lay out these LRCs, AOI-managing LRCs such as blinders can, independently and also in combinations with other LRCs (like 107 in FIG. 1 and preferred AOI paths of filter and LRC combinations like those illustrated in FIGS. 2, 3, 8 and 9), be used to more effectively dim portions of the FOV (e.g., bright spots) without having to dim such large areas (as previously done; e.g., hyperfeathering) around an LRC that is directly in the path of light from a bright spot.

In a preferred embodiment most or all of the AOI-managing LRCs are responsive to a charge from at least one operably connected (associated) sensor and/or other processing elements. However, in other embodiments, at least some of these may be LRCs that are made of materials that naturally vary transmission of light based on the brightness of incoming light (e.g., photochromic) or energy (e.g., thermochromic) and thus can require no sensors. Other applicable LRCs include filters, etc. whose selected passage may be fixed and/or modified by light conditions. These are, of course, applicable to blinders and/or path-selecting filters (as illustrated in FIGS. 2, 3, 8 and 9).

In alternative embodiments some or even all of the AOI-managing LRCs may be replaced by fixed elements like wavelength filters, neutral density filters, etc.). These will manage what (and in their own way how much) light reaches an LRC like 205 but, the operatively connected sensor(s) (like 205 in FIG. 1) will determine how much of it the LRC permits to transit through it.

In one preferred embodiment, both the light allowed to transit LRCs like 107 and the light allowed to transit AOI-management blinder LRCs are responsive to the output of the operably connected sensor(s).

In an embodiment that does not have elements like 107 in FIG. 1B the output of a nearby sensor (e.g., an energy-producing PV element) e.g., 205 is used to power and/or control the light restrictiveness of AOI managing blinder LRCs like 102 and 106. Thus, for example, the blinders LRC 102 and 106 will become darker (or otherwise be less inclined to pass light on to the eye e.g., via reflection and/or redirection) when sufficient power from a nearby PV element like 205 reaches it via direct connection and/or transparent conductors and any optional resistive, capacitive or other electrical components (to add optional thresholds, levels, etc. as is explained herein for such environments).

Thus, in one lean embodiment the assembly 100 in FIG. 1B is comprised of blinder elements like LRCs 102 and 106 electronically paired via preferably transparent connections with sensor elements like PV element 205 (and, optionally, any additive components for implementer-desired adjustments or additions of thresholds, caps, etc.).

In other words, one lean embodiment may be illustrated as FIG. 1A with the elements like 107 removed. Another lean embodiment may be illustrated as FIG. 1B with the elements like 107 removed. However, leaving the LRCs like 107 is also an applicable embodiment.

Figure 1C:
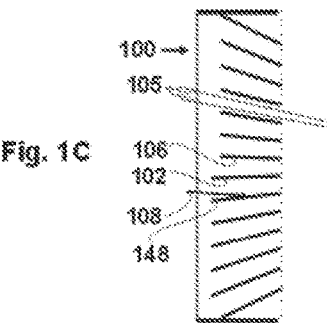
FIG. 1C is a lean embodiment compared to the device of FIG. 1B. It employs blinders like 102 and 106 but requires no other elements besides the containing framework of 100.

An extremely lean embodiment that can be effective for a number of applications is illustrated in FIG. 1C which, like FIG. 1B, employs the blinders like 102 and 106 but no other elements besides the containing framework of 100 (preferably a transparent medium). Here, the blinders themselves "darken" in response to brightening light. These blinders are, in one embodiment, photochromic.

In another interesting "blinder only" embodiment, the blinder LRCs are electrochromic, liquid crystal, or any other form of the LRC that is charge-activated with a PV (photovoltaic) layer. Light striking the photovoltaic layer creates a charge passed to the operatively connected LRC layer. Thus, in sudden extreme lighting environments, these combination blinders like 102 and 106 rapidly darken to both remove high AOI glare and further favor the passage of low AOI light so that the viewer sees more of what the eyes are directed towards and less glare and high AOI incoming light.

These combination (LRC+PV) blinders can also be used for all other blinder applications described herein. Thus, for example, in FIGS. 3A and 3B the blinders 300 can optionally would be such combination with the blinders as just described. While the photochromic version of a "blinders only" embodiment can accomplish the same functions, these combination blinders can respond almost instantaneously to remove sudden blinding flashes of light (which can be lifesaving) and maintain even a level of dark adaptation for instantly adaptive light control as described herein and in prior patents for SAGA and instant ambient light control.

Of course, when combined with favored-filter-path embodiments like FIG. 3 (as well as 1B, FIG. 8, FIG. 9 and FIG. 12) combination blinders extend and make more precise AOI control.

When looking at a number of configurations from the point of view of the eye in FIG. 4, it is worth noting that the rectangular, hexagonal, etc. shapes do not necessarily imply the presence of blinders. Even when blinders are not used, the implied spatial positioning that these lines and shapes provide allow us to describe the relative positions of the components.

Note again that the device 100 is three dimensional in nature and that some of the lines drawn are to show light paths and/or actual channel walls. This can be seen, for example, by looking at FIG. 1B (which is a cross sectional view of the assembly) and FIG. 4A (which shows a quadrilateral version of the assembly from the perspective of the eye looking through these channels). These channels can be either merely illustrative (just identifying paths of light that follows the component-effected channel dimensions) or material (like passive or active blinders made of up to 4 walls of LRC components like 102 and 106 in a quadrilateral channel embodiment). The width of the channels whose rectangular openings we see in FIG. 4A will typically increase as you go more distal to the eye to enable the eye to see less obstructed views through channels whose angles match a desired line of sight of the eye through the assembly. The individual sides (four of them in the square arrangement of FIG. 4A and six of them are in the hexagonal arrangement of FIG. 4B) may optionally be slightly separated from each other and may, as discussed, also be powered individually responsive to sufficient PV element power generation.

However, in one preferred embodiment the sides are connected (preferably both physically and electrically) and effectively form a physical channel that, in dim light is at least nearly transparent for the sake of good vision at dusk, etc. Also, the grouped elements like 102 (e.g., in fours for the arrangement of FIG. 4A and in sixes for the arrangement of FIG. 4B) are activated together (e.g., in groups of fours or sixes respectively). In those embodiments where the individual sides of an LRC like 102 may be activated individually it will generally be for the purpose of providing an enhanced directional bias (e.g., to bias against directional glare). Of course, other embodiments will have less than a full complement of the sides populated with physical walls to also provide a directional bias.

A single light sensor or PV element like 205 (labeled 205 in FIG. 1A and understood to be behind 107 in other illustrations drawn from the point of view of the eye like FIGS. 4, 10 and 11), when activated can be used (when configured to do so by implementors) to darken LRC elements beyond just the LRC element that it is directly associated with. For example, 205 is shown as "associated with" and located behind 107. 205 is surrounded by the plurality of sides of the channel populated by elements that are behind LRC 107. This channel, like other channels, may be made up of physical walls (e.g., blinders) or simply be illustrative lines in the drawings to indicate light paths and preferred component locations. Here, a single sufficiently energized PV element, like 205 in FIG. 1B will result in a plurality of LRCs surrounding that LRC being activated to be less transmissive (or in alternative embodiments for different applications, to allow more light). There is no requirement that a channel's sides (like 102) be contiguous with the sides of other channels but that is the preferred embodiment.

This sharing of 205's charge can be via transparent wiring whose paths include connected and transparent electrical components like capacitors and resistors configured to appropriately share 205's charge as discussed herein. Typically, the directly associated LRC (in this case 107) will receive a larger share of the charge than another recipient LRC that is right next to it and other recipient LRCs that are farther away with receive even less charge from 205.

Here is another way to say that. A typical feathering action would activate, again in response to a charge from 205, LRCs (like 107 and/or 102 when 102 is, for example, a charge-sensitive LRC blinder element) in varying amounts based on their locations within approximately concentric imaginary circular bands around the activated PV element. The degree of darkening will preferably be greater for LRC elements that are closer to that activated PV element. Thus, 107 and any other LRCs, if there are any, that are in the same band as 107 (some embodiments will let 107 by itself be the innermost band) will typically receive the largest share of the charge. LRCs that are located approximately in bands farther from 107 will receive a reduced charge along a declining gradient.

Of course, as a practical matter, such bands will not always be circles or even ellipses. For example, in FIG. 11, the LRC 107 itself can be considered the innermost band (and thus receive the largest share of the charge). The area between the outer borders of 107 and the perimeter 401 may be used to define the second band. The area between the perimeter 401 and the grouping perimeter 408 30 used to define a third band. This is only exemplary and any number of bands can be used.

This feathering process can be used to make it a little easier for an activated PV element to "catch" (i.e. block) a little more of the divergent light coming from a single point source (as described above) without unnecessarily blocking a substantial portion of the FOVC. Also, the graduated reduction of this darkening (i.e. darkening an activated LRC that is peripheral to the central PV-element-activated LRC more the closer it is to the central PV-element-activated LRC) is consistent with well understood procedures for minimizing artifacts from such corrections. Also, as in similar embodiments already described, these connections can be electronically managed using well-understood electronic components. Thus, an excellent embodiment of the current invention involves AOI-managing LRCs electronically connected to a power (and thus signal) providing PV element without any need of a processor. However, in a preferred embodiment, 100 is comprised of both LRC elements like 102 and AOI-managing LRC elements like 102 electronically paired, as described above, with LRCs like 107 along with any optional and/or additive components for implementer-desire adjustments or additions of thresholds, caps, etc. A processor or a series of processors can also be used to even more intelligently and flexibly (i.e. responsive to the environment and/or user input via the user interface) adjust this feathering effect.

Also, in some embodiments the LRCs activated may not necessarily be contiguous even when the light striking a wide area of them is identical. In some embodiments simultaneously activated LRCs may be significantly distant from each other. In at least portions of an embodiment used for an application requiring less-powerful protection from light in certain portions of 100 and/or more energy efficiency, this may be a permanent condition. Such gaps between activated LRCs can simply be unactivated LRCs and/or these gaps between activated LRCs may be permanent (i.e. they are in the form of actual gaps between LRCs as they are arrayed in manufacture). Both cases will exist in some embodiments.

For example, in SAGA applications especially configured for bright-day use, the area of the lower ridge of 100 (the area least ever needed to block bright light from the presumably less bright ground as compared to the sky) may be sparsely populated in manufacture (i.e. there are simply fewer LSRs arrayed in that lower area of 101). In the other (in this example, higher) areas of the plate, 100, the density of arrayed LRCs in manufacture is greater (e.g., to deal with overhead light that is headed for the eye, 103).

Then, when only a little darkening is needed there, additional gaps may be effected between existing LRCs by activating only a sparse matrix of the many available LRCs in that portion of the plate 100. Thus, in a preferred embodiment under normally acceptable lighting conditions (no protection needed) all areas of the plate, 100, are effectively transparent (no activated LRCs). Then, when more light passage reduction is required in this upper area (e.g., responsive to brightening ambient upper light), the restriction of each activated LRC encountering this increased brightness is increased and/or the matrix of LRCs activated is increased (i.e. made more spatially dense by leaving fewer unactivated LRCs). It will be common in many embodiments for implementers to activate more LRCs in an area to create a more densely activated array of LRCs in that area. This, of course, has a similar effect to simply darkening LRCs that are already activated. In fact, darkening already-activated LRCs and activating previously unactivated LRCs can and will be used individually and/or in combinations for different embodiments and/or responsive to different environments and/or per different implementer preferences, to further darken, to the eye, a portion of the FOV.

Of course, for embodiments that will be used at sea, where reflectivity off of water is a primary issue, this may be reversed and the lower area may be more populated. Alternatively for such an application however, since both the sky above and the sea below are bright, some implementers will configure dense populations of the LRCs at both the top and bottom ranges of 100 leaving a less dense population of LRCs or none at all in the middle.

There are many spatial arrangements that will be used in numerous embodiments. These will, of course include the common row and column spatial arrangements including some of those already discussed. E.g., a simple rectangular arrangement is illustrated in FIG. 4A which can be illustrative of an array of LRCs like 107 which is seen in the cross-sectional view of FIG. 1). And/or FIG. 4A may be seen as an array (from the proximal side of 100) of channels for light (as seen by the eye, 103) whose upper and lower portions are made up of blinder LRCs (like 106 and 102 respectively in FIG. 1A). In a preferred embodiment both AOI-managing blinder LRCs and LRCs like 107 are used. In that case, AOI-managing LRCs with walls like 102 and 106 effect preferred channels for light when activated and LRCs like 107 manage passage of light that makes it through or around those channels (recalling that the blocking of light from unfavored angles is, in most embodiments, limited by the degree of AOI-managing LRC activation. When the AOI-managing blinder LRCs are transparent there is, of course, no preferential angle of incidence effected by them). As discussed herein, these LRCs can be selectively activated to form dense or more sparse activation matrices. Just for a simple example, a "checkerboard" pattern can be used as one level of a sparse density setting. Here, every other rectangle in the top row of FIG. 4A may be activated starting with the leftmost rectangle. For the $2^{nd}$ row every other rectangle is activated starting with the $2^{nd}$ rectangle from the left and so on in checkerboard pattern. In a preferred embodiment, how much the LRCs are activated is based on how much energy is output from a sensor, like 205, shown in FIGS. 1A and B. Degrees of sparse activation will also be obvious to those skilled in the art when using the hexagonal examples illustratable by FIG. 4B.

In one simple example of such a sparse embodiment that can be easily explained when looking at FIG. 4C. Here, 401 (which is the bold line encompassing the central 7 small hexagons and which is called herein a "perimeter") may be seen as a group of seven hexagonal areas (or spaces or locations of any shape) in the plate, 100. In preferred embodiments 401 is, as illustrated in FIG. 4C, just one of an array of similar perimeters (here that would be an array of similar groupings like 401 an can be better seen in the unenlarged lower portion of FIG. 4C). As shown in FIG. 4C these shapes, like the individual hexagons they contain, fit together with no wasted space between them (which is better seen in the enlargement circle, 403).

In this example embodiment the central hexagonal area, 107, represents the location of LRC 107 (seen from the perspective of the eye in FIG. 4C). Distal to LRC 107 is a light-sensitive element (like or similar to 205 in FIG. 1 and preferably being a PV element with significant yield). The sequence of the elements that light passes in FIG. 1 is that it first strikes a sensor and then encounters an LRC activated by that sensor before heading towards the eye.

Thus, light from the FOV passing through the area of the plate 100 that is identified here as 107 passes first (typically) through this light-sensitive element 205 (e.g., a photovoltaic element or PV element) which creates a charge that is passed on to the LRC 107 either by direct contact or via transparent trace(s). Distributively scattered and/or centralized processor options to manage these activations will be understood to follow as additional applicable embodiments to provide additional hard-wired and/or programmatic control. For embodiments having no processors or alternative power sources, it is simply a matter of if the charge has appropriate magnitude to cause the operatively connected (e.g., via transparent conductive traces) LRC to appropriately adjust passage of the light that continues on through the LRC 107. (Other electronic components to effect and enforce thresholds, ceilings, etc. are explained in detail elsewhere herein.) Although this adjustment responsive to an increase in the charge is typically a reduction in passage of light, some implementers will configure it to increase transmission/passage of light through or from the LRC responsive to increased magnitude of charge from the PV element.

The above is, of course, not unlike the sequence of light passing 205 and 107 on the way to the eye that is illustrated in FIG. 1A. However, many potential differences from FIG. 1B are possible in different embodiments that can all be illustrated using FIG. 4C. For example, elsewhere herein we viewed FIG. 4C as if the 6 peripheral hexagons (the hexagons surrounding the central hexagon 107 within perimeters like 401 in FIG. 4C) are unpopulated in manufacture (the implementers put nothing there) and/or they are currently un-activated (optionally a mix of those conditions). In such an embodiment where only the central area (like 107) in each perimeter area (like 401) is active (in this example having an active sensor and LRC), there's a lot of empty space between such central areas (like 107), this would be a good example of a very sparse embodiment. Such a sparse embodiment would be best applied to a device requiring less adjustment of light passage or to portions of a device where less adjustment is needed and/or minimal diffraction and/or diffusion (e.g., the lower part of a sunglass lens that passes little bright overhead light to the eye in normal postures) are desired.

In a less sparse embodiment, as many as all of the areas within a perimeter like 401 (seven areas in 401 are used in this example) may be populated and/or activated. Thus, in one less-sparse embodiment, some or even all of these areas (here illustrated as hexagons) will each have both a sensor (like 205) and an LRC (like 107) wherein the charge from its sensor causes its connected LRC to adjust the passage of light responsive to the magnitude of the charge from the sensor that is itself responsive to the brightness of the light that it encounters. Implementers will, for more complex embodiments, connect, via transparent traces, charges from one light sensor (e.g., a PV element like 205) to any number of LRCs that do not necessarily share the same hexagonal area/channel which, as described herein often regarding feathering, provides better control of light and can result in less artifacting. In such an embodiment, light striking a single PV element results, (presuming adequate light to said PV element), activation of multiple LRCs. How many of these LRCs within 401 are activated (or even populated in manufacture) is up to the implementers and/or the intensity of the light striking sensor(s) and/or implementer preferences effected through processor controls (for embodiments using processors).

This multiple-LRC activation responsive to excitation of as little as one sensor is not, in additional embodiments, limited to the LRCs that are located in the same perimeter (like 401). This will be understood by those skilled in the art as an applicable extension of the "feathering" and/or artifact reducing process. In typical such embodiments the farther the LRC is from the source (e.g., a PV element like 205) of the charge, the less charge applied preferably along a gradient (which also reduces unwanted artifacting boundaries). As discussed herein, management of these charges may be purely natural (simply driven by the output of the PV element), other electronic elements (e.g. capacitors, resistors, etc.) and/or processor controls. Of course, how much light passes LRCs can be further adjusted by 1) more or less activation of LRC(s) associated with 107, 2) selective activation of other groups like 401 (optionally leaving some of these entire groups un-activated to accomplish an even more sparse activation) or 3) both 1 and 2. Of course, in embodiments where such decisions are processor driven, any combination will be practical for any arrangement of elements including simple rectangles like FIG. 4A.

In another example embodiment, 401 may be seen as the shape of LRC "channel walls" (like the channel walls in the rectangular and/or hexagonal arrays of FIGS. 4A and 4B respectively whose channel ceiling and floor were identified as 106 and 102 respectively in FIG. 1). These more complex (compared to a simple hexagon, rectangle, etc.) perimeter channel walls are, at least as illustrated in FIG. 4C, neither necessarily rectangular nor hexagonal but are shaped in this example to contain the 7 hexagonal areas shown within the perimeter of 401 in FIG. 4C. In a preferred embodiment, such perimeter channel walls shaped like 401 expand with distance from the eye, 103, to allow the eye a largely unobstructed view of the FOV. This is comparable to the herein-described distal expansion of the single channel walls in FIG. 1B and FIG. 4A and FIG. 4B (note that the vertical distance between 102 and 106 in FIG. 1B is greater on the left than on the right).

Thus, FIG. 4C is now used to illustrate an embodiment having AOI-managing perimeter channels like 401 which is now described as having walls in the shape of 401 preferably made of LRC material (just as the channels discussed for FIG. 1, FIG. 4A and FIG. 4b were). This LRC perimeter channel wall contains, in this example, the area 107 and the six hexagonal areas that surround it. Of course, as earlier discussed, this is not intended to limit any embodiment of the current invention to a single (or any single number of) rings of elements around some element, e.g., 107. (See the larger grouping perimeters 402 and 408 in FIG. 11 for just an example.) Back at FIG. 4C, these AOI-managing blinder LRC channels shaped like 401 (or any other shape) provide AOI management around whatever components are within the perimeter of 401. Some or all of the hexagonal areas within 401 will, in this particular embodiment, be populated with LRCs that are responsive to electric charges created when light strikes connected PV elements (similar to sensor 205 which is behind/distal to LRC 107 in FIG. 1B and preferably located in at least the central channel area whose proximal end we see as LRC 107 in FIG. 4C).

For one easy sparce example, looking at FIG. 1B, consider light along the path of arrow 101 that encounters sensor 205. The largest portion of that sensor's charge is then passed to LRC 107. A lesser portion of that charge is passed to (now looking at FIG. 4C from the eye's point of view) the other 6 hexagons within 401 that surround LRC 107. In this particular embodiment, the channel behind the LRC 107 is the only channel within perimeter 401 that needs to have a sensor behind it. This can, of course, go on to an additional number of larger concentric bands with each subsequent band being farther from 107 and receiving even less of 205's charge. This is exemplary only and not intended to confine the number of hexagonal or other shaped components within such a perimeter to any given number.

In a full (not sparse) embodiment, all (each) of the 7 areas (in the illustrated example FIG. 4C these are now seen as 7 hexagonal LRCs from the perspective of the eye) within the bounding perimeter channel walls of perimeter 401 in FIG. 4C will contain an essentially transparent sensor (like 205 in FIG. 1B which is, in the preferred embodiment, a PV element) behind that LRC (e.g., like behind LRC 107 in FIG. 1). Thus, since each of the seven hexagonal LRCs within a perimeter like 401 have their own sensor behind them, each such hexagon and its sensor represent a potentially controlled path of light from the outflow of the to the eye.

From the eye's perspective of FIG. 4C we see the LRC array. The center of the cross-sectional LRC array of FIGS. 1A and B and FIG. 2A is thus seen as LRC 107 in all of the figures. In FIG. 1B the AOI-limiting "blinders" 106 and 102 can be seen as the ceiling and floor of a hexagonal channel through which light can pass when those blinders are present and active. However, the cross-sectional illustration in FIG. 1B only commits that there are two blinders (the ceiling and the floor that are particularly useful for bright sky and reflective ground respectively). However, it will be normative for implementers to, where helpful for a desired application, add sides to manage lateral glare and/or more completely favor normal light to the eye.

In certain "landscape" embodiments where better resolution is available left and right (in landscape) than up and down (in portrait), then often only the ceiling and floor blinders (e.g., 102 and 106) will be used to manage AOI since the landscape applications (e.g., FIG. 10A) don't need as much help managing AOI of up and down high AOI. However, for the moment just since it's easier to describe the components behind the LRCs as being inside a hexagonal channel even though those walls will not always be there physically in the real world. So, at least in this illustrative discussion, we see 209, 107 and 211 (and the other four unlabeled hexagons within 401) as six sided channels.

Similarly, the blinders LRC 146 and LRC 106 (in FIG. 1A) can be seen from the point of view of the eye as the ceiling and floor respectively of 209 in FIG. 4C. And, of course, the AOI-managing blinder 102 and the blinder LRC just below it in FIG. 1 can be seen in FIG. 4C as the ceiling and floor respectively of LRC 211.

This very full (i.e. fully populated; not sparse) embodiment, as just described, illustrates the optional presence of seven AOI-managing channels (each located at one of the seven hexagons that are located within the perimeter 401). In this full embodiment each such channel (i.e. the area behind each LRC like 107) has associated with it (and preferably contained within its physical or understood imaginary walls) a sensor (like 205 in FIG. 1) operably connected (directly or via transparent connections) to its target LRC (like 107). This will adjust the transit of light through itself responsive at least to the energy from at least that one connected sensor (other sensors from other channels will, as described herein, in some embodiments, be able to contribute to the charge of the LRC). Of course, other equally applicable embodiments will leave some of those (here-hexagonal) areas unpopulated in manufacture or unactivated at the moment for a more sparse implementation.

A sparser embodiment results when we remove or choose not to activate some or all of the AOI-management LRC walls that are not coincident with (i.e. overlapping with) the perimeter channel wall. For example, in this embodiment, only the portions of the hexagonal outlines of each of the 7 hexagons that are in 401 that are coincident with 401 will have AOI-managing blinder LRCs (LRCs that are in the form illustrated in cross sectional form in FIG. 1). For example, to illustrate an embodiment wherein the perimeter of 401 thus defines the proximal (to the eye) end of an AOI-managing LRC channel, none of the outer edges of any of the hexagons inside 401 have AOI-managing components like those illustrated in cross sectional form as 102 and 106 in FIG. 1. Those outer edges of those hexagons having no such blinder AOI-management functionality are drawn in FIG. 4C as dotted lines. In other words, the only physical walls for the seven LRCs that are inside perimeter 401 are, in fact, the 7-hexagon-encompassing perimeter of 401 itself. So, in this sparse embodiment, there is nothing to see inside of the perimeter 401 except transparent components while the encompassing perimeter of 401 itself defines the blinder walls.

A FIG. 1A view of channel 401 and its contents only for that sparse embodiment can be imagined by imagining that we erase the FIG. 1A ceiling and floor blinders LRCs 106 and 102 respectively leaving, in this cross-sectional view, only blinder LRCs 146 and 148 as the ceiling and floor respectively of the large channel now defined by perimeter 401.

Thus, the blinder-based AOI-management is performed by the large perimeter channel wall that encompasses seven sensors and seven LRCs. The small AOI-management blinder LRC channel material that in some less sparse embodiments would surround each hexagon in 401 is now gone (we removed 106 and 102 as examples just within the perimeter 401). Thus, this sparse embodiment has to deal with less effects of diffraction, unwanted absorption and diffusion thanks to the larger area of blinder control (all within the larger 401 rather than, for example all within the smaller 107).

In similar embodiments LRCs like 107 and/or AOI-managing blinder LRC channels may also or alternatively be connected to and thus responsive to a number of sensors. In the preferred embodiment, both the light allowed to transit LRCs like 107 and the light allowed to transit AOI-managing blinder LRCs (like 146, 106, 102 and 148) are responsive to the output of the operably connected sensor(s) which, in this example, is behind (distal to) LRC 107.

Figure 4D:
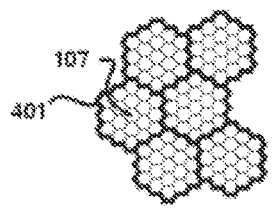
FIG. 4D describes another optional appearance of 100 from the perspective of the eye, 103.
Figure 4E:
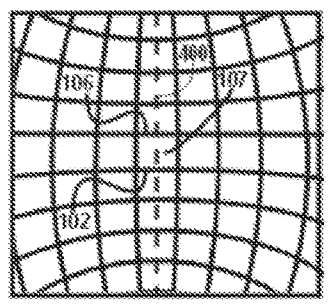
FIG. 4E describes another optional appearance of 100 from the perspective of the eye, 103.
Figure 4F:
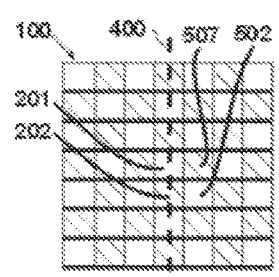
FIG. 4F describes another optional appearance of 100 from the perspective of the eye, 103.

Of course, perimeters can contain many more component areas than shown in FIG. 4C e.g., 401 in FIG. 4D (which can be seen to be the 7 hexagons of (i.e. within) 401 in FIG. 4C plus an additional surrounding ring of LRC locations around them). Thus, 401 is simply made to be more inclusive (to include another outer ring of hexagons as compared to FIG. 4C). This is simply used here to illustrate one of the many valid embodiments. Of course, any larger (or smaller) number of (here hexagonal but any shape is applicable) areas around the central one (here 107) can be selectively populated and/or activated to better control the light restrictive control of larger areas within a perimeter (like 401 or larger).

Nor will all embodiments be confined to a single sensor within a perimeter. Any number of sensors may be arranged within a perimeter and may share activation tasks for both LRCs within a perimeter and, as mentioned, even outside it.

Some or all of these 19 LRC locations in perimeter 401 in FIG. 4D can, however, be activated, not activated or even vacant. For example, presume that behind LRC 107 in FIG. 4D is a light-sensitive element (like 205), operatively connected to 107. To see how these can be laid out, see the cross-sectional view of 100 in FIG. 1B. Here we see light sensor 205 to the left of, that is distal to, LRC 107. That second unactivated or partially activated ring (the 12 outermost hexagons within perimeter 401 in FIG. 4D) would contain 12 hexagonal areas for a total of 18 hexagonal areas surrounding the central hexagon 107 (for a total of 19 inside the perimeter of 401). Like all such perimeter groupings, the sensor behind 107 may be configured into a sparse embodiment. For example, when 205 is the only sensor that activates all of the LRCs inside perimeter 401, that is very sparse. When there's a sensor behind and activating every LRC inside the perimeter 401, that is a pretty dense embodiment The point is not that any number of at least partially unactivated hexagonal areas any specific shape to group them is demanded. Instead, the partial or non-activation of any grouping (e.g., 401) is simply one example of the many applicable forms of sparse activation that is a practical and fully applicable implementation of the current invention. The hexagonal shapes are simply one kind of example.

In alternative embodiments some or even all of the AOI-managing blinder LRCs and/or the multi-filter AOI-managing channels may be replaced or augmented by fixed-transmission property elements like wavelength filters, neutral density filters, etc. These will manage what (and in their own way how much) light reaches sensors (like 205 in FIG. 1). However, the operatively connected sensor(s) (like 205) will (directly and/or with processing and/or using additional electronics described herein) determine how much of the light that makes it past the AOI-managing blinder element(s) to the sensors like 205.

Of course, to effect a more sparse embodiment implementers may simply reduce the number of populated and/or activated areas (here in FIG. 4C and FIG. 4D, hexagons) that contain sensors (e.g., PV elements) and/or reduce the number of populated and/or activated areas (here, hexagons) to contain LRCs (like 107 in FIG. 1). Indeed, as just one example, the bottom four rows of FIG. 4B contain a number of darkened hexagons like 141 that are representative of empty space. That is, for perhaps an embodiment where protection and visual improvement is most focused on the upper range of 100, the lower range is sparsely populated (the darkened areas are not there so that you have a clear view through those locations). In that embodiment, for example, glare and high AOI light could be controlled in the upper portion of 100 while at the bottom it's easy for you see the keys on the dark floor of the car.

Another example embodiment where at least some locations are arranged so that there are gaps in sensor and/or LRC coverage can be more easily understood when looking at FIG. 4C. To view it this way let the outer edges of the perimeter 401 in FIG. 4C represent a channel whose sides are blinder LRCs that provide preferred passage to light with a preferred angle of entry to 100 (and typically to the eye). These sides permit less light to pass through them responsive to how much light strikes a sensor (like 205 in FIG. 1).

In a denser (fuller) embodiment all of the hexagons within 401 will be populated with sensors like 205 (preferably, PV components) and each of those sensors will activate at least an LRC that they are paired to (107 and 205 are a good example of such a pairing).

However, for a leaner embodiment fewer of these channels may be populated with sensors. One such exemplary assembly within perimeter 401 has a sensor only behind (distal to) LRC 107 (e.g., 205). Thus, light that survives the trip through the AOI-managing blinder LRC channel walls of 401 in FIG. 4C strikes a sensor whose output determines the magnitude of the attenuation of light passing through any target LRCs, like 107 and perhaps to a lesser degree other LRC within 401. Some or all of the hexagons within 401 maybe implementer-provided with these target LRCs. In even leaner embodiments many of them like 141 in FIG. 4B offer the eye a clear view through empty spaces.

In embodiments wherein the AOI managing LRCs are not fixed (e.g., such fixed elements as wavelength filters, neutral density filters, any multi-filter AOI components, etc.), the transmissiveness of those LRCs are also responsive to the output of the sensor(s).

However, as explained herein, there will be many options for different population densities; even within the same embodiment e.g., denser at the top of a lens (like 100 in FIG. 1B) than at the bottom (e.g., empty LRC positions like 141 in FIG. 4B) to, for example, deal with overhead sunlight.

One exemplary embodiment has a central sensor located distal to and behind 107 in FIG. 4C but the entire LRC area within 401 is effectively a single LRC (rather than seven little LRCs like 107). This can allow both a more discrete preferred AOI selection and better visual acuity through the plate, 100 due in part to minimal diffraction and reduced trace-edge diffusion/micro-refraction. Implementers will also use embodiments where these are reversed so that there is a single large sensor area inside the perimeter 401 with only one or at least less than 7 of the hexagonal areas having currently activated target LRCs like 107. This provides both the benefits of a sparse live reduction and more power production by the preferably PV-based single and larger sensor with a smaller area of the LRC is to activate. This provides, for a smaller LRC overhead a better ratio of power available to power needed by the LRCs. Any combination of these target LRCs and sensors is a valid embodiment.

As also explained elsewhere herein, these operations may be directed by a central processor operatively connected to most or all of the LRCs as is frequently done in light restrictive arrays. They may also be accomplished in a distributive processing environment (lots of little processors; normally with each assigned to an LRC or group of LRCs).

These LRC activations may also be accomplished without any processor. For example, in one embodiment a photovoltaic cell (PV cell or any component that, responsive to light striking it creates an electrical charge; for convenience all such cells will often be referred to herein simply as "PV" cells or "PV" components or PVs and, since they are used as sensors for embodiments where they are used as the sensors, they are often simply referred to as sensors) like 205 in FIG. 1B is operably connected to its nearby charge-sensitive LRC(s) (e.g., 107 and blinder LRCs like 102 and 106) either by direct contact or via transparent connections. This little group (205, 107, 106 and 102) can be thought of as a "simple node" in a multi-node system. That is, a simple node, a single PV element (e.g., 205) is connected only to the LRC(s) that are typically proximal to it (e.g., 102, 106 and 107). Thus, the power produced by 205 responsive to incident light is ported by direct contact or via transparent (e.g., Indium Tin Oxide) traces to 102, 106 and 107 causing them to become less transparent responsive to the magnitude of the light-induced charge. Thus, this embodiment (typically made up of an array of these simple nodes) requires no processor.

Use of additional/alternative power sources (e.g., battery, and additional solar elements) and other electrical components in these circuits (e.g., resistors, capacitors, diodes, etc.) are applicable embodiments and are obvious to those skilled in the art. They are also discussed further herein. For the simple node, particularly one without benefit of a connected processor, the LRC light responsiveness (how dark or light the LRC gets for a given amount of energy from its linked PV) will be adjusted according to implementer preference and application using any of the above-mentioned electronic components (e.g., resistors with all ideally transparent and/or tiny compared to the size of the node).

Inter-related Node Connections: Via transparent connections that are commonly understood, an activated (e.g., hit by light and thus outputting energy) PV like 205 may, by implementer preference, go beyond activating just the immediately proximal (those that are, at least as drawn in FIG. 1, touching or at least in close electrical contact as 102, 106 and 107 are to 205) LRC's of the simple node example above. Thus, in a slightly modified embodiment, additional traces carry power from 205 to neighboring LRCs that are more peripheral (farther from 205 than 102, 106 and 107 are).

This can include, for example, transparent or tiny resistors and/or capacitors between the sensor 205 and these peripheral LRCs so that an equal or more often lesser charge can be received by these peripheral LRCs than the charge received by 107.

In some embodiments these trace-delivered charges from a single PV and can extend to reach substantially more distal LRCs. Thus, they can direct (e.g., with capacitor and/or resistor-driven charge reduction applied to the more distal elements) a gradual decrease in activation level to "feather" edges with graduated change to reduce artifact inclusion and remove coronas from bright spots. One net effect of this feathered response configuration for this embodiment is that light striking 205 results in a broader area of 101 being "darkened" than just 107.

Design elements of video display and passive light filtering devices disclosed in parent patents of the current invention are now applied to the energy-harvesting of wavelengths that are currently ignored in transparent PV assemblies. Sensitivity maxima wavelengths (SMWs), as described at great length in previous disclosures of parent patents to the current invention, are wavelengths that are at or very near a wavelength that the retina of the eye is most sensitive to. For example, if you ignore for the moment the net result of absorption of different amounts of different wavelengths by the cornea and extra-retinal components in the path to the retina of the eye, the peaks for the familiar chromophore-driven wavelength absorption efficiency curves for the cones of the eye (as is common in textbooks) are as follows: For s cones ("s" refers to the short or "blue" cones), the SMW range of wavelengths (i.e. the peak wavelength for s cones and the implementer-chosen range of wavelengths near that peak wavelength for that cone type) centers at about 420 nm. For m cones ("m" refers to medium length or "green" cones) it's 533 nm. For l cones ("l" refers to long or "red" cones) it's about 563 nm. These values, unfortunately, vary by study and sample population but this are useful approximate values. When you do take into account the absorption of extra-retinal elements in the eye, these SMW values center around (although, again, estimates for this vary by researcher and population, including the age of those in a given population) approximately 445, 545 and 575 nm for s, m and l cones respectively. FIG. 7 approximately illustrates these latter figures.

So, one embodiment of the current invention employs an array of selective wavelength PV elements like 205 in FIG. 1B within the assembly 100, to harvest selected wavelengths of light and convert them to power. These harvested wavelengths (i.e. those absorbed for power rather than being permitted to reach the eye) include the extreme "book-ends" of the visual spectrum (i.e. we absorb and convert UV and IR light to power). However, this use of light outside the vision wavelengths still wastes a huge amount of potential power production in the form of a wide range of wavelengths located well within the currently ignored normal visible spectrum for the human eye that could be harvested (absorbed and converted to power) while still providing a perceivably transparent medium. One embodiment of the current invention converts significant portions of wavelengths that are within the ranges of the visual spectrum into power to both increase the amount of energy harvested and protect the eyes from more useless radiation that can damage the eye but can't be seen well.

FIG. 7, as described above, is similar to the familiar textbook light-absorption graphs for the cones of the retina. However, for reasons previously discussed, the curves of FIG. 7 are, as a matter of practicality, shifted somewhat from the typical textbook retinal response curves because they take into account the biased absorption of certain wavelengths by the cornea, lens, etc. of the eye before light has the chance to reach the retina. Thus, for this particular example, the peak of the absorption-adjusted s curve, which is 701 in FIG. 7, is approximately 445 nm instead of the unadjusted value of 420 nm for the s cone mentioned earlier for comparison. Of course, the m and l curves (m, 702, is a dotted curve simply to make it easy to distinguish it from the nearby 701 and 703 of FIG. 7) are similarly shifted according to the values given above (i.e. 545 and 575 nm respectively).

Thus, in one example embodiment, one or more energy-harvesting PV elements (i.e. 205 in FIG. 1B or simply just a single PV element for a whole assembly e.g., an added layer to a full surface of 100 in FIG. 1B such as the surface of 100 that is most distal to the eye 103) can, in addition to harvesting wavelengths outside the range of vision, additionally convert wavelengths in at least part of a number of wavelength groups (e.g., 704, 705 and 706) that are actually in the visual spectrum while the assembly still remains transparent. For example, one or more of these PVs can convert an implementer-selected percentage (determined based on how much radiation needs to be removed for the application and how strong the signal needs to be to activate the LRC) of light to energy from the low-sensitivity "blues" (e.g., 380-420 nm as illustrated by the width of 704 in FIG. 7), "greens" between s and m peaks (illustrated by the width of 705; between 480 and 510 nm) and between red and infrared (illustrated by the width of 706; between 630 and 700 nm. For both additional ocular protection from excess radiation and for additional energy conversion, in some embodiments 706 will be widened to include wavelengths longer than 700 (NIR-IR) and 704 will be widened to include wavelengths below 380 (to include UV).

It is a common misconception that perception of red is simply the brain's readout of the l (for long, sometimes called the "red") cone, perception of blue is the magnitude of the s cone and green is simply the magnitude of the m cone response. Instead, however, the brain interprets colors as the ratio of signals from at least multiple types of cones (and light-sensitive ganglions, etc. which are addressed in alternative embodiments). It is the ratios of the signals from these different kinds of cones that determine the color perception of points in the FOV. Thus, even when robbing insensitive wavelengths (e.g., in the "valleys" between the peaks of different sensitivity curves such as the areas indicated by 704, 705 and 706 in FIG. 7) these ratios still permit color perception and separation (distinguishing between colors). These ratios can be also be managed, if necessary, by well-known means including harvesting (i.e. converting from light to electrical energy) different percentages of implementer-chosen wavelength ranges (like 704, 705 and/or 706). SMW wavelengths can also, in rare cases where it is desired by implementers, be attenuated (reduced) or augmented (e.g., increased by reducing any current reducing factor) to adjust color perception.

In addition to substantially increasing the amount of power available to the assembly from these harvested wavelengths that the retinal cones and rods, etc. are not as sensitive to anyway, the eye is further protected by their removal as they are converted to energy. By removing wavelengths that are weak to invisible to the eye, the eye is thus protected from unnecessary radiation that, though in the form of light that the eye can't see well, carries radiation to the retina that is now being associated with the advancement of macular degeneration and other maladies of the eye. Thus, an important embodiment of the current convention selectively transmits SMWs (including some of the wavelengths very near to the peak sensitivity wavelengths) while harvesting those that aren't sufficiently near (per implementer preference) to an SMW. Thus, even as we remove unnecessary radiation to the retina, we selectively provide color-perceivable wavelengths to the eye that it sees most brightly. One set of example wavelengths for converting to energy (because the eye is not very sensitive to them) is illustrated by the wavelength ranges bounded by 704, 705 and/or 706 in FIG. 7.

Even when these additional absorbed (i.e. converted to energy) wavelengths (that are well within the visual range but relatively far from SMWs) are harvested, the assembly, like 100 in FIG. 1, appears largely or completely transparent to the eye, 103, while allowing perception of and separation of colors in the FOV. Even light-sensitive ganglions and other light sensitive elements have light sensitivity curves (and thus SMWs even though not all that may exist are detailed in these disclosures) and the ranges for these are applicable to the current invention according to implementor choice. The eye is very sensitive to these peak wavelengths and surrounding wavelengths that are near to the peaks of these sensitivity curves thus the light that is allowed to pass through the PV element appears bright to the viewer.

Of course, the choice of these wavelengths by implementers will often vary based on particular individual eye characteristics (just as the above SMW wavelengths do), equipment and application. While humans don't see much light in these special "sensitivity valleys in the visual range" wavelength ranges like 704, 705 and 706 (particularly when 704 is expanded to include UV and 706 a is expanded to include IR) in FIG. 7, there is plenty of light energy there waiting to be harvested and the current invention selectively converts it to power while keeping the plate, 100, effectively transparent. Of course, this transparency will be limited to how well these ranges are chosen with respect to a user with a potentially unusual set of SMWs.

In one preferred combination embodiment that can be illustrated using FIG. 1B, all of the sensors (like 205) harvest much or all of the energy from the wavelengths included in wavelength ranges 704, 705 and 706 shown in FIG. 7. In a preferred embodiment ultraviolet and UV light are also included in that list of wavelengths that are converted to energy. This harvested energy is used to power/signal the blinder LRCs (like 102, 106, 148 and 146 in FIG. 7). Thus, when the ambient light is low then the charge/signal is small or nonexistent and, since in this example the blinders are configured to reduce transmissiveness in response to increases in ambient light, the blinders have little effect or may be totally transparent. However, as the ambient light brightens, the sensor-output charge/signal is increased and the transmissiveness of the blinders is reduced to be in reducing glare and favoring the transmission of normal light.

Thus, this combination assembly is able to 1) reduce glare by reducing non-normal light while 2) reducing passage of light in periods of unwanted brightness (potentially providing all SAGA spike protection and even darkness adaptation functions, 3) while also providing the eye 103 with primarily SMW light that is especially effective in initiating the visual transduction cycle (the eye is especially sensitive to it) for better vision and 4) with less radiation to the eye required for good vision (because the only light reaching the eye is light that the eye sees very well.

Another valid application of the current invention absorbs the sensitivity mimima. (the "valleys" between the sensitivity curves of FIG. 7 e.g., one or more of the ranges identified by 704, 705 and 706 in FIG. 7). Note that FIG. 7 uses approximate retinal sensitivity values that are already adjusted for corneal and lens wavelength absorption. This can be used simply to protect the eye(s) (thus no conversion of light to energy by PV elements is required for this one embodiment).

One example of such an embodiment that simply absorbs these "valleys" is a contact lens with just a filtering layer(s) that removes at least some sensitivity minima wavelengths per implementer preference. In the preferred embodiment these will also remove the "bookend wavelengths" (UV and IR). For this embodiment no LRCs or any form of power are required (just the filters are required) and this can even be a single filter for one embodiment. Since this filter favors the transmission of sensitivity maxima and at least partially excludes sensitivity minima, the wearer can see better with less radiation while enjoying a broad gamut of color perception.

However, in other embodiments, sensors will additionally convert this light to energy/signals (i.e. the filtering process is performed by PV's). In such an embodiment, the sensor (like 205 in FIG. 1B, FIG. 2A, FIG. 3, FIG. 8, FIG. 9A and FIG. 12) is a PV element (or an array of them). This protects the eyes by removing (converting to energy) low sensitivity light ranges (e.g., the sensitivity maxima such as one or more of the ranges identified by 704, 705 and 706 in FIG. 7 that add unhelpful radiation to the retina without substantially improving perception. It also reduces or eliminates spikes and reduces excessive ambient light passing through sensor-associated LRCs like 107 (which is at least associated with 205). This embodiment can, thus, even without any form of processor, provide spike removal (e.g., as excessive ambient light at any point in the FOV will result in higher charge which will power and/or signal the LRC to reduce its transmissiveness) even as the color-perceptible light that does reach the eye has the energy and radiation efficiency of largely SMW light. As already recapitulated herein, ordinary transparent electrical components will, at least in embodiments without processors, be used to establish the charge/signal levels that actually reach the LRC. Thereby they will in some embodiments control thresholds such as how bright a point in the FOV has to be for the assembly to start causing the LRC to be less transmissive), ceilings (e.g., the charge/signal levels at which the LRC is totally non transmissive), etc.

With the addition of a processor associated with (i.e. connected to) a sensor and its associated LRC and/or the addition of a central processor, these ceilings, thresholds and the overall responsiveness of the elements can be adjusted by the processor(s). Then, of course, all of these factors are controllable programmatically and/or by user control via the user interface (which includes any form of communications between the user and the processor). Also, the addition of the processor(s) enables that same assembly to perform extended SAGA functions including darkness adaptation and instant "pupil response" (controlled light to the eye responsive to changes in ambient light) by the assembly as described herein. It also enables even the selective use of external power and/or use of that or sensor power to make LRCs maximally or minimally transmissive even beyond the limitations of ceilings, thresholds, etc. for special conditions (e.g., the sudden darkness responses of full transmissiveness).

Of course, in many of these embodiments, the inclusion of blinders and/or path favoring filters and filter/sensor combinations helps enable these functions and improves vision by selectively favoring passage of light with a selection criteria based on AOI. Thus, FIGS. 1B, 2A, 3A, 3B, 8A, 8B, 9A, 9B, 12A and 12B can be used to describe a few versions of such an embodiment.

With that in mind, consider a very simple 2 filter group embodiment while looking at FIG. 8A. Filter group a will be UV light and group A filters will remove UV and at least one of the sensitivity minima ranges 704, 705 and 706 while filter group a sensors will convert UV light to power. Filter group B is IR (infrared) light and group b filters will remove UV and at least one of the sensitivity minima ranges while filter group b sensors will convert UV light to power. Also, let the LRC array be configured to be less transmissive in response to a greater charge. So, normal light along the path of arrow 212 in FIG. 8A encounters a filter group A left matrix element which removes the UV and sensitivity minima light. When that light (still following the path of the arrow 212) reaches the right matrix element which is also a filter group a element, that sensor is also sensitive to UV light which was removed in passing through the left matrix. And as is probably obvious at this point, non-normal light like light following the path of the arrow 213 in FIG. 8A, will result in a charge/signal between the encountered sensor and its associated LRC(s) thus darkening the passage of this non-normal light. Thus, low AOI light is favored for transmission for less glare and better vision and the user's view is retinally optimized (the user can see better with less light). Of course, virtually any embodiment described for FIGS. 2,3,8 and 12 is also applicable to and easily adjusted for many more levels, a minimal version of which described in FIG. 9.

To limit complexity of the next topic, we will first use the very simple FIG. 2 as our drawing to look at. However, any number of additional levels may be added which makes the discussion also applicable to embodiments structured like FIG. 9 and even those with multiple additional levels.

Much has already been discussed about FIG. 10A together with respect to FIG. 9 with colors being an interesting consideration therein. We will use FIG. 10A again now but we will use the R, G, B and white (blank) nomenclature only as locational place holders to more easily communicate the complicated spatial relationship being described. Even though the LRCs shown in FIG. 10A are labeled with R, G, B, etc., all light exiting any LRCs in the next 4 embodiments can emit all colors.

In the first of these examples, the LRCs are configured to increase their transmissiveness in response to an increasing charge. Let filter group a mean that a group a filter protects UV. That is, it removes all the hard-to-see wavelengths except for UV (thus it removes IR, 704 and 706 but UV or any of the easily seen wavelengths). A group a sensor will convert IR to charge/signal. We will code filter group a with color code red (abbreviated "R").

Let filter group b mean that a group b filter protects IR. That is, it removes all the hard-to-see wavelengths except for UV. A group b sensor will convert UV to charge/signal. We will code filter group b with locational code "B".

Let filter group c mean that a group c filter protects the wavelengths identified as the range 704 in FIG. 7 and a group c sensor will convert the wavelengths identified by the range 706 in FIG. 7 to charge/signal. We will code filter group a with color code "G".

Let filter group d mean that a group d filter protects the wavelengths identified as the range 706 in FIG. 7 and a group d sensor will convert the wavelengths identified by the range 704 in FIG. 7 to charge/signal. We will code filter group a with color code "W".

The following kinds of steps were tediously discussed with respect to the earlier discussion of FIG. 9 along with FIG. 10A so this discussion will lean somewhat on that existing understanding.

Thus, light along the path of arrow 101 in FIG. 2A loses all hard-to-see wavelengths except for IR as it passes filter group B filter 201. It then encounters filter group a sensor 205 which is only sensitive to IR light thus a strong charge is delivered to LRC 107 and thus its transmissiveness is increased.

From the perspective of the eye in FIG. 10A, that LRC can be seen as 107 which is labeled with a "B". Once again, these alphabetical labels are simply to identify a location, the light exiting this location can be any or all colors; thus, this is an especially light-efficient embodiment.

One example of non-normal light in this embodiment is light passing along the arrow 203 in FIG. 2A. It loses all difficult-to-see wavelengths except IR light as it passes a filter group B filter. It then encounters a filter group b sensor 210 which is only sensitive to UV light thus a zero or negligible charge is delivered to the adjacent LRC 209 and it can be seen in FIG. 10A with an R in it just to identify it. (Once again, these alphabetical labels are simply to identify a location, the light exiting this location can be any or all colors.) Thus, its transmissiveness is not increased.

Figure 2B:
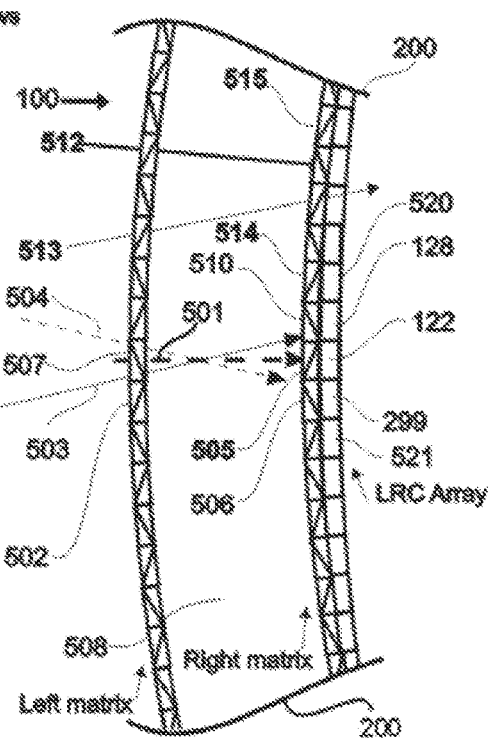
FIG. 2B is also a cross-sectional drawing of the slice of 100 that is just behind the slice of 100 that is illustrated by FIG. 2A.

FIG. 2B is just the next sagittal layer of 100 "behind" FIG. 2A. From the perspective of the eye as seen in FIG. 10A the sagittal layer we see in FIG. 2B is seen as the column to the right of the column that represents FIG. 2A. Thus, what we're seeing in FIG. 10 are LRCs that we see on the right side of FIGS. 2A and B. FIG. 2A's LRC 107 (which should be really familiar by now) is labeled 107 in FIG. 10A (and it has a "B" in it). The LRC just to the right of 107 in FIG. 10A (122) can also be seen in sagittal perspective in FIG. 2B.

With that three-dimensional spatial relationship of FIG. 2 and FIG. 10 easily understood, now, consider the more complicated three-dimensional case of non-normal light that enters filter 201 (which in FIG. 10A is way behind the "B" in 107) and exits (or tries to) at 128 (behind the "G" in 128). As light passes 201, it protects the IR component but removes other hard-to-see wavelengths like those identified by 706 in FIG. 7 and then arrives at sensor 510 which is group C sensor 122 which needs those 706 wavelengths that were removed. Thus, no substantial charge/signal is passed through to LRC 128 and, thus, LRC 128 is not caused to increase its transmissiveness.

The passage of normal light is favored and non-normal light is disfavored even when it crosses from one sagittal layer to another in its transit.

Considering the eye's view of the sagittal layers (FIG. 10A) reveals additional factors that make the assembly more precisely favorable to normal light. For example, FIG. 10A's format is configured to favor landscape precision. I.e. it favors normal light most in a left to right direction which is better for the human vision system which has a much broader field of view laterally than it does vertically. (However, of course, other layout embodiments are equally applicable to the current invention.)

Of course, light entering directly behind the B in 107 and exiting at the B in LRC 107 is normal light. If that light had exited in 122 (one column to the right) it would've been non-normal light. If it had exited three columns of LRCs to the right of 107 it would be much more non-normal but the system would still have reduced its transmittance because the sensor behind that LRC wouldn't receive the wavelengths it needed to create a signal. The AOI would have to be so high that it exited four LRCs to the right (or left) of 107 for it to exit at another LRC marked with a "B" (which is when the system would fail to reduce that non-normal light's passage). By looking left to right in FIG. 10A it can be seen that a very high AOI (depending of course on the depth of 208 and/or 508) would be required for 100 to fail to reduce normal light. I.e. if light came in behind a G, it would have to miss that G's LRC by 4 rows in either direction to become a problem. Of course, additional layers as in FIG. 9 are an additional factor for improving AOI preference precision.

For implementers who prefer to configure the LRCs so that they reduce their transmissiveness responsive to a stronger charge and still favor normal light, one approach is to simply redefine the legend. Thus, a group a filter removes UV and a group a sensor will convert IR to charge/signal. We will code filter group a with color code red (abbreviated "R").

A filter group b filter removes IR and a group b sensor will convert UV to charge/signal. We will code filter group b with locational code "B".

A group c filter removes the wavelengths identified as the range 704 in FIG. 7 and a group c sensor will convert the wavelengths identified by the range 706 in FIG. 7 to charge/signal. We will code filter group a with color code "G".

A group d filter removes the wavelengths identified as the range 706 in FIG. 7 and a group d sensor will convert the wavelengths identified by the range 704 in FIG. 7 to charge/signal. We will code filter group a with color code "W".

Thus, light along the path of arrow 101 in FIG. 2A loses its IR light as it passes filter group B filter 201. It then encounters filter group a sensor 205 which is only sensitive to IR light thus a strong charge is delivered to LRC 107 and thus its transmissiveness is increased.

From the perspective of the eye in FIG. 10A, light through that LRC can be seen as LRC 107 which is labeled with a "B".

One example of non-normal light in this embodiment is light passing along the arrow 203 in FIG. 2A. It loses its IR light as it passes a filter group B filter. It then encounters a filter group b sensor 210 which is sensitive to UV light (which was not removed) thus a significant charge is delivered to the adjacent LRC 209 and it can be seen in FIG. 10A with an R in it just to identify it. Thus, the transmissiveness of this non-normal light is reduced. The passage of normal light is favored.

Now we consider two very similar embodiments but using FIG. 8. Note: FIG. 8A, as in the FIG. 2A examples just above can be understood to have other sagittal layers behind and in front of the paper view we have of FIG. 8A all of which can be seen in FIG. 10A with the sagittal layers seen as vertical columns as previously discussed. However, FIG. 8B, unlike FIG. 2B, is not an image of that next sagittal layer (it is used to illustrate a peripheral vision adaptation described elsewhere herein). A key difference between FIG. 2 and FIG. 8 is that in FIG. 8 normal light will pass through the same filter group in both the left and right matrices which has some benefits for certain applications. For implementers who prefer to configure the LRCs so that they reduce their transmissiveness responsive to a stronger charge and still favor normal light, one approach is to define the legend such that a group a filter removes UV and a group a sensor will convert UV to charge/signal. (Yes, these combinations are easier to remember.) We will code filter group a with color code red (abbreviated "R").

A filter group b filter removes IR and a group b sensor will convert IR to charge/signal. We will code filter group b with locational code "B".

A group c filter removes the wavelengths identified as the range 704 in FIG. 7 and a group c sensor will convert the wavelengths identified by the range 704 in FIG. 7 to charge/signal. We will code filter group a with color code "G".

A group d filter removes the wavelengths identified as the range 706 in FIG. 7 and a group d sensor will convert the wavelengths identified by the range 706 in FIG. 7 to charge/signal. We will code filter group a with color code "W".

Thus, light along the path of arrow 101 in FIG. 8A loses its IR light as it passes filter group B filter 201. It then encounters filter group b sensor 205 which is only sensitive to IR light thus a negligible or nonexistent charge is delivered to LRC 107 and thus its transmissiveness is not decreased. From the perspective of the eye in FIG. 10A, light through that LRC can be seen as LRC 107 which is labeled with a "B".

One example of non-normal light in this embodiment is light passing along the arrow 203 in FIG. 8A. It loses its IR light as it passes a filter group B filter. It then encounters a filter group b sensor 210 which is sensitive to UV light (which was not removed) thus a significant charge is delivered to the adjacent LRC 209 and it can be seen in FIG. 10A with an R in it just to identify it. Thus, the transmissiveness of this non-normal light is reduced. The passage of normal light is favored.

For implementers who prefer to use the layout of FIG. 8A but want to configure the LRCs so that they increase their transmissiveness responsive to a stronger charge and still favor normal light, the legend is defined such that a group a filter protects UV (but not other hard to see wavelengths) and a group a sensor will convert UV to charge/signal. (Yes, these combinations are easier to remember.)

A filter group b filter protects IR and a group b sensor will convert IR to charge/signal.

A group c filter protects the wavelengths identified as the range 704 in FIG. 7 and a group c sensor will convert the wavelengths identified by the range 704 in FIG. 7 to charge/signal.

A group d filter protects the wavelengths identified as the range 706 in FIG. 7 and a group d sensor will convert the wavelengths identified by the range 706 in FIG. 7 to charge/signal.

Thus, light along the path of arrow 101 in FIG. 8A protects its IR light as it passes filter group B filter 201. It then encounters filter group b sensor 205 which is only sensitive to IR light thus a significant charge is delivered to LRC 107 and thus its transmissiveness is increased. From the perspective of the eye in FIG. 10A, light through that LRC can be seen as LRC 107 which is labeled with a "B".

One example of non-normal light in this embodiment is light passing along the arrow 203 in FIG. 8A. It protects its IR light but loses, for example, UV light as it passes a filter group B filter. It then encounters a filter group a sensor 210 which is sensitive to UV light (which was removed) thus no significant charge is delivered to the adjacent LRC 209 and that LRC can be seen in FIG. 10A with an R in it just to identify it. Thus, the transmissiveness of this non-normal light is reduced. The passage of normal light is favored.

Processor Driven Embodiments

If we define a node as a group of components associated specifically with one light sensor like 205 in FIG. 1B then, when a processor is driving a single "node" it might be driving, via ITO traces, nothing more than a single LRC (for example, 107 or 102) responsive to the output of and primarily associated with a sensor like 205. Of course, as suggested above, a processor can, responsive to the output of a sensor, 205, direct the activation of both any LRCs associated with it (like 102 and/or 107) and optionally some LRCs surrounding it.

There is also an option for a less centralized processor architecture. Each node may have its own processor. Or, alternatively, LRCs having their own processor may be arranged with LRCs located around or near them that share their processor. In this latter case, one tiny processor may be dedicated to the control of a plurality of nearby LRCs. This control may be characterized as a single processor associated with a sensor like 205 controlling both the LRC associated with that sensor as well as some surrounding LRCs. However, for simplicity here we'll discuss the less centralized processing architectural option as if every node has its own proximal processor. In one preferred such embodiment each LRC (e.g., like 107) has its own transparent processor element. This element is not shown in FIG. 1a but it may be located, just for some layout examples, between 205 and 107 or on the surface of part of 102 when this type of LRC is used. In an applicable variation of this embodiment such processors are connected to nearby processors via transparent connections which facilitates, for example, the practice of darkening areas around a node whose sensor indicated high brightness. In one simple such embodiment, the processor, connected to its adjacent (or at least very nearby sensor) directs (via transparent connections e.g., ITO) at least one nearby LRC based on a signal from the sensor via transparent connections. It is also an applicable embodiment when a processor associated with a single node (for example a node comprised of LRC 107 and sensor 205) is connected, e.g., by transparent traces or other communications, to nearby surrounding sensors. This enables that processor to make decisions on LRC activations based on broader information as will be understood by those skilled in the art. The sensor may be any kind of light sensor but a preferred sensor type is a PV element as described herein that is able to provide both power to support the tiny processor and the LRC and provide, by the magnitude of that power, the signal to the processor that is indicative of the intensity of incident light.

Processors are also a good way to manage other fixed and calculated criteria. These include a minimum sensor signal threshold for processor directed attenuation of light by LRC as well as a maximum magnitude of LRC activation for protection of the equipment and LRC adjustment (which can improve the performance and longevity of the LRCs). These criteria and processing logic can, of course, reside in or be accessed by the processor/controller via any communications (e.g., transparent wiring or wireless communication.

Devices employing a more centralized, and more typical, processing scheme wherein potentially thousands of LRCs are operably connected to a single processor (or few processors) with ITO traces can have higher manufacturing expense, higher failure rates, component crowding and even reduced true transparency due to all the conductive traces required to connect all the elements to the more centralized processor. Notwithstanding the above, embodiments with large multi-node controlling processors and/or externally provided or centrally collected power and/or data are also valid embodiments of the current invention. However, we will now consider an advantageous alternative solution.

Though there are valid embodiments with processing elements (many described herein), it can readily be seen that a processor is not required for many of the applications. For example, one minimal embodiment requires nothing more than a sensor, 205 in FIG. 1, (preferably in the form of a PV element generating power to activate an LRC). Consider blinder LRCs like 102 and 106 (as a "ceiling" and "floor" as well as blinder LRCs to the left and right (forming a rectangle at least as it appears from the eye's perspective in FIG. 4A (that rectangle will often be the proximal end of an expanding rectangular channel). Each of these blinder combinations can be thought of as a node of an array of nodes. In one very simple-to-explain embodiment, each node is electrically independent of other nodes and the preferably transparent connections are simply between an LRC and its companion PV element (i.e., the power output of the PV element is connected to and powers the activation of the companion LRC). A sudden brightness will thus cause the blinders to receive a charge and thus darken. This helps accomplish better AOI management, allows better blockage of bright light sources and minimizes off-axis glare. In one such embodiment these LRCs are electrochromic but these may also be other LRC forms. This simple embodiment does not require any LRCs as drawn on the far right of FIG. 1B like 107; just the blinders are enough.

A similar and equally simple processor-less embodiment uses the arrays of LRCs like 107 that are drawn in FIG. 1A with each connected to a nearby PV element (like 205) to power the LRCs (like 107) adjustment of light transmission without a processor. In one such embodiment these LRCs are liquid crystal but these may also be electrochromic of other LRC forms.

In one preferred embodiment a node may include both an LRC like 107 in FIG. 1B and an AOI-managing blinder LRCs like 102, 106 etc. wherein both are operably connected to and activated by the output of a nearby PV element like 205 and/or alternative power sources in order to provide, via an array of these nodes, minimizing of light from bright spots in the FOV of the eye, 103. Thus, for example, the reduction of light from too-bright points in the FOV of a user (similar to the SAGA functions described in previous patent applications) is accomplished without the expense or light diffusive overhead of more complex designs that involve processors and complex wiring.

Thus, even in these ultra-simplistic embodiments, the brighter the source, the more energy will thus be harvested by the PV element, like 205, and thus the more power is passed through to the operably connected LRC via transparent (e.g., ITO) traces which in a preferred embodiment increases the LRCs adjustment of light passage. LRCs preferably default to, at zero power applied, transparent or "normally white". If more power is applied (e.g., when the light striking 205 becomes brighter) the operably connected LRC allows less light to pass through it, even without a processor. Thus, the power output of 205 can be used to both power (although external power provision for 107 is also an acceptable embodiment as long as 205's output is the signal) and determine the magnitude of LRC light absorption and/or reflection.

There are, thus, useful embodiments of the current invention that have both simple LRCs like 107 and AOI-managing blinder LRCs like 102 (and these two types of components are shown together in FIG. 1B because their combined use together is both an applicable embodiment and advantageous).

Either or both of these types of LRCs can be driven by a sensor like 205 either with or without a controller/processor. For example, an array of sensor elements like 205 are shown in FIG. 1B (13 of them are shown arrayed vertically in this cross-sectional figure). So, when light comes along the path identified by the arrow 101, it strikes a sensor element, 205, just before encountering the operably connected LRC 107. (In at least one preferred embodiment both the sensor, 205, and the LRC, 107, are effectively transparent.)

In one such embodiment the LRCs like 107 are nodes of a liquid crystal array and the blinder AOI LRCs like 102 are electrochromic. In the preferred version of that embodiment both are activated by the power output of the PV element 205 via at least trace transparent connections. Of course, in any embodiment when electrochromic LRC elements (either those like 107 or blinders like 102 or both 107s and 102s) involve reflective hydrides or other reflective elements, adjustment of transiting light is accomplished at least partially by reflecting light away rather than just absorbing it. Reflecting, absorbing or combination electrochromics (that both absorb and reflect) are all valid embodiments of the current invention. In another embodiment LRCs like 107 are electrochromic and blinder LRCs like 102 are liquid crystal. The activation of all of these LRCs are responsive to the output of the sensor, 205 with or without the optional use of auxiliary power and/or use of power from photovoltaic elements being used as filters. For example, where sensor 205 is a PV element whose power activates the LRCs. In another embodiment all the LRCs are electrochromic. Of course (especially in such cases), a pairing of an LRC like 107 and a channel of blinder elements (102 is the "floor" of one) may be viewed as a single element and these may, in fact, be made in one piece.

In another embodiment all the LRCs are liquid crystal. In other embodiments the LRCs may be of any light resistive components that attenuate or redirect light transmission responsive to the power output of a nearby PV/sensor element like 205. Optionally and alternatively, an optional processor or processors (discussed herein) may be included to manage at least part of the process.

Power or portions of the power used by the current invention may come from an external source of any kind which specifically includes inductive remote power transmission, power stored nearby, power stored on board, alternative energy sources and/or separate and typically centralized PV elements. However, in a preferred embodiment, 205 in FIG. 1A is a photovoltaic element (useful as both a light sensor and power provider) that, absorbs and converts to power at least some of the less visible wavelengths thus allowing the eye, 103, to see through 205 while this power is being harvested. While a processor is useful in a number of embodiments, a processor is not required here to take this "data" (e.g., the magnitude of the power thus converted from the wavelengths absorbed by 205) and, in real time, cause the transparent LRC located near it (e.g., 107) to adjust (proportional to the magnitude of the power converted) the transit of light through it. This is because the more light that strikes 205 the more the LRC, 107, adjusts its transmissiveness.

Of course, as will be understood by those skilled in the art, even simple resistors, transistors, capacitors and other preferably transparent adjustment elements can be placed in connection with, for example, LRCs (like 107 and blinders like 102) and PV elements like 205. However, it is also possible for these adjustment elements to be opaque and be placed surrounding each node much as non-transparent thin film transistor (TFT) circuitry surrounds individual pixels. It's also possible for them to be located outside of the field of view such as in the scleral portion of scleral contact lenses or the rims of spectacles or heads-up displays.

These adjustment elements can be used to establish effective activation thresholds, minimums and/or maximums for control of these LRCs to create a simple, rugged and inexpensive array. Just for example, if the output of 205 resulting from the presence of an acceptable level (thus no need to attenuate transit of light through 107) of light striking 205 is enough to, with the charge harvested by 205 passed on to 107, cause 107 to darken more than is desired by implementers, a resistor may be placed between the conductive connections of light sensor (PV cell) 205 and LRC 107. Thus, a threshold may be established since, with the resistor in the circuit, more light will be required to strike 205 before it will send enough charge to 107 via this more resistive path to cause significant attenuation of light passing therethrough. Thus, the node can be tuned (e.g., just by managing the charge/signal between a power source and its LRCs with common transparent electrical components) as to how much light is tolerable for a) the typical eye, b) a particular user's eye, c) a particular kind of environment e.g., outdoor and/or d) a particular part of the eye.

This last item (d) is particularly useful in dealing with issues like asymmetric differences in environmental light such as the effects of bright overhead lights on different parts of the eye. For example, certain parts of the FOV (e.g., the bright upper sky) can be preferentially (i.e. more) darkened (e.g., when LRC transmissiveness is configured to be less in the presence of larger signal/charges) by the device, 100, more for such bright areas as compared to less bright areas (e.g., the road below) by having less resistance (fewer and/or lower-ohm resistors) in the circuits of the nodes in the upper parts of the plate 100. Thus, great customization for each application is possible in a device that has few parts and no single point of failure (scratch or crack part of 100 and the other parts, having in the preferred embodiment independent circuitry for each node or at least for a node and a limited number of surrounding nodes, and all the other nodes still function and never "run down" since there are no required batteries). Of course, as discussed herein, for embodiments that have processors much or all of this can be controlled by the processor driving its own charge control elements to adjust the signal that it sends to LRCs.

Also, as described herein, there are embodiments wherein the device of the current invention is not only curved but also in a form similar to that of a contact lens. Similar to the discussion above, the resistance placed in the circuits of the nodes in the upper portion of this contact-lens-like embodiment can be, for embodiments where the LRCs are configured to lower the transmissiveness in response to a larger charge, lower than the resistance in the circuits of the nodes in the lower portion so that less light is permitted to pass in that upper portion. Of course, this arrangement of resistances can be arranged along a gradient not unlike the gradual darkening of certain sunglasses towards the top of their rim.

There are many other and alternative components, including some that are real time adjustable, that can be used additively or alternatively to manage the magnitude of the power between a sensor/PV element (like 205) and its associated LRC(s). These processor-driven or processor assisted alternatives are just as applicable to the current invention as the locally placed (e.g., between a sensor and an LRC) resistors, transistors, capacitors, etc. that are often used herein as examples of components to manage the charges between sensor and LRC because they are so easily understood.

Thus, these arrays, which can be manufactured using successive coatings/layers, CAD managed 3-D depositions or any other means, can not only rapidly adjust light levels effectively in real time with no processor and with minimal or no external power required but it also can do so, if desired, with implementer-adjusted performance criteria at each individual node (e.g., at each location of a sensor like 205 and its paired LRC (s) like 107 and/or 102) in a process conducive to economical mass production and, optionally, customization for the benefit of a particular user.

This customizable tuning of, potentially, each individual LRC and sensor connection and thus optionally each individual node is also applicable to, as described in previous applications, balanced illumination display (BID) objectives. Consider for example, a curved on-the-eye embodiment similar to a contact lens in an embodiment whose LRCs are configured to reduce their transmittance responsive to a larger charge. The nodes (locations of elements) that are located such that light passing through them will strike a less sensitive area of the retina will be assembled to have more resistance (as compared to resistance at other locations on 100) between sensors and LRCs so that more light can pass through the LRCs. Or, alternatively, these will be otherwise configured to increase or maximize the transmissiveness of thus-located LRCs. In embodiments where LRCs are configured to increase their transmittance in response to a charge, such LRCs will be configured to receive more, not less, of a charge to thus increase the transmissiveness. Other nodes located such that light passing through them reaches more sensitive areas of the eye is then configured to have less LRC transmittance. Thus, those "lighter" nodes are located such that their reduced LRC light-attenuation will increase the brightness of light striking a scotoma or any known insensitive portion of the retina such as macular degeneration and the extra-foveal areas associated with retinitis pigmentosa.

This works better for a contact lens-like embodiment than for a spectacles-like or heads-up-display-like embodiment of 100 because the latter two allow more distance for light to diverge after leaving 100 and before it reaches the retina. All three are valid embodiments and all benefit substantially by the favoring of low AOI light as discussed in numerous examples herein. Embodiments configured like FIG. 1B, 2, 8, 9 (optionally with even more layers of matrices), and 12 used as described herein to strongly favor low AOI light makes the preferential "brightening and/or darkening" of light to certain parts of the retina a much more precise proposition than just favoring the brightness of (potentially glare-ridden, unfocused and diffuse) light over scatomas.

Thus, more light reaches the weak portions of the eye to balance what would otherwise be perceived as dark areas. Similarly, nodes whose LRC light-attenuation affects the brightness of light whose path will cross areas of excessively diffusive media in the eye such as cataracts can be configured to have less LRC transmissiveness so that these diffusive media scatter less light.

As with other embodiments that can work without the need of a processor, the addition of one or more processors extends their capacity. For example, a processor operably connected (via transparent conductive connections) to sensors and/or their associated LRCs (which also includes embodiments where the only connection between the sensors and associated LRCs is via the processor which has an electrical circuit-switching function) can store and use customized maps of desired LRC relative magnitudes (or other tables or programmatic code to accomplish the same goals). Then, using this knowledge of which LRCs emit light to sensitive or weak areas of the retina (and in the preferred embodiment this sensitivity data is along a gradient for more precise responses) the processor can direct and LRC-specific "darkening" or "lightning" to provide more light for weaker areas and less light for stronger areas of the retina. This is preferably responsive to the overall brightness and/or in the specific areas of extreme brightness in the FOV. And, of course, many embodiments include a user interface option which will allow, particularly in this processor-enabled embodiment, the ability to modify these actions. For example, the user can indicate a rotation or a lateral shift so that the sensitivity map is adjusted to match the potentially shifted positioning of the device 100 with respect to the eye and the FOV. This will actually allow the user to do the equivalent of "adjusting the positioning" of the contact lens, spectacles-like or heads-up-like embodiments without touching them by actually adjusting (via the user interface and processor logic) the orientation attributes for the map as used by the processor. Since spectacles and even scleral and weighted contacts can shift, this user and/or programmatic adjustment is an excellent way to be sure that the correct LRC's transmissiveness is adjusted per the map to actually affect the amount of light that reaches the intended portion of the retina.

The aforementioned customized maps of desired LRC relative magnitudes (or other tables or programmatic code) can, in an alternative embodiment, be transformed into an image on a transparent medium. This "map" image may be printed on an optionally custom-shaped transparent film or may be a photographic negative or positive transparency. When this transparency (which will most often be mapped to the characteristics of a particular patient but may also be classified by standard types) is properly placed, for example, on the surface of an eye like a contact lens, the darker areas (along a gradient) will be located to reduce the transmission of light to healthy, already sensitive areas of the retina. Consistent with the BID concepts described just above, the lighter shaded areas of the transparency are positioned over the eye to provide better transmission of light to insensitive areas of the retina and darker shaded areas are positioned to provide less transmission of light to healthy already-sensitive areas of the retina. Such transparencies can be in the form of a contact lens (which may or may not have any refractive characteristics) and in a preferred embodiment this is a scleral contact lens to minimize shifting. The wearer can adjust the positioning until the gray "ghost" areas go away (are compensated for).

When the map "image" is not monochromatic but includes colors, the "darkened" areas of the transparency can be in the form of sensitivity minima filters or any combination of sensitivity minima, IR, UV and neutral density filters. Then, in those areas that require some darkening, the wavelength ranges that are filtered out (to accomplish that darkening) are those with the worst radiation to perceivable lumens ratio which may help in keeping the eyes from becoming tired as quickly. In some embodiments, however, IR and UV will be filtered out by the transparency in all areas just for protection of the retina.

Of course, any efforts to block tiny shafts of divergent and glare-riddled light with equally tiny darkened areas located distal to the cornea (with any hopes of darkening the right tiny area on the retina) will be greatly enhanced by the addition of the glare removal and normal light favoring of the elements illustrated at least by FIG. 1B, FIG. 2, FIG. 3, FIG. 8A, FIG. 9A and/or FIG. 12. Thus, this additive transparent layer can, in any of these figures, be located as the most distal surface or the most proximal surface of 100. It can also, of course, be located between any of the matrices. However, in the preferred embodiment it is the most distal surface of 100 if for no other reason than that it may be potentially configured to be adjustable by the user's finger and/or, in processor-enabled embodiments, by the processor(s) directing actuators between the transparency and the otherwise most distal portion of 100.

In another embodiment that can be visualized using FIG. 1C, only the blinder LRCs like 102 are located in the plate 100 (which is any essentially transparent medium; an optical plastic like those used in lightweight spectacles being one good example). Thus, no elements like sensor 205 or LRC 107 are present or at least they are not required thus leaving simply an array of blinder LRCs like 102 that favor a chosen angle of entry to the plate, 100. As already described herein and as illustrated in FIG. 4 from the eye's point of view, these blinders can be used to form some or all sides of the channel for light. FIG. 4A illustrates the proximal end of an expanding 4 sided channel having the LRC 107 at its most proximal point.

In one such embodiment, the LRCs are photochromic and/or thermochromic. In this embodiment, an array of these nodes requires no electric power connections. In the preferred such embodiment, these LRCs are at least partially transparent in low or at least acceptable (to implementers) lighting conditions and become darker as these lighting conditions become more intense. Thus, in acceptably low lighting conditions the plate 100 can be essentially transparent. As these lighting conditions become more intense and the blinder LRCs like 102 become less transparent, the plate, 100, is still effectively "transparent" at least for rays having one of the preferred angles of incidence such as the illustrated low AOI lines 105 in FIG. 1C. However, off-axis glare and/or any light not having one of the preferred AOIs (angles of incidence) to the plate, 100, is reduced. For example, light entering along the path 108, is reduced by the now-not-transparent LRC blinder 148 that it encounters. Thus, this embodiment, in the presence of extreme lighting conditions (e.g., a bright light from the side or overhead like sunlight) removes much of the unwanted peripheral light while mitigating loss of light from objects that the viewer it is looking at (compared to, for example, darkening sunglasses that, in the presence of glare darken almost equally both the glare and the objects that the user is trying to see.

As described elsewhere herein, a preferred arrangement of LRCs like blinder 102 in at least FIG. 1B and FIG. 1C provides "channels" (with surrounding sides that are normally wider for portions of those channels that are more distal to the eye, 103 than they are for portions of those channels that are more proximal to the eye) to provide preferred and unobstructed paths for light with a preferred AOI. One such preferred AOI favors passage of light that, when it reaches the cornea, will be essentially normal to the cornea. This light is most likely to penetrate the cornea (rather than being reflected off of the cornea) and is one good example of a set a preferred AOIs.

However, there are many other applicable bases for arrangements of blinder LRCs like 102. For example, since the eye is designed for wide peripheral vision (and thus takes into account the increased angular refraction at the cornea for peripheral light according to the AOI/refractive index phenomena calculable according to Snell's law), other arrangements of LRCs like 102 for preferred AOIs to favor light coming to the cornea along the shortest path from objects in the FOV will be obvious to those skilled in the art. One quick example can be seen in FIG. 8B wherein, for example, the left matrix element crossed by arrow 801 is much larger than the left matrix element crossed by arrow 101. This is to accommodate wider peripheral vision and, so, blinders like the dotted lines (one example of the five dotted lines drawn is 888) become farther apart with distance from the optical axis. While these alternative arrangements will often result in spacings that are less uniform (as just illustrated) than the evenly distributed array of blinders in FIG. 1, FIG. 3 and FIG. 12, their value in managing peripheral vision is, for some applications of such embodiments, well worth the less uniform spacings.

Some embodiments of the current invention with thermochromic and/or photochromic blinder LRCs like 102 will also include light sensors/PV elements like 205 and LRCs like 107 as drawn in FIG. 1B. Typically, these LRCs like 107 are responsive to the output of the light sensors/PV elements like 205 that they are associated with.

Thus, for example, blinder LRCs like 102, when activated by light (i.e. reducing transmission of light), favor low AOI light and help reduce extremes of ambient light. For additional spike control and further responsive protection from extremes of ambient light, light passing through the three-dimensional blinder channel strikes 205 and the resulting charge from 205 reaches the operatively connected LRC 107. For embodiments configured to further (where possible and when any existing LRC threshold or minimum has already been reached) reduce the transmissiveness of LRCs like 107 in response to a larger charge, any substantive charge received by an LRC like 107 results in a preferably graduated (in small increments) reduction of its transmissiveness. Typically, in that embodiment, the transmissiveness of LRCs like 107 is responsive to the magnitude of the charge (or responsive to the current) from associated sensors (like 205). However, in embodiments with processor(s), these will often be used to adjust the results.

LRCs, both those that are computer-controlled and those that are passive, can be further applied individually and in combinations with an extended set of controls and elements that are especially applicable to worn embodiments. For example, imagine that there is an additional refractive layer (not drawn) just distal to the left matrix in FIG. 3A with the curvature similar to the curvature of the left matrix. This new refractive surface can have a prescription or any fixed or variable (including electro-optic and other controlled) refraction to provide corrected vision to the wearer in addition to the other benefits. In some embodiments this lens will be movable distally and proximally to adjust focus. Alternatively, the shape of the lens may be adjusted by adjustment screws or by inflation of a flexible envelope as has been accomplished already. Also, in some embodiments, there will be another (a second) similar refractive layer that will be located between that first refractive layer and the left matrix. These lenses can be moved proximally or distally with respect to each other to adjust focus. One or both of these refractive surfaces can have a prescription form to additionally provide corrected vision to the wearer. These can be fixed or variable (including electro-optic and other controlled refraction).

The LRCs in the LRC arrays (e.g., in FIG. 2A), from the point of view of the eye (looking through LRC elements) can look like FIG. 4A. As illustrated in FIGS. 1 and 2, each element may be wider on the end distal to the eye as compared to the side that is more proximal to the eye. In the preferred embodiment this does not result in "dark areas" occurring between the lines of the "squares" of FIG. 4A (or between the hexagons of FIG. 4B) because the LRCs are oriented to allow vision between the blinder elements like 102 and 106. However, in embodiments where LRCs are configured with angles and orientations so that they eliminate excessive divergent light that would have focused to a point on the retina, the absorption and/or blocking of that portion of light from the FOV will reduce brightness inside the squares (as in FIG. 4A) or hexagons (as in FIG. 4B). But, in the preferred orientation of LRCs (like those in FIGS. 1, 2, 3, 4, 8, 9, 11 and/or 12) sufficient light will pass between the walls of the LRC (whether those walls appear square, hexagonal or in any other shape to the user) so that the user can see through the array of LRCs.

These LRCs can be active (computer controlled) or passive. These illustrated figures can be viewed as having blinder LRCs simply comprised as opaque (even a black channel boundary) or always partially transmissive walls. As described at length herein, the restrictiveness of other LRCs can also be adjustable and computer directed.

In the cross-sectional view of FIG. 3B, blinders like those identified by 300 and are a bit wider spaced than the blinders in FIG. 1B and these permit more peripheral vision. But still, like the angularly arrayed blinder LRCs of FIG. 1B (e.g., 102 and 106), these restrict light with high angles of incidence to the cornea e.g., light sharing a vector identified by the arrow 301. This serves not only to resist glare from objects having excessive AOI but also optionally permits better selective (e.g., processor driven) control, as will be seen, of what light and how much of it from what portions of the eye's FOV is permitted to reach the eye.

Light-directing elements (LDE's), including but not limited to those described in prior applications EG, U.S. Pat. Nos. 9,392,129 and 9,576,556 as well as others are included by reference herein. These LDEs may be placed more proximally or distally (from the perspective of the eye) than the matrices. In one example embodiment illustrated in FIG. 13A and FIG. 13B (the following description applies to both FIGS. 13A and B), the (preferably) collimated light emitter 130 beams light along path 131 into a total internal reflection channel (TIR) 132. TIR is not a requirement nor is a curved LDE channel like 132 (e.g., rectangular channel embodiments need no TIR) but that is the current example in FIG. 13. That light traveling within the LDE assembly encounters the currently activated reflector LDE 133 and reflects off to the right in the illustrations. Three example reflected light beams follow along the paths of arrows 134, 135 and 136.

Figure 13A:
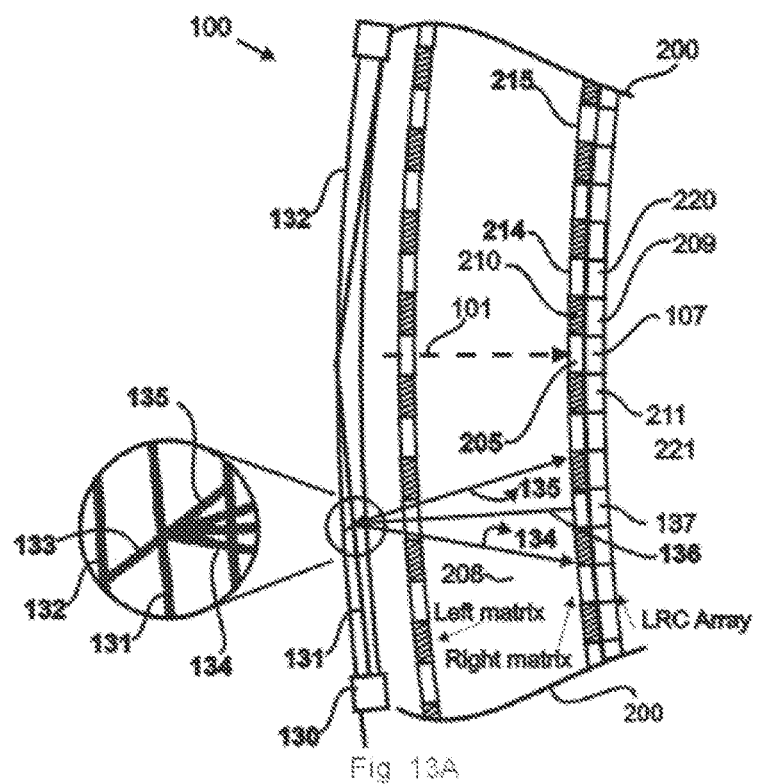
FIG. 13A illustrates the use of Light-Directing elements (LDEs), many of which were described in detail in the parent patents. This provides a see-through display assembly to provide an image to the eye.
Figure 13B:
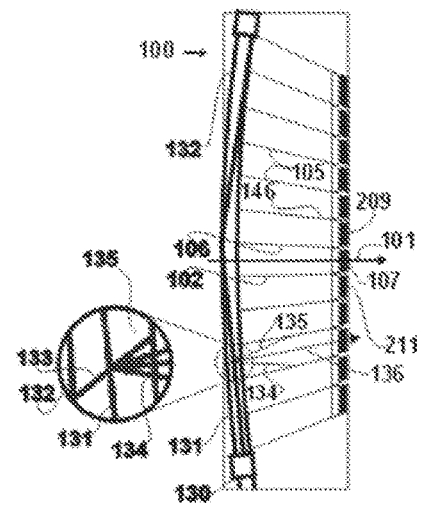
FIG. 13B also illustrates the use of LDEs. However, here the LDEs are shown distal to angle of incidence limiting blinds (rather than distal to the left matrix). However, both forms of the angle of incidence limitation can be used in the same assembly simply by combining the non-LDE portion of the two figures as has been done in previous figures.

FIG. 13A and FIG. 13B both detail angle of incidence limiting components configured to favor passage of light with at least one preferred angle of incidence. In these examples that preferred angle of incidence is low AOI. In FIG. 13A, light along the path of arrow 136 is normal to 100 and loses the same wavelengths in the left matrix that the sensor in the right matrix that it encounters requires to generate a charge (this should be noticeably similar to an earlier example with FIG. 8A). Thus, no significant charge is generated. In an embodiment where the LRCs are configured to darken in response to higher charges, this normal light is not thus additionally impeded by LRC 137 (that is good for favoring normal light). The non-normal light following the paths of arrows 134 and 135 is not so fortunate. Light along the path of both of those arrows encounters a right matrix sensor element that is sensitive to a wavelength range that was not removed in passing the left matrix and thus a significant charge is developed to be passed on to the associated LRC which, based on the above-mentioned LRC configuration, restricts transmission of this non-normal light.

FIG. 13B illustrates additional angle of incidence limiting components configured to favor passage of light with at least one preferred angle of incidence. (here, low AOI) and these achieve the same result by different elements. The light that can be part of an image projected to the eye reflects off of the temporarily activated (and thus temporarily reflective) 133 reflects along paths like the 134, 135 and 136 of the FIG. 13A example but 135 and 134 encountered blinder elements and only the low AOI light along 136 made it through. Thus, the assembly of FIG. 13B like that of FIG. 13A favors the passage of normal light. Note that many embodiments will, as in another embodiment in FIGS. 3A and B, include both the wavelength selective means of FIG. 13A and FIG. 13B but they are being described here separately. Thus, a more discrete beam of light from the reflected element LDE 133 is passed on to the eye which can, with that, better see the images displayed to the viewer/user by the LDE assembly. Divergent beams, glare, and other off axis light (along paths 134 and 135) is reduced.

Thus, both these assemblies (FIGS. 13A and B) can additionally be used to communicate images to the eye based only selective reflection of elements like LDE 133 as is more thoroughly illustrated and explained in the just-referenced patents and other applications and patents. The clarity of that LDE image that is presented to the eye is greatly improved by the selectivity of low AOI light and it does not block the view of the user/wearer (only to the extent that image overlaps with view).

In one combination embodiment housed like a contact lens, in spectacles or as part of displays, the elements of both FIGS. 13A and B are both used (again, see FIG. 3 to see how they can easily be combined) as well as a processor connected to both the LDE assembly (so that the processor can display video or still images to the eye of the user/viewer) and at least the sensors of the right matrix so that the processor can interpret the signals into an image. With the further addition of connections to external communications (Bluetooth, wifi, email forwarded images, any digital communications and even live-streaming) e.g., to a remote entity, that remote entity can view what the user/wearer sees and simultaneously send optionally real-time images for the user/viewer to view.

It should be noted that, since LDEs can be used as displays (which is essentially what the previous example did). For that reason, there will also be some embodiments where instead of these LREs the embodiment accomplishes the same thing with any transparent display. Thus, the current invention can, to increase visual quality, be an add-on to a heads-up display, glasses, contact lenses or even a screen (like a TV or computer monitor or cell phone screen). This will normally be the most distal component of the assembly 100. For a computer screen or TV the devices 100 will often be a film (i.e. thin configuration) that is placed over the screen. In the preferred embodiment of that embodiment it is either held in position by any form of adhesion to the screen or part of that screen. In an extension of that embodiment, that embodiment includes communications capacity to direct and/or be directed by the laptop or smart TV processors. Thus, it can capture an image of the viewer and send that image to the laptop. Also, the laptop (or any other computer of course) can direct the assembly 100 to modify its performance (e.g., be more strict on AOI control. For many embodiments mounted to or part of TVs, monitors, heads-up displays, etc. at least some of the power needed will be provided by the "host" device e.g., the TV, laptop or other host. It could be argued, of course, that a TV, for example, is not a "transparent display". However, as used here, it is effected the transparent since it does not block the view of the user (sinse the view of the user is the computer or TV image). Also, for example, an LCD array is, in effect, a transparent screen. This "transparent display", whether it is LRE based or one of the many transparent display devices available, provides an image to the eye through the assembly 100. This can be very advantageous since the removal of light with unwanted AOIs, removal of radiation that the eye is not sensitive to and/or removal of wavelengths to make colors more easily distinguishable from each other, etc. provide the retina a clearer and better image without a lens (since in many embodiments looking through a lens might help with the display's image but would obscure the view of the FOV).

The length of LRCs (as illustrated), the distance between LRCs, the angular placement of LRCs and the degree of opacity of these LRCs, 102, will also determine how restrictive they are to light with high AOIs to the cornea. Light that is perfectly normal to the cornea will be described herein as having an angle of incidence (AOI) of zero (0). Rays of light like 105 in FIG. 1B that are passing between blinder LRCs without encountering those blinder LRCs have an AOI that falls within the blinder LRCs AOI tolerance determined by at least the above listed factors. Substantially non-normal light such as light following along the path of arrow 108 in FIG. 1B will not reach the eye.

There are, of course tradeoffs to be considered for implementers regarding these parameters. For example, diminutive LRC dimensions (e.g., unnecessarily small rectangles of FIG. 4A and hexagons of FIG. 4B) will increase diffraction and reduce the greater brightness to the retina that would come with a larger cone of light from light emitters being permitted to focus down to a point of confusion on the retina.

As can be seen in the cross-sectional view of 100 in FIG. 1B, the blinder LRCs (like 102) illustrated there define less-obstructed paths through 100 that are wider on the side of 100 that is distal to the eye and thus are structured and arrayed to at least in general favor the passage of light that is, like the rays identified by 105, near normal to the surface of the cornea 100 of the eye 107. These blinder-controlled light paths are less favorable to the passage of light that is far from normal to the surface of the cornea such as light following the path of arrow 108. Some criteria for making sizing choices in implementing these will be brightness desired, diffraction, glare and pupil "footprint". The narrower the unobstructed paths (called shafts or channels herein for brevity) defined by the LRCs the less general brightness to the eye, the more diffraction, the less glare presuming high LRC absorption and the smaller the "footprint" of a channel on the cornea. For example, for daytime driving a smaller diameter shaft/channel can be ideal (selecting more exclusively light that is more normal to the surface of the cornea and permitting passage of less off-axis light associated with glare without suffering from the reduced lumens of light to the retina because there is plenty in daylight. For night driving a larger diameter shaft is more tolerant of low light. The introduction of other components herein allow the best of both worlds in the same assembly.

Any form of light gates are applicable as LRCs and/or LDEs of the current invention including traditional electrooptic (EO) components (e.g., liquid crystal and lithium niobite) as well as electrooptic ceramics like PLZT and, of course, electrically operated physical shutters. A micromirror array also applicably serves as a LRC when in the path of light to the eye by selectively directing tiny areas of light away from the eye for selected locations for processor-driven periods of time as is common in micromirror array-based projectors.

The invention claimed is:

1. A transmissive device for light, to disfavor passage of unpreferred angle of incidence light, to make even full-color images and other signals passing therethrough, from a field of view, more easily perceivable to an eye, comprising:
   angle of incidence limiting components arrayed to encounter light from points in the field of view;
   said angle of incidence limiting components configured such that unpreferred angle of incidence light will strike said angle of incidence limiting components that are in a path of the unpreferred angle of incidence light;
   at least some of said angle of incidence limiting components that are in the path of the unpreferred angle of incidence light configured to cause removal of a portion of some wavelengths of the light such that said removal of each of said portion of some wavelengths of light diminishes the unpreferred angle of incidence light;
   whereby even a full color image of the field of view may be more easily perceived.
2. The device of claim 1; wherein
   said angle of incidence limiting components are at least part of at least one of the group: spectacles; a contact lens; a display; a worn display; a light-transmissive assembly.
3. The device of claim 1, further comprising a display component
   configured to add a displayed image to the field of view that the eye perceives.
4. The device of claim 1, further comprising:
   at least one light restrictive element configured to control passage of at least one ray of the light according to the sensitivity of a portion of the eye that the at least one ray of the light will encounter.
5. The device of claim 1, further comprising:
   at least one light restrictive component configured to reduce passage of at least some of the light that said at least one light restrictive component encounters.
6. The device of claim 1; wherein
   said angle of incidence limiting components are configured to allow at least one of the group:
   1. the passage of images of said field of view with perceivably separable colors,
   2. reduced passage of at least one wavelength whose removal improves the perception of color for the eye,
   3. favored passage of wavelengths that the eye is particularly sensitive to,
   4. limited passage of at least some of the light according to the sensitivity of the portion of the eye that will receive at least some of the light.
7. The device of claim 1 wherein
   a plurality of said angle of incidence limiting components are configured to produce signals in response to at least some of the light; and wherein
   said signals represent a captured electronic image of the field of view,
   whereby a plurality of said signals are representative of a camera-like image of at least part of the field of view.
8. The device of claim 1 further comprising:
   at least one light restrictive component and wherein
   a plurality of said angle of incidence limiting components are configured to produce signals in response to the light and wherein at least one of the group:
   1. said at least one light restrictive component, responsive to at least one of said signals, reduces passage of at least one ray of the light that has a brightness above a desired level;
   2. said at least one light restrictive component, responsive to at least one of said signals, responds to changes in ambient light by adjusting passage therethrough;
   3. a plurality of said signals are representative of a camera-like image of at least part of the field of view;
   4. passage of at least some of the light is limited according to the sensitivity of a portion of the eye that will receive at least some of the light;
   5. at least portions of at least some of said angle of incidence limiting components reduce passage of at least one wavelength whose removal improves the perception of color for the eye;
   6. at least portions of at least some of said angle of incidence limiting components favor the passage of wavelengths that the eye is especially sensitive to.
9. The device of claim 1 further comprising:
   at least one processor; and wherein
   a plurality of said angle of incidence limiting components are configured to produce signals in response to the light; and wherein
   said at least one processor is configured to perform at least one of the group:
   1. stores image data associated with said signals,
   2. puts image data from said signals into a format usable for communicating such captured camera images with other components and devices,
   3. communicates data with other components or devices.
10. The device of claim 1 further comprising:
    light restrictive components; and wherein
    a plurality of said angle of incidence limiting components are configured to produce signals in response to encountered light; and wherein
    a plurality of said light restrictive components are activated by said signals to do at least one of the group:

1. reduce passage of rays of the light whose brightness exceeds a desired level,
2. control the magnitude of levels of the light that can pass through said device;

whereby undesirably bright objects are less blinding and ambient light levels are controlled.

11. The device of claim 1, further comprising:

light restrictive components; and at least one processing component; wherein a plurality of said angle of incidence limiting components are configured to produce signals in response to encountered light; and wherein said at least one processing component, responsive to said signals, is configured to accomplish at least one of:

1. direct adjustment of the passage of light through at least one of said light restrictive components responsive to at least one of said signals,
2. direct adjustment of the passage of light through at least one of said light restrictive components according to at least one criterion,
3. direct, according to at least one criterion, adjustment of the passage of light through at least one of said light restrictive components responsive at least to at least one of said signals,
4. put data from said signals into a format usable for communicating the device's thus-captured camera-like images to other components and devices,
5. manage passage of light through at least one of said light restrictive components to control dark adaptation of the eye,
6. control passage of light, through at least one of said light restrictive components to the eye, to adjust to changes in ambient light.

12. The device of claim 1 further comprising:

at least one processing component; and light restrictive components; wherein a plurality of said angle of incidence limiting components are configured to produce signals in response to encountered light; and wherein said at least one processing component is configured to direct, responsive to at least some of said signals, at least one of the group:

1. reduced passage of rays of light whose brightness exceeds a desired level,
2. control of how much light can pass through light restrictive components,
3. calculation of dark-adaptation of the eye based on at least one of said signals and the passage of time,
4. control of light passage to the eye to favor a desired level of dark adaptation of the eye,
5. adjustments in how much light is allowed through at least some of said light restrictive components responsive to changes in at least some of said signals,
6. decreasing passage through at least some of said light restrictive components when there is more light passing through the device than is needed for good vision,
7. increasing passage through at least some of said light restrictive components when there is less light passing through the device than is needed for good vision,
8. adjusting passage of light through at least one of said light restrictive components according to the sensitivity of the portion of an eye that will receive light through said at least one of said light restrictive components,
9. data storage,
10. creation of image data representative of the field of view associated with said device responsive to at least some of said signals,
11. programmatic logic to interpret at least some said signals into camera-like image data,
12. communications with other components or devices,
13. interaction with users via a user interface.

13. The device of claim 1 further comprising:

a plurality of light-sensitive components configured to produce signals in response to the light; and wherein said signals represent a captured electronic image;

whereby a plurality of said signals are representative of a camera-like image.

14. A light-transmissive device for light having preferred angle of incidence light and unpreferred angle of incidence light to favor passage therethrough of the preferred angle of incidence light to make even full-color images and other signals, passing from a field of view of the device and through the device, more easily perceived by an eye, comprising:

a plurality of angle of incidence limiting components configured to cause passage of the unpreferred angle of incidence light to be disfavored; and at least one light controlling component;

such that at least one ray of the preferred angle of incidence light will cause at least one of said angle of incidence limiting components to pass a signal to at least part of said at least one said light controlling component that is in a path of said at least one ray of the preferred angle of incidence light;

whereby glare from unpreferred angle of incidence light is reduced and bright light from locations in the field of view can be managed without degrading a view of dimmer items in the field of view.

15. The device of claim 14, further configured such that at least one of the group:

1. images of the field of view may be seen therethrough by the eye with perceivably natural colors,
2. passage is reduced for at least one wavelength whose removal improves the perception of color for the eye,
3. passage is favored for at least some of the wavelengths that an eye is particularly sensitive to,
4. the degree of passage for a ray of the light is according to the sensitivity of a portion of the eye that it will encounter,
5. levels of light reaching the eye are limited to manage dark adaptation,
6. a plurality of said signal represents an image of at least part of the field of view,
7. passage of the light is limited responsive to at least one said signal.

16. The device of claim 14, wherein said at least one light controlling component is further configured to at least one of the group:

1. become less transmissive in response to at least one said signal that is indicative of at least the potential for more light to the eye than is desired,
2. become more transmissive, when that is possible, in response to at least one said signal that is indicative of at least the potential for less light to the eye than is desired,
3. maintain a desired level of light passing through to an eye in response to at least one said signal;
4. restrict passage of at least one ray of the light responsive to at least one said signal indicative of the at least one ray of light having more brightness than is desired, whereby undesirably bright light from objects in said field of view can be made to appear less blinding and general brightness reaching an eye viewing said field of view can be maintained even when ambient light level changes suddenly.

17. The device of claim 14; wherein
   a plurality of said signal represents a captured electronic image of at least part of the field of view;
   whereby a camera-like image of at least part of the field of view is captured.

18. The device of claim 14; wherein
   said signal is at least a portion of said at least one ray of the preferred angle of incidence light; and
      wherein said at least one light controlling component is a component whose transmissiveness changes at points of contact with said at least one ray of the preferred angle of incidence light.

19. The device of claim 14; further comprising:
   at least one processing component; wherein
said at least one processing component, responsive to at least one said signal, is configured to at least one of:
   1. make calculations regarding the dark adaptation state of the eye to better manage the dark adaptation of the eye,
   2. direct adjustment of the passage of light through said at least one light controlling component to facilitate dark adaptation of the eye,
   3. direct adjustment of the passage of light through said at least one light controlling component responsive to at least one of said signal,
   4. put camera-like image data from a plurality of said signal into a format usable in communications with other components and devices,
   5. store camera-image data associated with said signal,
   6. communicate camera-image data associated with said signal to other components or devices.

20. The device of claim 14 further comprising:
   at least one processing component operably connected to a plurality of said at least one light controlling component, said at least one processing component configured to direct, responsive to at least one of said signal, at least one of the group:
   1. disfavored passage of rays of the light whose brightness exceeds a desired level,
   2. favored passage of rays of the light whose brightness is less than a desired level,
   3. calculation of the state of darkness adaptation of the eye,
   4. controlled passage of light to cause a desired level of dark adaptation of the eye,
   5. decreased passage of light to prevent passage of more light to the eye than is needed for good vision,
   6. increased, when possible, passage of light to prevent passage of less light to the eye than is needed for good vision,
   7. adjusted passage of at least one ray of light according to a sensitivity of a portion of the eye that will receive the at least one ray of light,
   8. data storage,
   9. creation of image data representative of the field of view responsive to a plurality of said signal,
   10. programmatic logic to interpret at least one of said signal into communicable camera image data,
   11. communications with other components or devices,
   12. interaction with users via a user interface.

21. The device of claim 14, further comprising a display component configured to add a displayed image to the field of view that the eye perceives.

* * * * *